United States Patent
Walsh et al.

(10) Patent No.: US 10,921,014 B1
(45) Date of Patent: Feb. 16, 2021

(54) SMART THERMOSTAT POWER CONTROL APPARATUS

(71) Applicants: John Walsh, Bozeman, MT (US); Robert J. Mowris, Olympic Valley, CA (US)

(72) Inventors: John Walsh, Bozeman, MT (US); Robert J. Mowris, Olympic Valley, CA (US)

( * ) Notice: Subject to any disclaimer, the term of this patent is extended or adjusted under 35 U.S.C. 154(b) by 0 days.

(21) Appl. No.: 16/942,769

(22) Filed: Jul. 30, 2020

(51) Int. Cl.
| | |
|---|---|
| *G01M 3/28* | (2006.01) |
| *G06F 17/50* | (2006.01) |
| *G01M 3/18* | (2006.01) |
| *F24F 11/88* | (2018.01) |
| *H02M 7/06* | (2006.01) |
| *G05B 15/02* | (2006.01) |
| *H04Q 9/00* | (2006.01) |
| *F24F 11/63* | (2018.01) |

(52) U.S. Cl.
CPC .............. *F24F 11/88* (2018.01); *F24F 11/63* (2018.01); *G05B 15/02* (2013.01); *H02M 7/06* (2013.01); *H04Q 9/00* (2013.01); *H04Q 2213/002* (2013.01)

(58) Field of Classification Search
CPC . F24F 11/88; F24F 11/63; H02M 7/06; H04Q 9/00; H04Q 2213/002; G05B 15/02
See application file for complete search history.

(56) References Cited

U.S. PATENT DOCUMENTS

| | | | | |
|---|---|---|---|---|
| 5,462,225 | A * | 10/1995 | Massara | H02J 13/0006 236/47 |
| 6,272,872 | B1 * | 8/2001 | Herrick | F04B 49/065 62/228.3 |
| 8,532,827 | B2 * | 9/2013 | Stefanski | G05D 23/1919 700/276 |
| 9,268,344 | B2 * | 2/2016 | Warren | G05B 15/02 |

(Continued)

OTHER PUBLICATIONS

Venstar® Inc., Add-a-Wire™ Model ACC0410 Installation Instructions, https://venstar.com/thermostats/accessories/add-a-wire/, Date: Feb. 2012, pp. 4, Venstar® Inc., 9250 Owensmouth Ave, Chatsworth, CA 91311.

(Continued)

*Primary Examiner* — Ramesh B Patel
(74) *Attorney, Agent, or Firm* — Kenneth L Green; Averill and Green

(57) ABSTRACT

Apparatus to continuously charge a smart thermostat battery and enable control of a 2-wire millivolt gas fireplace/heating system or a Heating, Ventilating, Air Conditioning (HVAC) system with at least one 24 VAC control voltage signal. The apparatus comprises one diode in a thermostat element or at least one terminal with a diode and a switch in the smart thermostat, and two diodes and a switch device in a switch element. The apparatus is configured to conduct a rectified current signal to charge the smart thermostat battery, and the at least one rectified 24 VAC control voltage signal to energize the switch device to control a HVAC system. The apparatus may be integrated into a smart thermostat with a graphical display to provide simple instructions to easily (Continued)

install the apparatus and the smart thermostat for a HVAC system without a common wire or a 2-wire millivolt gas fireplace/heating system.

20 Claims, 17 Drawing Sheets

(56) References Cited

U.S. PATENT DOCUMENTS

| | | | | |
|---|---|---|---|---|
| 10,533,768 | B2* | 1/2020 | Mowris | G05D 23/275 |
| 2004/0245349 | A1* | 12/2004 | Smith | F23N 5/203 |
| | | | | 236/10 |
| 2012/0126020 | A1* | 5/2012 | Filson | G05D 23/1902 |
| | | | | 236/1 C |
| 2015/0159887 | A1* | 6/2015 | Kadah | F27B 9/40 |
| | | | | 700/276 |
| 2017/0284693 | A1* | 10/2017 | Robledo | F24F 11/62 |
| 2018/0292102 | A1* | 10/2018 | Mowris | F24F 11/46 |
| 2019/0056132 | A1* | 2/2019 | Warren | F24F 11/30 |
| 2019/0346163 | A1* | 11/2019 | Walsh | G05B 15/02 |

OTHER PUBLICATIONS

Lux Products, Power Bridge Installation, https://www.luxproducts.com/wp-content/uploads/2017/10/20170628_Power-Bridge-Install-Sheet-V0-R13.pdf, Date: Jun. 30, 2017, pp. 2, Lux Products, 4747 S. Broad Street Building 101 Suite 330, Philadelphia, PA 19112.

Honeywell Inc., THP9045A1023/U WireSaver, a C-Wire Adapter for Wi-Fi thermostats or RedLINK 8000 series models, http://cache-m2.smarthome.com/manuals/300673.pdf, Date: Jul. 7, 1999, pp. 12, Honeywell Inc., 8008 Corporate Center Dr, Charlotte, NC 28226.

Ecobee Inc., EBPEK01 Smart SI Power Extender Kit, https://rexel-cdn.com/Products/Ecobee/EB-PEK-01.pdf?i=3B61CFCF-FE72-4BE4-A844-E0EAEB443A31, Date: Apr. 1, 2013, pp. 2, Ecobee, Inc., 207 Queens Quay West, Suite 600 Toronto, ON M5J 1A7.

The Simple Inc., Simple C-Wire Adapter Module Installation Guide, Date: May 30, 2018, pp. 14, The Simple, Inc., 1450 Veterans Boulevard, Redwood City, CA 94063 USA https://assets.website-files.com/594acebf03437f1a14504b3f/5bd877c27eec40532ebc6f80_C-Wire%20Adapter%20Retail_20180530_HQ.pdf.

Honeywell Inc., R8845U Universal Switching Relay, Date: May 3, 2000, pp. 8, Honeywell Inc., P.O. Box 524, Minneapolis, MN 55408-0524 USA https://customer.honeywell.com/resources/Techlit/TechLitDocuments/68-0000s/68-0215.pdf.

Instructables, Nest Thermostat With Gas Fireplace (or Other Millivolt System), Date: Dec. 16, 2017, pp. 3, Published by Autodesk Inc. 111 McInnis Parkway San Rafael, CA 94903 USA. https://www.instructables.com/id/Nest-Thermostat-With-Gas-Fireplace-or-Other-Milliv/.

Lawrence Berkeley National Laboratory (LBNL), "Survey of Hearth Products in U.S. Homes," Date: Jun. 2017, pp. 93, Published by Energy Analysis and Environmental Impacts Division Lawrence Berkeley National Laboratory, Energy Efficiency Standards Group, 1 Cyclotron Rd, Berkeley, CA 94720, USA.

U.S. Energy Information Administration, What's New in How We Use Energy at Home: Results from EIA's 2015 Residential Energy Consumption Survey (RECS), Date: May 2017, pp. 19. Published by U.S., Department of Energy, Energy Information Agency, Washington, DC 20585 USA, https://www.eia.gov/consumption/residential/reports/2015/overview/pdf/whatsnew_home_energy_use.pdf.

U.S. Energy Information Administration, Space heating and water heating account for nearly two thirds of U.S. home energy use Date: Nov. 7, 2018, pp. 3. Published by U.S., Department of Energy, Energy Information Agency, Washington, DC 20585 USA, https://www.eia.gov/todayinenergy/detail.php?id=37433.

Muhammad Saleem, Ecobee Inc., Q&A with Stuart: The problem with Power Stealing, Date: Jan. 11, 2014, pp. 4, Published by Ecobee, Inc., 207 Queens Quay West, Suite 600 Toronto, ON M5J 1A7, Canada, https://www.ecobee.com/2014/01/the-problem-with-power-stealing/.

U.S. Energy Information Administration, "One in eight U.S. homes uses a programmed thermostat with a central air conditioning unit," Date: Jul. 19, 2017. pp. 3, US EIA, 1000 Independence Ave SW, Washington, DC 20585. https://www.eia.gov/todayinenergy/detail.php?id=32112.

Honeywell International Inc., RedLINK™ Wireless System. Date: 2011, pp. 60, Honeywell Inc., P.O. Box 524, Minneapolis, MN 55408 USA. https://customer.honeywell.com/resources/Techlit/TechLitDocuments/69-0000s/69-2091EFS.pdf.

Honeywell International Inc., and Resideo Inc., T9 Thermostat Installation Guide, Date: Nov. 6, 2018, pp. 32, Honeywell Inc., and Resideo Inc., 1985 Douglas Drive North Golden Valley, MN 55422. https://digitalassets.resideo.com/damroot/Original/10003/33-00444EF.pdf.

Honeywell International Inc., C-Wire Adaptor Installation Guide, Date: May 31, 2018, pp. 2, Home and Building Technologies, Honeywell, 715 Peachtree Street NE, Atlanta, GA 30308, https://digitalassets.resideo.com/damroot/Original/10003/33-00342.pdf.

Grant, M.B., Thermostat C Wire: Everything you need to know about the "common" wire, Date: Oct. 25, 2014, pp. 12, Published by Smart Thermostat Guide, https://smartthermostatguide.com/thermostat-c-wire-explained/.

Carrier Corporation Inc., TS-2PE01 Power Extender Kit, https://www.dcne.com/UserFiles/Resources/Installation%20-%20IIK-TS2PE-01.pdf, Date: Oct. 28, 2014, pp. 2, Carrier Corporation, 7310 W Morris St, Indianapolis, IN 46231.

U.S. Energy Information Administration (EIA), What's New in How We Use Energy at Home: Results from EIA's 2015 Residential Energy Consumption Survey (RECS), Date: May 2017, pp. 19. Published by U.S., Department of Energy, Energy Information Administration, Washington, DC 20585 USA, https://www.eia.gov/consumption/residential/reports/2015/overview/pdf/whatsnew_home_energy_use.pdf.

Honeywell International Inc., System Installation Guide, RedLINK Wireless System with TrueZONE Panel Wireless Adapter. Date: Jul. 29, 2008, pp. 48, Honeywell Inc., P.O. Box 524, Minneapolis, MN 55408 USA. https://s3.amazonaws.com/s3.supplyhouse.com/manuals/1249544894162/Honeywell_YTH5320R1017_Install_Guide_TrueZONE.pdf.

\* cited by examiner

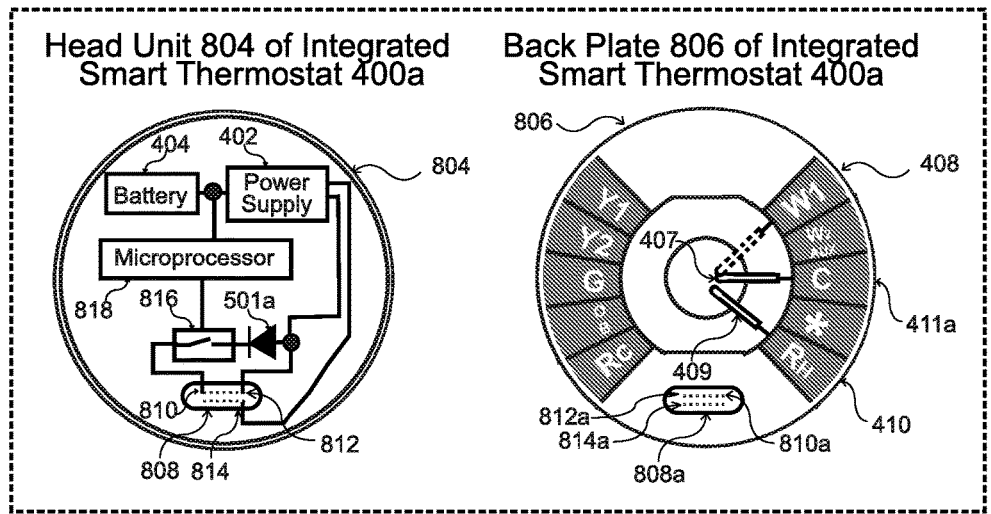
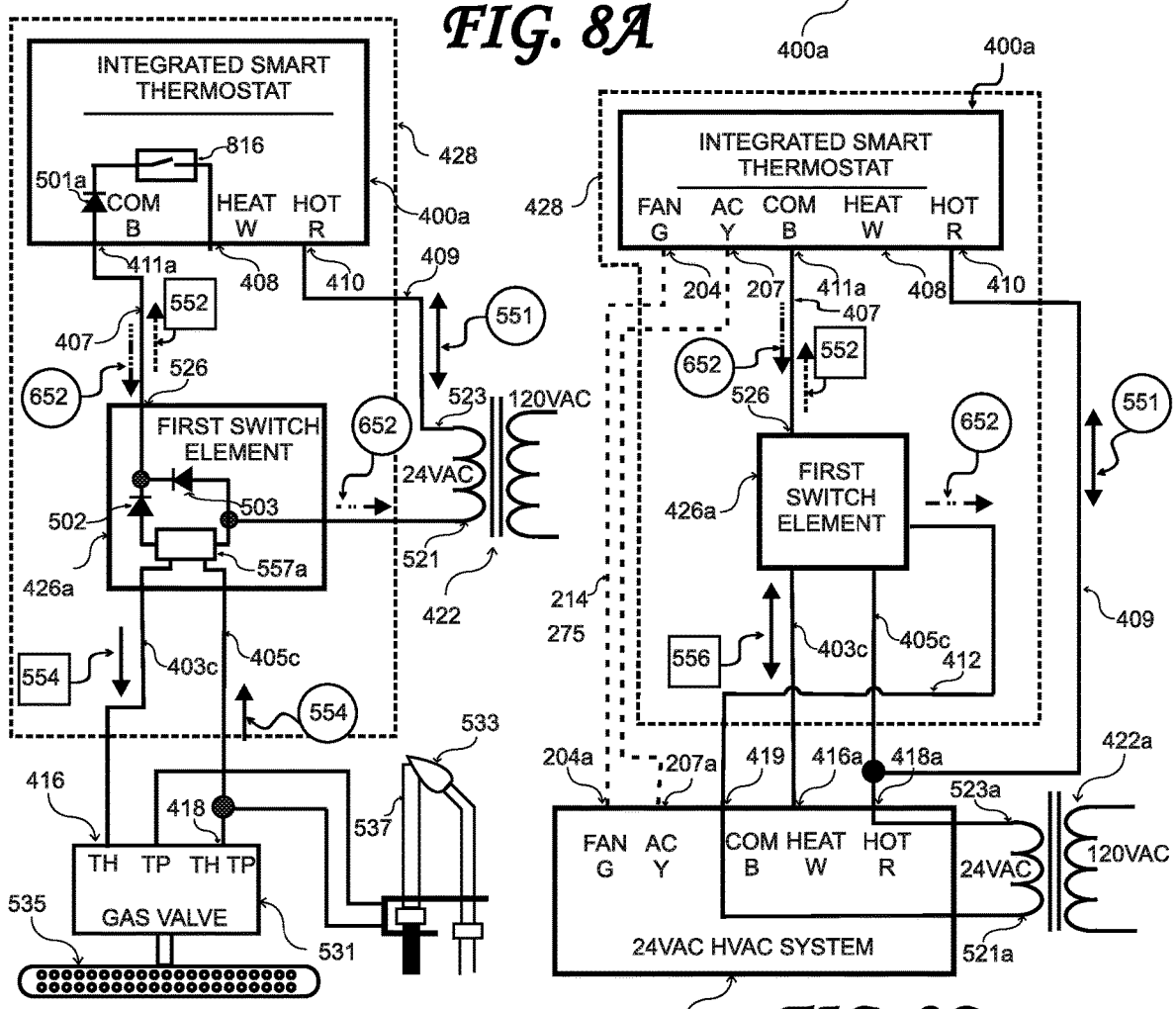
FIG. 8A
FIG. 8B
FIG. 8C

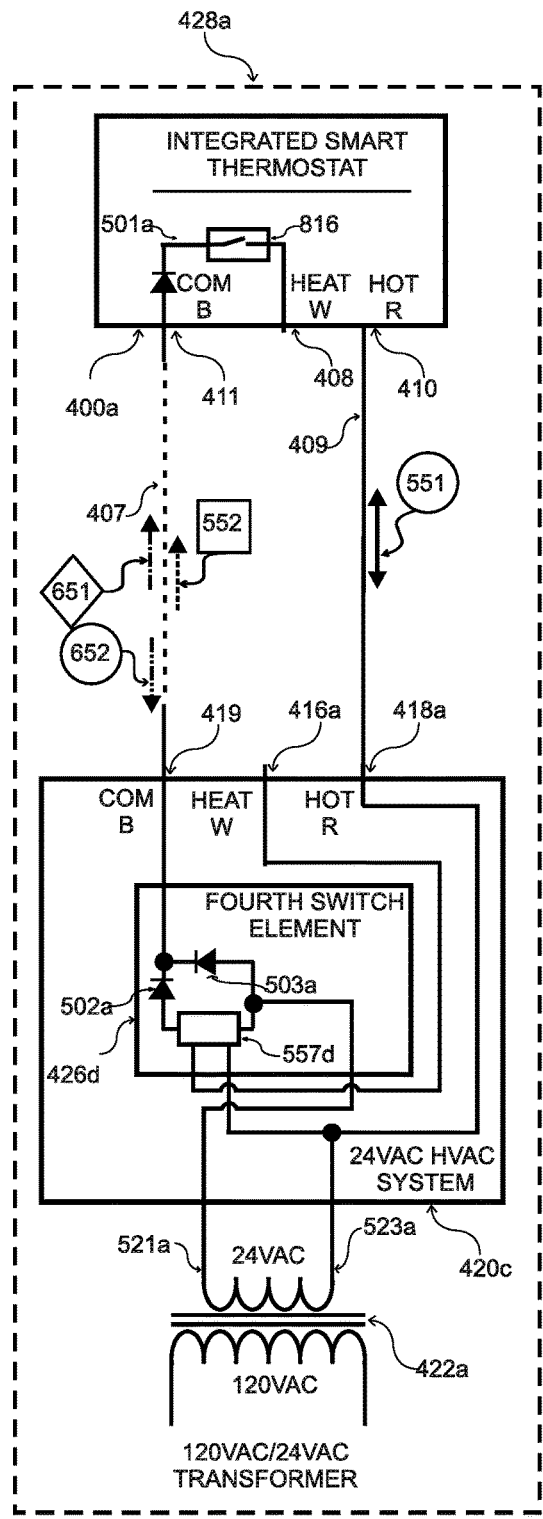
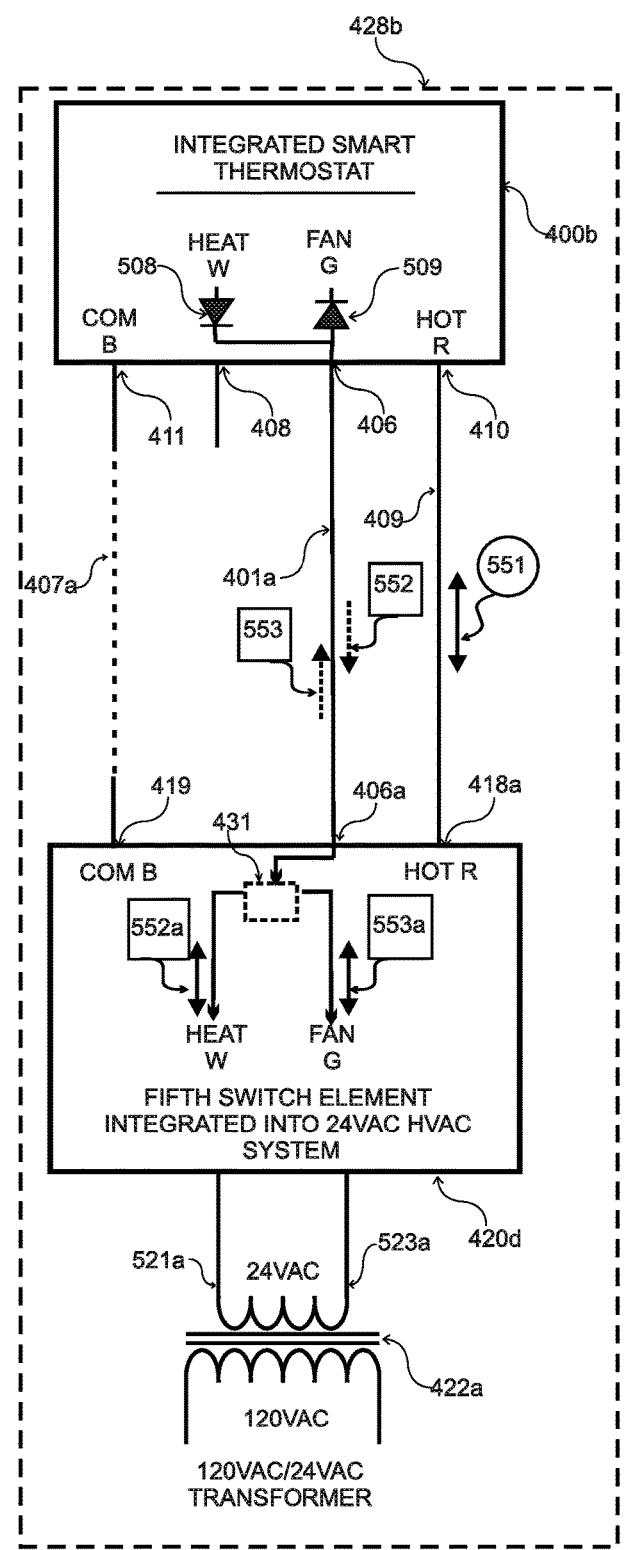
FIG. 8D                    FIG. 8E

SMART THERMOSTAT POWER CONTROL APPARATUS

CROSS-REFERENCE TO RELATED APPLICATIONS

BACKGROUND OF THE INVENTION

Smart communicating thermostats (or "smart" thermostats) need a common wire to provide continuous flow of electrical current from the hot R (Red) terminal of a 120/24 Volts Alternating Current (VAC) transformer to the common terminal of the 120/24 VAC transformer. The common wire charges the battery and maintains continuous uninterrupted operation for the smart thermostat to control a Heating Ventilating and Air Conditioning (HVAC) system and provide wireless networking (WiFi) communication. Conventional analog thermostats and battery-powered thermostats do not require a common wire. Most existing residential buildings do not provide a common wire to the location where the thermostat is installed.

Gas fireplaces and gas heating systems with a standing pilot use a thermopile to generate the electricity required to operate the standing gas pilot and the gas valve. A thermopile is an electronic device composed of several thermocouples connected in series that converts thermal energy into electrical energy by generating a voltage when the thermocouples are exposed to a temperature difference from the standing pilot. The thermopile generates a millivolt signal of approximately 350 to 850 millivolts (hereafter "millivolt" signal) of electricity conducted on a hot R wire from the Thermopile Heat Thermopile Pilot (TH TP) terminal of the gas valve to a hot R terminal of a known prior art thermostat. A heat W wire is connected from a heat W terminal of the known prior art thermostat to a Thermopile Heat (TH) terminal of the gas valve. During a thermostat call for heating, the known prior art thermostat uses a mercury or bi-metal switch or a battery-powered relay to close electrical contacts between the heat W terminal and the hot R terminal to conduct the millivolt signal to the TH terminal to open the gas valve and allow the standing pilot to ignite the burner and provide heat to the conditioned space to satisfy the thermostat call for heating.

Gas fireplaces and heating systems with a standing gas pilot, a thermopile, and a gas valve operated and controlled by a Direct Current or DC millivolt signal are hereafter referred to as 2-wire millivolt heating system. HVAC systems operated and controlled by 24 VAC transformer are hereafter referred to as a 24 VAC system. The 2-wire heating systems do not have a common wire, and most 24 VAC systems do not have a common wire. The "missing common wire" problem creates a market barrier for installing a smart thermostat to control these systems due to the need for a common wire to charge the battery of the smart thermostat and provide reliable voltage control signals for the HVAC system.

According to the United States (U.S.) Energy Information Administration (EIA) 2015 Residential Energy Consumption Survey (RECS), about 68.9 million homes use natural gas for heating and 13% do not have air conditioning. These data indicate that about 9 million U.S. homes have the at least one 2-wire millivolt heating system or the 24 VAC system with only two wires (see U.S. EIA 2015 below).

A nonpatent publication by the United States (U.S.) Energy Information Administration (EIA), indicates that one in eight U.S. homes uses a programmable thermostat with a central air conditioning unit based on the U.S. EIA 2015 Residential Energy Consumption Survey (RECS). These data indicate that approximately 88% of U.S. single-family, multi-family and manufactured homes do not have a common wire at the thermostat. The U.S. EIA provides the following information about programmable thermostats. "Programmable thermostats are designed to help manage energy use, but most of the U.S. households with these controls do not choose to program their thermostats. Based on information collected through EIA's Residential Energy Consumption Survey (RECS) for 2015, only 12% of the nation's 118 million households had a central air-conditioning unit that is actually controlled using the programmed thermostat. About one in three households using central air conditioning do not have a programmable thermostat. But even for those households that use central air conditioning and have a programmable thermostat, more than two-thirds of those households control temperatures without actually programming the thermostat." See nonpatent publication, U.S. EIA, "One in eight U.S. homes uses a programmed thermostat with a central air conditioning unit," Date: Jul. 19, 2017. Pages: 3, US EIA, 1000 Independence Ave SW, Washington, DC 20585. https://www.eia.gov/todayinenergy/detail.php?id=32112.

Smart thermostat manufacturers have attempted to design around the missing common wire problem by using power stealing to charge the battery, but this can create problems with loss of battery power and reliability causing smart thermostats to not function properly. Power stealing draws power through the 24 VAC low-voltage thermostat control wires connected to the Air Conditioning (AC) compressor (AC Y wire), gas valve (heat W wire), or fan relay (fan G wire). If power stealing draws too much power, then the AC compressor, heating system, or fan can turn on when the thermostat is not turning on these devices. If power stealing draws too little power, then the battery will drain and the smart thermostat may not operate properly. Less time is available for power stealing when the HVAC system is operating compared to when the HVAC system is not operating. During cold weather then the HVAC system is operating 8 to 20 hours per day, insufficient time is available for power stealing which causes the smart thermostat battery power to be depleted. When the battery power is depleted, the thermostat will turn off the wireless networking communication and shut down the HVAC system to recharge its battery, which can cause building occupants to be uncomfortably cold with no heating during winter, and interior water pipes to freeze causing water damage to the building.

Nonpatent publication by Venstar Inc., Add-a-Wire™ Model ACC0410 Installation Instructions, Date: February 2012, Pages 4, Venstar® Inc., 9250 Owensmouth Ave, Chatsworth, Calif. 91311, https://venstar.com/thermostats/accessories/add-a-wire/, The Venstar Add-a-Wire™ publication describes an electro-mechanical Add-a-Wire™ C-wire adaptor. In applications where additional wiring cannot be installed, the Add-a-Wire™ accessory can be used to add a C-wire to the thermostat with 3 or more wires in the building wall.

Nonpatent publication by Lux Products Corporation (LUX), Power Bridge Installation, Date: Jun. 30, 2017, Pages 2, Lux Products, 4747 S. Broad Street Building 101 Suite 330, Philadelphia, Pa. 19112. https://www.luxproducts.com/wp-content/uploads/2017/10/20170628_Power-Bridge-Install-She et-V0-R13.pdf. The Lux Power Bridge installation document describes an electro-mechanical Power Bridge product. The LUX Power Bridge provides 24V AC power to thermostats in homes with 3 or more wires in the building wall and without a C-wire.

Nonpatent publication by Honeywell International Inc., THP9045A1023/U WireSaver, Date: Jul. 7, 1999, Pages 12, Honeywell Inc., 8008 Corporate Center Dr, Charlotte, N.C. 28226. http://cache-m2.smarphone.com/manuals/300673.pdf. The Honeywell THP9045A1023/U Wiresaver is a C-Wire Adapter for Wi-Fi thermostats or RedLINK 8000 series models. The Honeywell THP9045A1023/U Wiresaver is an electro-mechanical adaptor that works with Honeywell thermostats and does not provide an adapter at the thermostat for other manufacturers. The Honeywell WireSaver provides 24V AC power to thermostats in homes with 3 or more wires in the building wall and without a C-wire.

Nonpatent publication by Honeywell International Inc., and Resideo Inc., T9 THERMOSTAT Installation Guide, Date: Oct. 6, 2018, Pages 32, Honeywell Inc., and Resideo Inc., 1985 Douglas Drive North Golden Valley, Minn. 55422. https://digitalassets.resideo.com/damroot/Original/10003/33-00444EF.pdf The Honeywell T9 Thermostat is a smart thermostat with a "K" Terminal to conduct two control voltage signals on one pre-existing wire in a wall of a building using a Honeywell C-wire adaptor described below (e.g., C-wire THP9045 or THP9045A1023/U or other model described above). By combining two control voltage signals on one pre-existing wire, the "K" terminal and the C-wire adaptor allow a pre-existing wire to be used as a common wire to provide power to the Honeywell T9 Thermostat and control the HVAC system with 3 or more wires in the wall of the building. The signals combined at the "K" terminal are present regardless of whether or not the "K" terminal is connected to a wire.

Nonpatent publication by Honeywell International Inc., C-WIRE ADAPTOR Installation Guide, Date: May 31, 2018, Pages 2, Home and Building Technologies, Honeywell, 715 Peachtree Street NE, Atlanta, Ga. 30308, https://digitalassets.resideo.com/damroot/Original/10003/33-00342.pdf. Page 1 provides the following statement. "The Honeywell C-Wire Adaptor provides a C wire (common wire) to power a thermostat. Only install if you do not have a C wire available to connect to your thermostat." Step 9 on page 2 of the Honeywell C-Wire Adaptor installation instructions provides the following information. "This will convert the G and Y-wires into C and K-wires." This indicates that the Honeywell T9 Thermostat combines the fan G signal and the AC compressor Y signal on the "K" terminal which is connected to the Honeywell C-wire adaptor to conduct the two control voltage signals on one pre-existing wire in a wall of a building. The Honeywell C-wire Adaptor converts the control voltage signals to full sinusoidal signals at the HVAC equipment terminal.

Nonpatent publication by Ecobee Inc., EBPEK01 Smart SI Power Extender Kit, Date: Apr. 1, 2013, Pages 2, Ecobee, Inc., 207 Queens Quay West, Suite 600 Toronto, ON M5J 1A7. https://rexel-cdn.com/Products/Ecobee/EB-PEK-01.pdf?i=3B61CFCF-FE72-4BE4-A844-E0EA EB443A31. The Ecobee EBPEK01 installation instructions describe an electro-mechanical EBPEK01 Smart SI Power Extender Kit. A common wire is required for 5-wire thermostats. If there are only 4 wires to the existing thermostat (i.e. there is no common wire), the Ecobee Power Extender Kit can be used to power the Ecobee WIFI thermostat.

Nonpatent publication by Ecobee Inc., Q&A with Stuart: The problem with Power Stealing, Date: Jan. 11, 2014, Pages: 4, Ecobee, Inc., 207 Queens Quay West, Suite 600 Toronto, ON M5J 1A7. https://www.ecobee.com/2014/01/the-problem-with-power-stealing/. The Ecobee online article describes the unreliability and failure problems with power stealing. "Power stealing is designed to charge a thermostat battery which then powers the thermostat. The challenge with power stealing is you can only steal a very small amount of power. Steal too much and you will turn the equipment on when you don't want to, steal too little and the battery and your thermostat runs down and goes dead. Obviously this is not a reliable way to power a thermostat. The other problem is that batteries lose about 20% of their capacity every year, so as every year passes, the buffer provided by the battery goes down and your chances of failure goes up. The amount of power you can steal is different when the equipment is running versus when it is off. The amount of power you can steal is less when the equipment is running With the recent cold weather, heating systems are running 12-18 hours per day, which is enough time for the thermostat battery to deplete its charge. When this happens, a thermostat may do several things internally to conserve power such as throttle down the CPU cycles, turn off the Wi-Fi radio and, worst case, shut down your heating/cooling so it can recharge. In an analysis across our customer base, we predicted power stealing will fail in 2-8% of customer installs. And a bigger problem is that when power stealing fails, it doesn't fail deterministically. In other words, reliability or failure can't be predicted at the time of install. So while it may happen during extreme weather conditions, it could also fail at any time."

Nonpatent publication by Simple Inc., Simple C-Wire Adapter Module Installation Guide, Date: May 30, 2018, Pages: 14, The Simple, Inc., 1450 Veterans Boulevard, Redwood City, Calif. 94063 USA. https://assets.website-files.com/594acebf03437f1a14504b3f/5bd877c27eec40532ebc6f80_C-Wir e %20Adapter%20Retail_20180530_HQ.pdf. The Simple installation guide describes a C-wire adaptor module. Page 1 provides the following information: "WARNING: Line voltage and millivolt systems are not supported." Page 9 shows a diode connected to a "C" terminal of the thermostat labeled "Y" and shows the cathode pointing away from the thermostat. The diode connected between the "C" and "W" terminals on the "C-Wire Adapter Module" is a separate part installed with the cathode pointing towards the thermostat. This configuration blocks any current flow between the thermostat and "C" connection (from the transformer) and prevents the thermostat battery from charging. Page 10 provides the following information: "WARNING: Do not cross the diode pair leads, or system damage may occur when energized." Pages 6-8 in the installation guide describe the connections for a 3-wire and a 2-wire installation. Tests of the C-Wire Adaptor following the 3-wire instructions on pages 6-8 allowed the battery of the smart thermostat battery to properly charge and enable control of the 3-wire 24 VAC gas heating system. The 2-wire instructions on pages 9-11 provide a drawing on page 9 showing two (2) diodes connected to the heat W terminal and the common C terminal at the thermostat. One (1) additional diode is shown between the W terminal and C terminal of the C-Wire Adaptor Module. The drawing on page 9 shows the cathodes of the diodes between the C terminal on the thermostat and the C terminal on the C-Wire Adapter Module facing each other indicating that no current can flow from the C terminal on the HVAC board to the C terminal on the thermostat. Not shown are at least two (2) diodes in the C-Wire Adapter Module. Tests of the C-Wire Adaptor following the 2-wire instructions on pages 9-11 showed that the C-Wire Adaptor did not charge the battery of the smart thermostat nor allow any control functions for a 2-wire millivolt heating system.

Nonpatent publication by Honeywell International Inc., R8845U Universal Switching Relay. Date: May 3, 2000, Pages 8, Honeywell Inc., P.O. Box 524, Minneapolis, Minn. 55408 USA. https://customer.honeywell.com/resources/Techlit/TechLitDocuments/68-0000s/68-0215.pdf. The R8845U Universal Switching Relay provides intermediate switching of line- and low-voltage devices from a line- or low-voltage controller. The R8845U may be used to replace several Honeywell or competitive switching relays and is typically applied in hydronic heating systems. The Honeywell R8845U product is 4$\frac{1}{16}$ inches wide by 6$\frac{1}{4}$ inches high by 3$\frac{1}{2}$ inches deep and cannot fit into a wall behind a thermostat or into a heating system or a gas fireplace and requires additional wires in the wall from the switching device to the thermostat. The Honeywell R8845U also requires a 120/24 VAC transformer to be located at the thermostat which is difficult to install and can result in the 120/24 VAC transformer being accidentally unplugged causing the thermostat to lose power and the heating system to not operate which can cause the temperature in the home to fall below 32 degrees Fahrenheit (° F.) and cause interior water pipes to freeze. The Honeywell R8845U requires an installer to make a cable assembly to connect the 120 VAC/24 VAC heat W voltage from the thermostat to the fan relay. The prior art connections and wiring harness are not UL approved and subject to failure.

Nonpatent publication by Honeywell International Inc., RedLINK™ Wireless System. Date: 2011, Pages 60, Honeywell Inc., P.O. Box 524, Minneapolis, Minn. 55408 USA. https://customer.honeywell.com/resources/Techlit/TechLit-Documents/69-0000s/69-2091EFS.pdf The Honeywell Redlink wireless system enables wireless control of HVAC equipment from a smart communicating thermostat, a standard thermostat, or a handheld controller.

Nonpatent publication published by Instructables, Nest Thermostat With Gas Fireplace (or Other Millivolt System), Date: Dec. 16, 2017, Pages: 3, Published by Autodesk Inc. 111 McInnis Parkway San Rafael, Calif. 94903 USA https://www.instructables.com/id/Nest-Thermostat-With-Gas-Fireplace-or-Other-Milliv/. The Do It Yourself (DIY) instructions describe how to connect a "Nest Thermostat With Gas Fireplace (or Other Millivolt System)" using a 120/24 VAC transformer installed at the thermostat and a 24 VAC fan relay installed at the gas valve using existing hot red wire to conduct a common signal to the 24 VAC fan relay and using the existing heat white wire to conduct the Nest thermostat heat signal to the 24 VAC fan relay. Page 3 of the DIY instructions shows an AC adaptor common wire connected to a fan relay common and the hot R wire connected to the Rh terminal of the smart thermostat requiring power stealing to charge the battery of the smart thermostat. When the smart thermostat call for heating is initiated, the 24 VAC heat W voltage is conducted on the existing white wire to activate the 24 VAC fan relay which closes to complete the circuit from the millivolt signal of the TH TP thermopile terminal to the TH terminal and open the gas valve. The prior art DIY requires the 120/24 VAC transformer to be located at the thermostat which is difficult to install and can result in the 120/24 VAC transformer being accidentally unplugged causing the thermostat to lose power and the heating system to not operate. The DIY requires making a cable assembly to connect the 24 VAC heat W voltage from the thermostat to the fan relay. The prior art DIY connections and DIY wiring harness are subject to failure. Page 3 of the DIY instructions provide the following disclosure "If all is well, you should now have a fully functional [smart] thermostat to operate your gas fireplace. It took a while to fully charge the battery in the [smart] so that I could configure the WiFi network settings and access the thermostat from the app." This disclosure indicates that the DIY provides very slow power stealing to charge the battery through the fan relay to the smart thermostat. Applicants made a DIY assembly based on the DIY instructions and determined that 91 minutes are required to charge the smart thermostat battery before the smart thermostat display is turned on so a user can connect the smart thermostat to a wireless network and configure the smart thermostat to control the millivolt gas fireplace or gas heating system. Power stealing causes issues during setup or when the smart thermostat is operating for long periods of time. During severely cold weather, the heating system may operate continuously or intermittently for 10 to 20 hours per day. Long periods of continuous or intermittent operation can cause the battery to drain, the smart thermostat to lose power, and the heating system to not operate. This can cause the temperature in the home to fall below 32° F., and cause interior water pipes to freeze. For 2-wire millivolt gas fireplace or heating systems with no 120/24 VAC transformer, the DIY assembly cannot be used to charge the battery of a smart thermostat without power stealing. Charging the battery of the smart thermostat with power stealing can cause reliability and safety issues. For the at least one 2-wire millivolt heating system, the DIY assembly requires installing an AC Adaptor at the thermostat which will cause increased cost, reliability, and safety issues. The DIY assembly only works for smart thermostats that steal power through a relay coil, and only charges the battery very slowly to avoid energizing the relay. Only one smart thermostat is steals power. Therefore, the DW assembly does not provide a universal power control adaptor solution for all smart thermostats.

Nonpatent publication by Lawrence Berkeley National Laboratory (LBNL), Survey of Hearth Products in U.S. Homes, Date: June 2017, Pages 93, Published by LBNL Energy Analysis and Environmental Impacts Division, Energy Efficiency Standards Group, 1 Cyclotron Rd, Berkeley, Calif. 94720, USA. https://eta.lbl.gov/sites/default/files/publications/lbnl-2001030.pdf. The LBNL survey reports "over 7 million gas-fired fireplaces installed in United States households" (p. 5). About 20% or 1.4 million gas fireplaces are controlled by a thermostat (p. 34-35), and about 71% or one million gas fireplaces have a standing pilot and millivolt gas valve and 29% or 0.4 million systems have a 24 VAC gas heating system (p. 47). The Average Energy Use (AEU) per gas fireplace is about 13.3 Million British thermal units (MBtu) per year) or 133 therms/yr (p. 55). Total energy use is 0.1 quads per year for 7 million gas fireplaces and gas heating systems (p. 6).

Nonpatent publication by the U.S. Energy Information Administration (EIA), What's New in How We Use Energy at Home: Results from EIA's 2015 Residential Energy Consumption Survey (RECS), Date: May 2017, Pages: 19. Published by U.S., Department of Energy, Energy Information Administration, Washington, DC 20585 USA, https://www.eia.gov/consumption/residential/reports/2015/overview/pdf/whatsnew_home_energ y_use.pdf. According to the U.S. EIA 2015 RECS, about 68.9 million homes use natural gas for heating and 13% do not have air conditioning. These data indicate that about 9 million US homes have the at least one 2-wire millivolt heating system or the 24 VAC system with two wires. It is likely that many more pre-existing homes do not have a common wire (see above).

Nonpatent publication by the U.S. Energy Information Administration (EIA), Space heating and water heating account for nearly two thirds of U.S. home energy use, Date:

Nov. 7, 2018, Pages: 3. Published by U.S., Department of Energy, Energy Information Agency, Washington, DC 20585 USA, https://www.eia.gov/todayinenergy/detail.php?id=37433/According to 2018 US EIA publication, the average U.S. residential gas space heating annual energy use is 36 Million British thermal units (MBtu) per year or 360 therms/yr based on the 2015 average end-use energy consumption by number of household members for 2 people. The estimated total gas space heating energy use is 0.324 quadrillion (Quad) Btu per year for 9 million gas heating systems.

BRIEF SUMMARY OF THE INVENTION

The present invention addresses the above and other needs by providing apparatus to continuously charge a smart thermostat battery and enable control of a 2-wire millivolt gas fireplace/heating system or a Heating, Ventilating, Air Conditioning (HVAC) system with at least one 24 VAC control voltage signal. The apparatus comprises one diode in a thermostat element or at least one terminal with a diode and a switch in the smart thermostat, and two diodes and a switch device in a switch element. The apparatus is configured to conduct a rectified current signal to charge the smart thermostat battery, and the at least one rectified 24 VAC control voltage signal to energize the switch device to control a HVAC system. The apparatus may be integrated into a smart thermostat with a graphical display to provide simple instructions to easily install the apparatus and the smart thermostat for a HVAC system without a common wire or a 2-wire millivolt gas fireplace/heating system.

The present invention resolves an unresolved need to charge a battery of a smart thermostat and enable control of a Heating, Ventilating, and Air Conditioning (HVAC) system with two or more pre-existing wires. The present invention Smart thermostat Power and Control (SPC) apparatus provides an electrical current to quickly and dependably charge a battery of a smart thermostat and enable the smart thermostat to provide a 24 Volts Alternating Current (24 VAC) control voltage signal or a Direct Current (DC) millivolt control signal. The 24 VAC control voltage signal may be used to control a HVAC system with 2 or more wires powered by 24 VAC transformer hereafter referred to as a 24 VAC system. The DC millivolt control signal may be used to control a gas fireplace or gas heating system with a standing gas pilot, a thermopile, and a gas valve hereafter referred to as at least one 2-wire millivolt heating system selected from the group consisting of: a 2-wire millivolt gas fireplace, and a 2-wire millivolt gas heating system. 2-wire millivolt heating systems do not have a common wire, and most 24 VAC systems do not have a common wire.

Known prior art common wire (or C-wire) adaptors only work with 3 or more wires and require two diodes at the thermostat, and two diodes and two switches at the HVAC equipment terminals. The known C-wire adaptors conduct two rectified 24 VAC control voltage signals on one pre-existing wire to allow another pre-existing wire to be used as a common wire to conduct a current to charge the battery of the smart thermostat. The known C-wire adaptors only conduct 24 VAC control voltage signals which would damage the coil of the millivolt gas valve. Therefore, known C-wire adaptors do not provide a universal solution to charge the battery of the smart thermostat and enable control of 2-wire millivolt heating system or a 24 VAC system with two or more wires. Applicable heating systems include: a gas boiler, a gas central forced-air heating system, a gas wall heating system, a gas floor heating system or a gas fireplace.

Some manufacturers provide low voltage switches to control a millivolt gas valve, but no C-wire adaptors are available to quickly and continuously charge the battery of a smart thermostat and enable the smart thermostat to control the at least one 2-wire millivolt heating system or the 24 VAC system with two wires.

The SPC apparatus only requires one diode at the smart thermostat and two diodes and one switch device at the HVAC equipment terminals. The SPC apparatus uses one pre-existing wire as a common/control wire to conduct a rectified current signal to charge the battery of the smart thermostat. The SPC apparatus also conducts a rectified 24 VAC control voltage signal to a switch to conduct a 24 VAC control voltage signal or a DC millivolt control signal.

The SPC apparatus comprises: 1) a first diode in a thermostat element or a smart thermostat (which includes the first diode and a switch), and 2) a second diode, a third diode, and a switch device in a switch element. The first diode is configured to electrically connect to a second diode in the switch element, and the first diode is further configured to conduct at least one rectified 24 VAC control voltage signal from the smart thermostat to the second diode in the switch element. The first diode is electrically connected to the second diode in the switch element using a common/control wire, which is a pre-existing repurposed wire in a building. The second diode is configured to conduct at least one signal selected from the group consisting of: a first rectified current signal to charge a battery of the smart thermostat, and the at least one rectified 24 VAC control voltage signal from the first diode to the switch device. The third diode in the switch element is configured to conduct a second rectified current signal to charge the battery of the smart thermostat. The third diode in the switch element is electrically connected to the COM B terminal and a power supply of the smart thermostat using the common/control wire, wherein the power supply charges the battery of the smart thermostat. The switch device is configured to conduct at least one output control voltage signal based on receiving the at least one rectified 24 VAC control voltage signal from the first diode wherein the at least one output control voltage signal is selected from the group consisting of: a millivolt signal, and at least one 24 VAC control voltage signal.

The SPC apparatus conducts at least one rectified current signal selected from the group consisting of: a first rectified current signal to charge the battery of the smart thermostat through the second diode and the common/control wire to the COM B terminal of the smart thermostat when there is no call for heating (or other control), and a second rectified current signal to charge the battery of the smart thermostat through the third diode and the common/control wire to the COM B terminal of the smart thermostat independent of the call for heating (or other control). The first rectified current signal is not required for all smart thermostats due to the power supply being able to charge the battery of the smart thermostat with only a positive hot R signal and the second rectified current signal.

Known smart thermostats use 24 VAC control voltage signals to operate the HVAC system, but 24 VAC voltage control signals cannot be used to control a millivolt gas valve for the at least one 2-wire millivolt heating system (including a gas central forced air heating system, a gas wall heating system, or a gas floor gravity heating system) with a standing pilot since 24 VAC control signals would damage the coil of the millivolt gas valve. Known prior art common-wire adaptors for smart thermostats do not provide a dry contact relay (with dry contacts isolated from the voltage source) to control the at least one 2-wire millivolt heating system or a mechanism to control a 24 VAC system without a pre-existing common wire available at the thermostat.

Known prior art switching relays enable switching functions, but require additional wires in the wall from the switching device to the thermostat and cannot reliably provide electric power and millivolt switching functions using only two existing wires in the wall. Known prior art installation instructions do not provide enabling disclosures for a C-wire adaptor that can quickly charge the battery at start-up or provide dependable and reliable power for all smart thermostats to control the at least one 2-wire millivolt heating system during severely cold weather when the heating system can operate for 10 to 20 hours per day which can cause the battery to drain down and the smart thermostat to lose power and the heating system to not operate which can cause the temperature in the home to fall below 32° F. and cause water pipes to freeze in the home.

The SPC apparatus comprises two components: (1) a thermostat element installed at the smart thermostat, and (2) a switch element installed at the HVAC system equipment terminal block to provide a current signal to charge the battery of the smart thermostat and enable control of the HVAC system. The thermostat element may include a first diode and the switch element may include a second diode, a third diode, and a switch device. The thermostat element may be embodied in an integrated smart thermostat. The "integrated smart thermostat" may include at least one diode and at least one switch to connect to the switch element using a re-purposed wire.

The integrated smart thermostat may use a stand alone switch element installed at the HVAC system, or the switch element may be embodied in the HVAC equipment. If the thermostat element is integrated within the smart thermostat (and/or the HVAC system), then the smart thermostat may use a software application to enable proper installation of wire connections to the smart thermostat, the HVAC system, and the 120/24 VAC transformer. The switch element may also be embodied within a 24 VAC system. The SPC apparatus may be further integrated within a smart thermostat and/or a 24 VAC system to enable control of a 24 VAC system without a common wire.

Known smart thermostats include at least the following parts: a display, input device (e.g., touch screen, ring plus press selection, or key pad), WIFI and/or bluetooth communication, temperature and humidity sensors, input/output control voltage terminals, common terminal, hot R terminal, terminals able to detect a wire connection, occupancy or motion detector sensor, a microprocessor, diodes, switches, relays, speaker, speech recognition microphone, economizer controller input/output command protocols, etc. An integrated smart thermostat may also include at least one diode, at least one switch, at least one terminal, and software to conduct a rectified control voltage signal or a rectified current signal to charge a battery of the smart thermostat. The term "integrated smart thermostat" is used to describe a "smart thermostat" with a switch to connect a first diode between a control voltage terminal and a common terminal to conduct at least one signal selected from the group consisting of: a rectified 24 VAC control voltage signal, and a rectified current signal. The rectified 24 VAC control voltage signal is conducted from the first diode to the second diode to energize a switch device in the switch element to conduct at least one signal selected from the group consisting of: a millivolt control signal, and a 24 VAC control voltage signal. The rectified current signal is conducted from the COM B terminal of a 120/24 VAC system transformer to the COM B terminal of the smart thermostat to charge the battery of the smart thermostat. The term "integrated smart thermostat" does not limit or preclude any other features, parts, functions, or attributes that might be included in a smart thermostat.

The SPC apparatus may be configured to conduct the at least one 24 VAC control voltage signal selected from the group consisting of: a heat W signal, an AC compressor Y signal, a fan G signal, a reversing valve O/B signal, a Y2 signal, a W2 signal, an occupancy sensor OCC signal, and an exhaust fan AUX signal. In another embodiment, the SPC apparatus may enable conducting at least one more 24 VAC control voltage signal than is supported by pre-existing thermostat wire in a wall of a building through the thermostat element, the common/control wire, and the first switch element. The 24 VAC output from the switch device may be conducted to at least one device selected from the group consisting of: a HVAC system, a HVAC fan, an ultraviolet lamp assembly, a humidifier, and an exhaust fan, wherein the at least one 24 VAC control voltage signal is selected from the group consisting of: an auxiliary signal, an occupancy sensor signal, a humidity sensor signal, and a ion counter signal.

The integrated smart thermostat may be configured to provide at least one software graphical display, message, or instructional step to show that a common wire is not connected to the COM B terminal of the smart thermostat common, and how to connect at least one HVAC control wire to the COM B terminal of the smart thermostat to repurpose the at least one HVAC control wire as a common/control wire. The software may also show how to connect the switch element to the HVAC system or show how the HVAC control wire is correctly moved to the COM B terminal of the smart thermostat to repurpose the HVAC control wire to charge the battery of the smart thermostat and conduct at least one rectified 24 VAC control voltage signal. The software may also show that the smart thermostat is properly configured to energize a switch to connect the rectified 24 VAC control voltage signal from a pre-existing wire terminal through the diode to the COM B terminal and show that the rectified 24 VAC control voltage signal is properly controlling the HVAC system or another device controlled by the rectified 24 VAC control voltage signal.

Smart thermostats have been available since 2008, but no power or heating control adaptors are available to resolve the unresolved need to charge the battery of a smart thermostat and enable the smart thermostat to control the at least one 2-wire millivolt heating system with a standing pilot and a millivolt gas valve or a 24 VAC system with 2 pre-existing wires available in the wall at the thermostat. The SPC apparatus uses a Time-Division Multiplexing (TDM) process for transmitting a rectified current and a rectified voltage control signal over the same common/control wire. The SPC apparatus conducts each current or voltage signal on a single common/control wire for a fraction of time in an alternating pattern based on a polarity of a hot R voltage signal from a hot R terminal of a 120/24 VAC transformer.

According to the 2017 US EIA RECS Survey only "one in eight U.S. homes uses a programmed thermostat with a central air conditioning unit" indicating that about 13.4 million US homes or 12% have a common wire installed at the thermostat. Therefore, approximately 98.6 million or 88% of US homes do not have a common wire at the thermostat. Common wires were generally not installed in homes until the 1980s in California, and after 1995 in the rest of the US. The SPC apparatus enables smart thermostats to automatically detect the at least one 2-wire millivolt heating system or a 24 VAC system, and guide homeowners or installers to properly repurpose a pre-existing thermostat wire for a common/control wire to charge the battery of the smart thermostat and control the at least one 2-wire millivolt heating system or the 24 VAC system.

The SPC apparatus is configured to conduct a bidirectional current signal before or after a call for heating (or other control) to charge the battery of the smart thermostat. The SPC apparatus is also configured to conduct a rectified current signal during the call for heating to charge the battery, and also conduct a rectified voltage signal to enable the smart thermostat to control the at least one 2-wire millivolt heating system and the 24 VAC system.

The smart-thermostat power control apparatus comprises an integrated smart thermostat and a switch element. The integrated smart thermostat comprises a first diode and at least one switch configured to conduct at least one 24 VAC control voltage signal selected from the group consisting of: a heat W signal, an AC compressor Y signal, a fan G signal, a reversing valve O/B signal, a Y2 signal, a W2 signal, an occupancy sensor OCC signal, and an exhaust fan AUX signal. The at least one switch may be electrically connected to at least one terminal selected from the group consisting of: a heat W terminal, an AC compressor Y terminal, a fan G terminal, a reversing valve O/B terminal, a Y2 terminal, a W2 terminal, an occupancy sensor OCC terminal, an exhaust fan AUX terminal or any other thermostat control terminal. Alternatively, multiple independent switches could be used on each of the above terminals to connect to the first diode or multiple diode/switch pairs could be included in the integrated smart thermostat. Alternatively, the first diode in the integrated smart thermostat may be embodied in a thermostat element to work with all smart thermostats. The switch element comprises a second diode, a third diode, and a switch device. The second diode is configured to conduct a first rectified current signal to charge a battery of the smart thermostat and further configured to conduct a rectified heat W voltage signal during a call for heating to energize a switch device. The third diode is configured to conduct a second rectified current signal to charge the battery of the smart thermostat independent of a call for heating. The switch device may be configured to receive a common signal from a 120/24 VAC transformer and conduct at least one output voltage signal selected from the group consisting of: a millivolt signal, and a 24 VAC voltage signal. When the switch device is connected to a common terminal of the 120/24 VAC transformer and the common/control wire of the smart thermostat, the switch device will charge the battery of the smart thermostat and enable the smart thermostat to control the at least one 2-wire millivolt heating system. The 24 VAC voltage signal enables the smart thermostat to control a 24 VAC system or other device.

The SPC apparatus differs from the know prior art C-wire adaptors as follows: 1) the SPC apparatus requires only two wires to charge a smart thermostat battery and control a 24 VAC system, or a millivolt gas fireplace/furnace, 2) the SPC apparatus only uses one diode in the thermostat element and two diodes in the switch element to transmit and receive a rectified current signal to charge the battery of the smart thermostat before, and after the call for heating. For integrated smart thermostat embodiment, the SPC apparatus uses one diode, a switch, and a COM B terminal to connect to the switch element, 3) The SPC apparatus transmits and receives at least one rectified current signal and at least one rectified voltage signal during the call for heating wherein the rectified current and voltage signals are conducted for a fraction of time in an alternating pattern based on a polarity of a hot R voltage signal from the hot R terminal of a 120/24 VAC transformer, and wherein each signal is transmitted or received by the thermostat element and the switch element, 4) The SPC apparatus transmits and receives at least one voltage signal selected from the group consisting of: a millivolt signal, and a 24 VAC control signal to enable the smart thermostat to control at least one space conditioning system selected from the group consisting of: a 24 VAC system, the at least one 2-wire millivolt heating system, 5) known prior art C-wire adaptors require at least 3 wires and two or more diodes in the thermostat element and two or more diodes in the switch element to rapidly charge a smart thermostat battery with a dedicated common wire (non TDM), and 6) known prior art C-wire adaptors do not combine a voltage signal and current signal on one pre-existing wire to continuously charge the battery of a smart thermostat or enable a smart thermostat to control the at least one 2-wire millivolt heating system.

The known prior art DIY assembly (described on www.instructables.com) does not provide a common wire connection to a smart thermostat and does not provide a continuous current to charge a battery of the smart thermostat. The DIY uses a pre-existing red wire as a common-wire and a pre-existing white wire as a continuous 24 VAC control signal during the smart communicating call for heating to operate a standard HVAC fan relay to control a 2-wire-millivolt gas heating system. The DIY assembly requires the smart thermostat to power steal and slowly charge its battery using the pre-existing white wire and the coil of the standard HVAC fan relay. It takes about 91 minutes for a smart thermostat to charge its battery using the DIY assembly. Only one smart thermostat is configured to steal power. Therefore, the DIY assembly does not provide a universal power control adaptor solution for all smart thermostats. Power stealing can cause a smart thermostat to lose battery power and shut down the heating system so it can recharge its battery during cold weather when a heating system is operating 12 to 18 hours per day. If a heating system is shut down during severe cold weather without back-up heat, then water can freeze in the plumbing system and cause damage.

The SPC apparatus is not obvious to persons having ordinary skill in the art based on the following secondary considerations of non-obviousness per MPEP 2141 (II). (1) Commercial success of hardware store chain customers pre-ordering the SPC apparatus based on integrated and in easy-to-install design to charge the battery of a smart thermostat and to control a 24 VAC system or the at least one 2-wire millivolt heating system. (2) SPC apparatus provides a universal solution to meet long-felt but unresolved needs to charge the battery of a smart thermostat and to control a 24 VAC system or the at least one 2-wire millivolt heating system. (3) Failure of others based on smart thermostats being available on the market since 2008, but no products are available to provide a universal solution for the unresolved need to charge the battery of a smart thermostat and to control a 24 VAC system or the at least one 2-wire millivolt heating system. (4) No products exist so there are no copies of invention by others. (5) Praise by others is indicated by hardware store chain customers placing orders for the SPC apparatus with isolated-dry-contact relay. (6) Considerable testing was required to reach conclusion of long-standing need for a SPC apparatus with isolated-dry-contact relay to charge the battery of a smart thermostat and to control a 24 VAC system or the at least one 2-wire millivolt heating system. (7) Unexpected and non-obvious results include: 7a) known prior art C-wire adaptors do not provide two methods of charging the smart thermostat battery on a 24 VAC system, one method before and after the call for heating and another method when the thermostat is calling for heat and with no battery the thermostat cannot control a 24 VAC system; 7b) known prior art C-wire adaptors do not charge the smart thermostat battery on the at least one 2-wire millivolt heating system and a 24 VAC thermostat signal will destroy a millivolt gas valve by providing too much current to the coil of the gas valve; 7c) DIY assembly (www.instructables.com) with 24 VAC transformer installed at the thermostat (outside wall or inside wall) can accidentally be unplugged causing the thermostat to lose power; 7d) DIY assembly requires fabricating custom cable assembly to connect 24 VAC heat W voltage to fan relay which can fail, and 7e) DIY assembly requires 91 minutes to charge the battery, and can cause loss of battery power during severe cold weather and water pipes freezing in home (per p. 3 of www.instructables.com document: "If all is well, you should now have a fully functional Nest thermostat to operate your gas fireplace. It took a while to fully charge the battery in the Nest so that I could configure the WiFi network settings and access the thermostat from the app"); 7f) Power stealing is unreliable and prone to failure since power stealing can only steal very small amounts of power (stealing too much turns off equipment and stealing too little drains the battery and batteries lose 20% of their capacity every year), and during cold weather when heating systems operate 12-18 hours per day the battery gets depleted which causes smart thermostats to fail. (https://www.ecobee.com/2014/01/the-problem-with-power-stealing/.

There are no published technical documents, teaching, suggestions or motivation in the prior art that would have led persons having ordinary skill in the art to modify a prior art reference or to combine a prior art reference teaching to arrive at the invention. Testing of the prior art Simple C-wire adaptor showed that the product did not charge the smart thermostat battery and the 24 VAC heat signal damaged the millivolt gas valve by providing too much current to the coil of the gas valve. Testing of the DIY assembly per instructions from www.Instructables.com showed that it took 91 minutes to charge the battery of the smart thermostat and the DIY assembly requires power stealing which causes loss of battery power during severe cold weather and water pipes freezing in the home. Combining the prior art does not provide an easy-to-install universal solution for the long-felt unresolved need to charge the battery of a smart thermostat without a common wire and to control the at least one 2-wire millivolt heating system or control the 24 VAC system.

BRIEF DESCRIPTION OF THE SEVERAL VIEWS OF THE DRAWINGS

The above and other aspects, features and advantages of the Smart-thermostat Power Control (SPC) apparatus will be more apparent from the following more particular description thereof, presented in conjunction with the following drawings wherein:

FIG. 8A shows a back plate and a head unit of a smart thermostat and a first diode, at least one switch, and a COM B terminal (shown abbreviated as a "C" terminal) in the integrated smart thermostat eliminating the need for a thermostat element FIG. 8B shows the smart-thermostat power and control apparatus including the integrated smart thermostat and a common/control wire connected to a switch element which is connected to the at least one 2-wire millivolt heating system.

FIG. 8C shows a smart-thermostat power and control apparatus including the integrated smart thermostat with a first diode and a switch, a COM B terminal connected to a common/control wire which is connected to a switch element which is connected to a 24 VAC system.

FIG. 8D shows a smart-thermostat power and control apparatus including an integrated smart thermostat with a first diode, at least one switch, and the COM B terminal in the smart thermostat eliminating the need for a thermostat element. The integrated smart thermostat is connected to an integrated 24 VAC system.

FIG. 8E shows a smart-thermostat power and control apparatus including an integrated smart thermostat with at two diodes eliminating the need for a thermostat element. The integrated smart thermostat is connected to an integrated 24 VAC system.

Corresponding reference characters indicate corresponding elements throughout the several views of the drawings.

DETAILED DESCRIPTION OF THE INVENTION

Figure 1A:
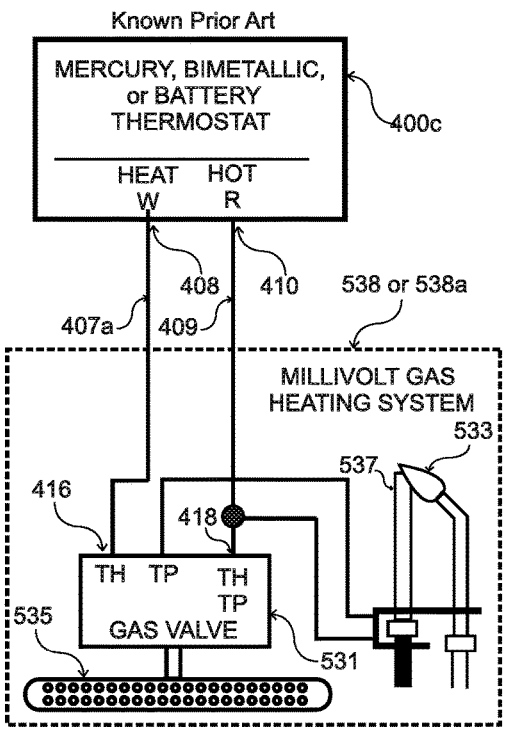
FIG. 1A shows the known prior art connections between a mercury, a bimetallic, or a battery-powered thermostat and at least one 2-wire millivolt heating system selected from the group consisting of: a 2-wire millivolt gas fireplace, and a 2-wire millivolt gas heating system. No common (COM) B terminal or common wire is shown in FIG. 1A.

The following description of the Smart-thermostat Power and Control (SPC) apparatus is of the best mode presently contemplated for carrying out the invention. This description is not to be taken in a limiting sense, but is made merely for the purpose of describing one or more preferred embodiments of the invention. The scope of the invention should be determined with reference to the claims.

Voltage signals and electrical current currents are identified as dashed or solid lines on the drawings and further identified with element numbers within circles, squares, or diamonds. Voltage or current signals always energized are identified with a number inside a circle. Voltage or current signals only energized during a call for heating are identified with a number inside a square. Voltage or current signals only energized with no call for heating are identified with a number inside a diamond. The signals that are always energized include: a hot R voltage signal 551, a Millivolt signal 554 (from the TH TP terminal 418 of the millivolt gas valve 531 shown in FIG. 1A and FIG. 1B), and a second rectified current signal 652.

FIG. 1A shows the known prior art connections and signals between a mercury, a bimetallic, or a battery-powered thermostat 400c and a millivolt gas valve 531 of at least one 2-wire millivolt heating system selected from the group consisting of: a 2-wire millivolt gas fireplace 538a, and a 2-wire millivolt gas heating system 538. A smart thermostat could not be used in this application since there are no 24 Volts Alternating Current (24 VAC) signals available to charge the battery of the smart thermostat. Furthermore, conducting a 24 VAC control voltage signal to a millivolt gas valve 531 will damage the millivolt gas valve 531. A 24 VAC signal from a smart thermostat will overload and cause failure of a coil winding used to control the millivolt gas valve 531 which is rated to operate with a Direct Current (DC) millivolt signal. Known prior art C-wire adaptors do not provide a solution to resolve an unresolved need to provide an electrical current to quickly and dependably charge a battery of a smart thermostat, and enable the smart thermostat to control the at least one 2-wire millivolt heating system.

Figure 1B:
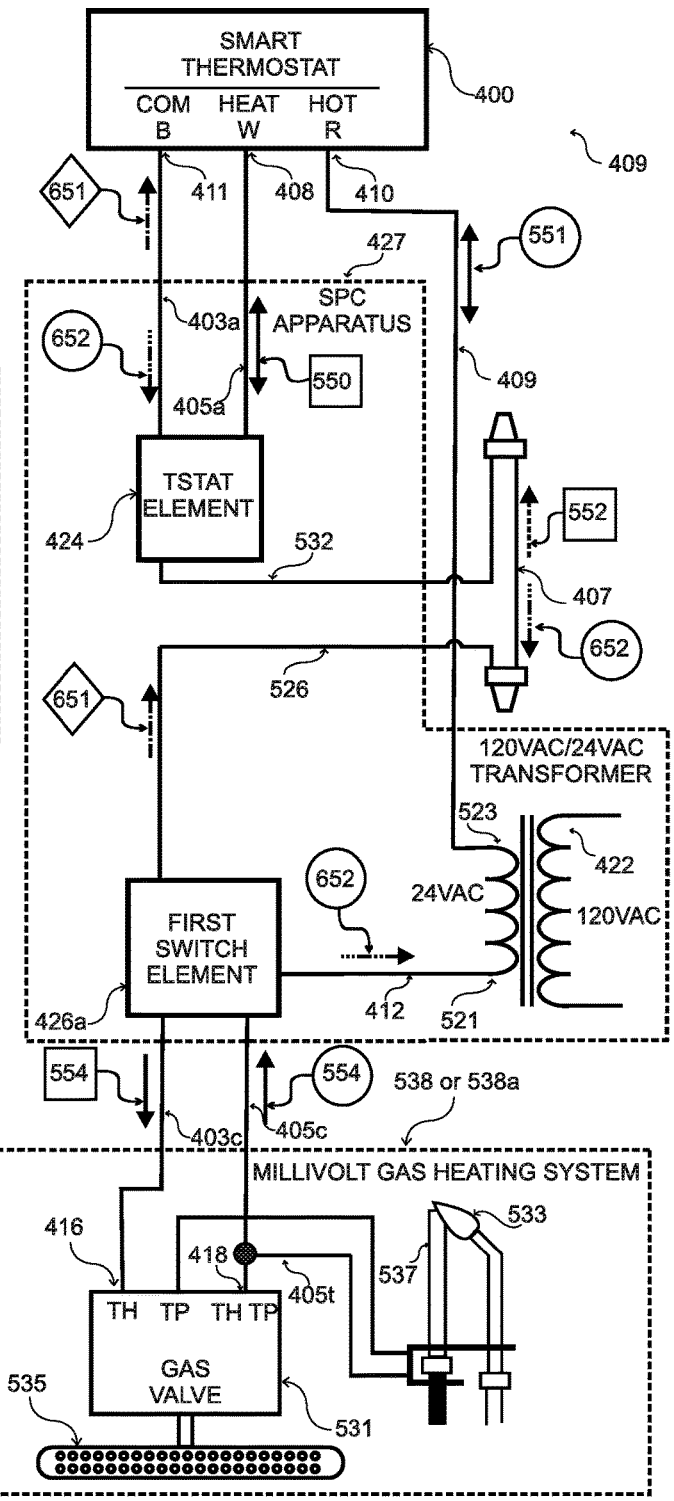
FIG. 1B shows the smart thermostat connected to the Smart thermostat Power Control (SPC) apparatus, and the at least one 2-wire millivolt heating system with the thermostat element and the switch element of the SPC apparatus to enable control of a millivolt gas valve to quickly and reliably charge the battery of a smart thermostat from a 120/24 Volts Alternating Current (24 VAC) transformer.

FIG. 1B shows electrical elements, connections, and electrical signals for an embodiment of the SPC apparatus 427 to control the at least one 2-wire millivolt heating system. The COM B terminal 411 of the smart thermostat 400 is connected to the thermostat element common wire 403a of the thermostat element 424, and the heat W terminal 408 is connected to the thermostat element control wire 405a of the thermostat element 424. For a heating system with at least two pre-existing wires, one wire is typically a heat W wire 407a and one wire is a hot R wire 409. The heat W wire 407a (shown in FIG. 1A and FIG. 2A) is repurposed as a common/control wire 407. The common/control wire 407 is a pre-existing wire in the wall of a building, used by the SPC apparatus but not included in the SPC apparatus. The common/control wire 407 is a pre-existing wire in the wall of a building, used by the SPC apparatus but not included in the SPC apparatus. FIG. 1B shows the common/control wire 407 outside the envelope of the SPC apparatus 427 and electrically connected to the thermostat element link wire 532 of the thermostat element 424 and the switch element link wire 526 of the first switch element 426a using wire nuts. The first switch element 426a is connected by a switch element hot wire 405c to the millivolt gas valve 531 TH TP terminal 418 to receive the 750 millivolt (mV) signal (signal may vary from 350 to 850 mV) generated by the thermopile 537, by a switch element control wire 403c to the millivolt gas valve 531 TH terminal 416 to energize the millivolt gas valve during a call for heating. The ~750 mV signal is conducted from the thermopile 537 to the TH TP terminal 418 using a wire 405*t*. The first switch element 426*a* is also connected to common terminal 521 of the 120/24 VAC transformer 422. The SPC apparatus 427 provides a first rectified current signal 651 to charge the battery 404 (see FIG. 4A) of the smart thermostat 400 before or after the call for heating, and also provides a second rectified current signal 652 to charge the battery 404 independent of a call for heating. The SPC apparatus 427 enables the smart thermostat 400 to control the at least one 2-wire millivolt heating system using a first diode 501 in the thermostat element 424 to convert the heat W voltage signal 550 (24 VAC) to a rectified heat W control voltage signal 552 conducted on the common/control wire 407 to energize a first switch device 557*a* in the first switch element 426*a* to connect a Direct Current (DC) DC millivolt gas valve signal referred to as the millivolt signal 554 (millivolt signal generated by the thermopile 537) to the TH terminal 416 of a millivolt gas valve 531 to open a millivolt gas valve 531 and allow a standing gas pilot flame 533 to ignite a gas burner 535. The 120/24 VAC transformer 422 provides a hot R voltage signal 551 to the hot R terminal 410 of the smart thermostat 400. The thermostat element common wire 403*a*, the thermostat element control wire 405*a*, and the thermostat element link wire 532 of the thermostat element 424 could be embodied as terminals rather than wires. The switch element link wire 526, the switch element control wire 403*c*, switch element hot wire 405*c*, and the switch element common 412 of the first switch element 426*a* could be embodied as terminals rather than wires.

Figure 1C:
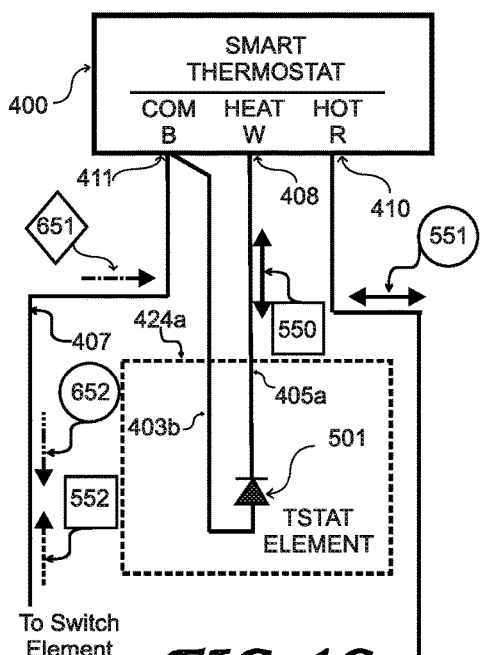
FIG. 1C shows an embodiment of the thermostat element as a two terminal device with a single diode.

FIG. 1C shows electrical elements, connections, and electrical signals for another embodiment of the thermostat element 424*a*. The first switch element 426*a* which is required is not shown. In this embodiment, the thermostat element 424*a* is a first diode 501 connected to the heat W terminal 408 using a thermostat element control wire 405*a* and the COM B terminal 411 of the smart thermostat 400 using a wire 403*b* (which might be included on the first diode 501). The common/control wire 407 is a pre-existing wire in the wall of a building, used by the SPC apparatus but not included in the SPC apparatus. For this embodiment, the thermostat element 424*a* can be manufactured with only one diode and fewer wires. However, many smart thermostats will not accommodate more than one wire in a terminal connection such as the COM B terminal 411. Therefore, this embodiment, may be unsuitable for all smart thermostats.

Figures 2A, 2B:
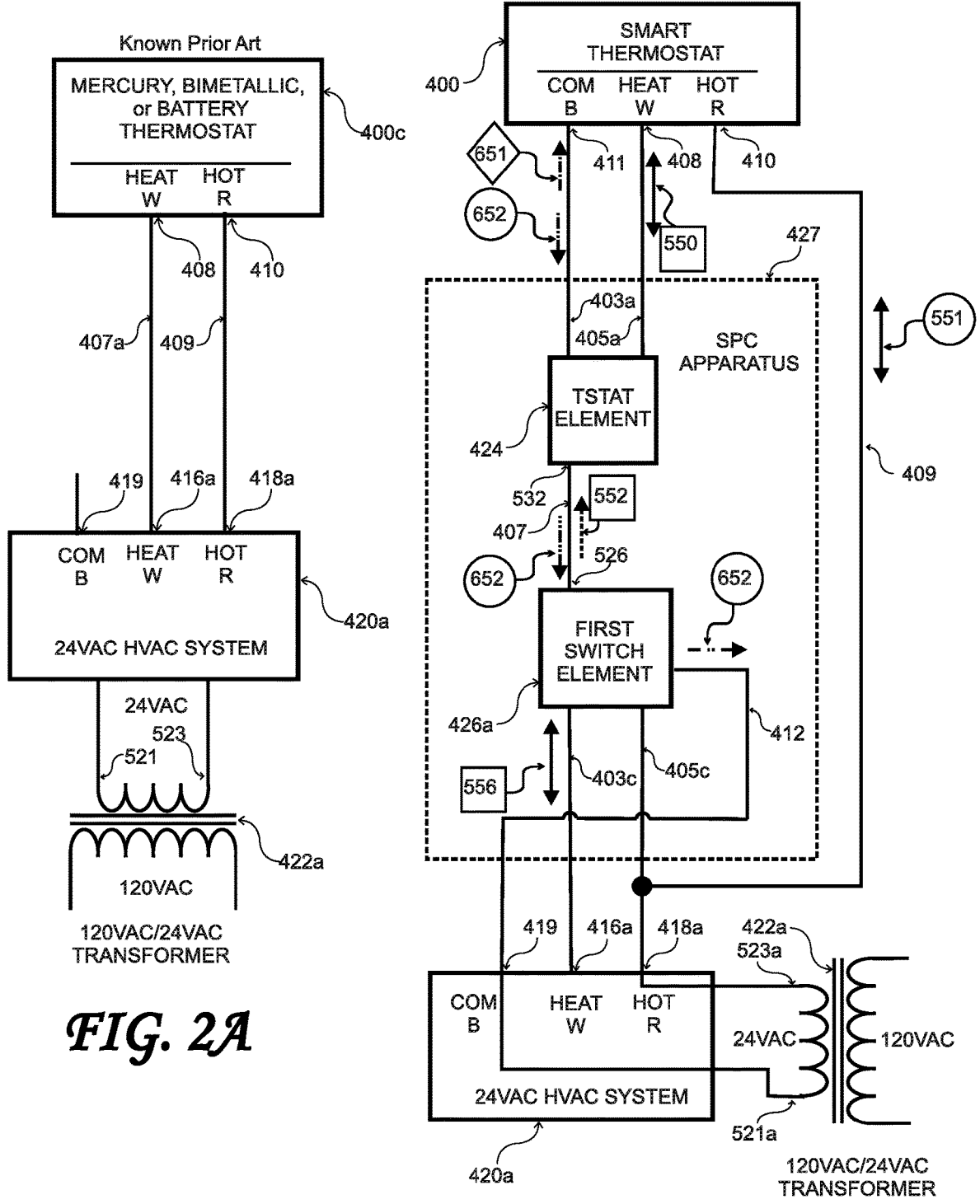
FIG. 2A shows the known prior art connections between a mercury, a bimetallic, or a battery-powered thermostat and a Heating, Ventilating, Air Conditioning (HVAC) system with 2 or more wires powered by 24 VAC transformer hereafter referred to as a 24 VAC system. No common (COM) B terminal or common wire is shown in FIG. 2A.
FIG. 2B shows the connections between the smart thermostat, the SPC apparatus, and the 24 VAC system with a 120/24 VAC transformer with the thermostat element and the switch element of the SPC apparatus to enable control of the heating system and quickly charge the battery of the smart thermostat from a 120/24 VAC transformer.

FIG. 2A shows the known prior art connections between a mercury, a bimetallic, or a battery-powered thermostat 400*c* and the 24 VAC system 420*a* with a 120 VAC/24 VAC transformer 422*a* and no common wire connection from the 24 VAC system 420*a* to the mercury, the bimetallic, or the battery-powered thermostat 400*c*. FIG. 2A shows the heat W terminal 416*a*, hot R terminal 418*a*, and COM B terminal 419 of the 24 VAC system 420*a*. While some manufacturers claim a power stealing method will charge the smart thermostat battery, power stealing is not a universal solution. The known prior art common-wire (or C-wire) adaptor conducts two 24 VAC control voltage signals from the smart thermostat to the equipment terminals of a Heating, Ventilating, Air Conditioning (HVAC) system, and allows one pre-existing thermostat wire to be used as a common wire to conduct a current to charge the battery of the smart thermostat. However, the known prior art common-wire adapters require at least three wires to operate properly including: 1) a hot R wire, 2) a common wire, and 3) at least one 24 VAC control voltage wire. The hot R wire and the common wire provide an electrical circuit to charge the battery of the smart thermostat to provide reliable electrical power to support wireless communication, and the at least one 24 VAC control voltage wire is required to control the HVAC system. When only two pre-existing wires are available in the wall of a building, the known prior art C-wire adaptors do not provide a universal solution to resolve an unresolved need to provide an electrical current to quickly and dependably charge a battery of a smart thermostat and enable the smart thermostat to control the at least one space conditioning system.

FIG. 2B shows the electrical elements, connections, and electrical signals for an embodiment of the SPC apparatus 427 to control a 24 VAC system 420*a* with a 120 VAC/24 VAC transformer 422*a* and at least two pre-existing wires a heat W wire 407*a* and a hot R wire 409. The COM B terminal 411 of the smart thermostat 400 is connected to the thermostat element common wire 403*a* of the thermostat element 424, and the heat W terminal 408 is connected to the thermostat element control wire 405*a* of the thermostat element 424. The heat W wire 407*a* shown in FIG. 1A and FIG. 2A is repurposed as a common/control wire 407. The common/control wire 407 is a pre-existing wire in the wall of a building, used by the SPC apparatus but not included in the SPC apparatus. The common/control wire 407 is electrically connected to the thermostat element link wire 532 of the thermostat element 424 and the switch element link wire 526 of a first switch element 426*a*. The 24 VAC system 420*a* passes the hot R voltage signal 551 from the hot R terminal 523*a* of the 120 VAC/24 VAC transformer 422*a* to hot R terminal 418*a* of the 24 VAC system 420*a* and the common from the common terminal 521*a* of the 120 VAC/24 VAC transformer 422*a* to the 24 VAC system 420*a* COM B terminal 419. Connecting hot R terminal 410 of the smart thermostat 400 to the hot R terminal 418*a* of the 24 VAC system 420*a* is the equivalent of connecting the hot R terminal 410 of the smart thermostat 400 to the hot R terminal 523 of the 120/24 VAC transformer 422 shown in FIG. 1B. Connecting the COM B terminal 411 of the smart thermostat 400 to the COM B terminal 419 of the 24 VAC system 420*a* is the equivalent of connecting the COM B terminal 411 of the smart thermostat 400 to the common terminal 521 of the 120/24 VAC transformer 422 shown in FIG. 1B. The SPC apparatus 427 provides the same functions as described in FIG. 1A to charge the battery 404 of the smart thermostat 400. By connecting the switch element hot wire 405*c* to the hot R terminal 418*a* of the 24 VAC system 420*a*, allows the smart thermostat 400 to provide a 24 VAC voltage signal 556 from the first switch device 557*a* on the switch element control wire 403*c* to the heat W terminal 416*a* of the 24 VAC system 420*a* to initiate the call for heating.

Figure 2C:
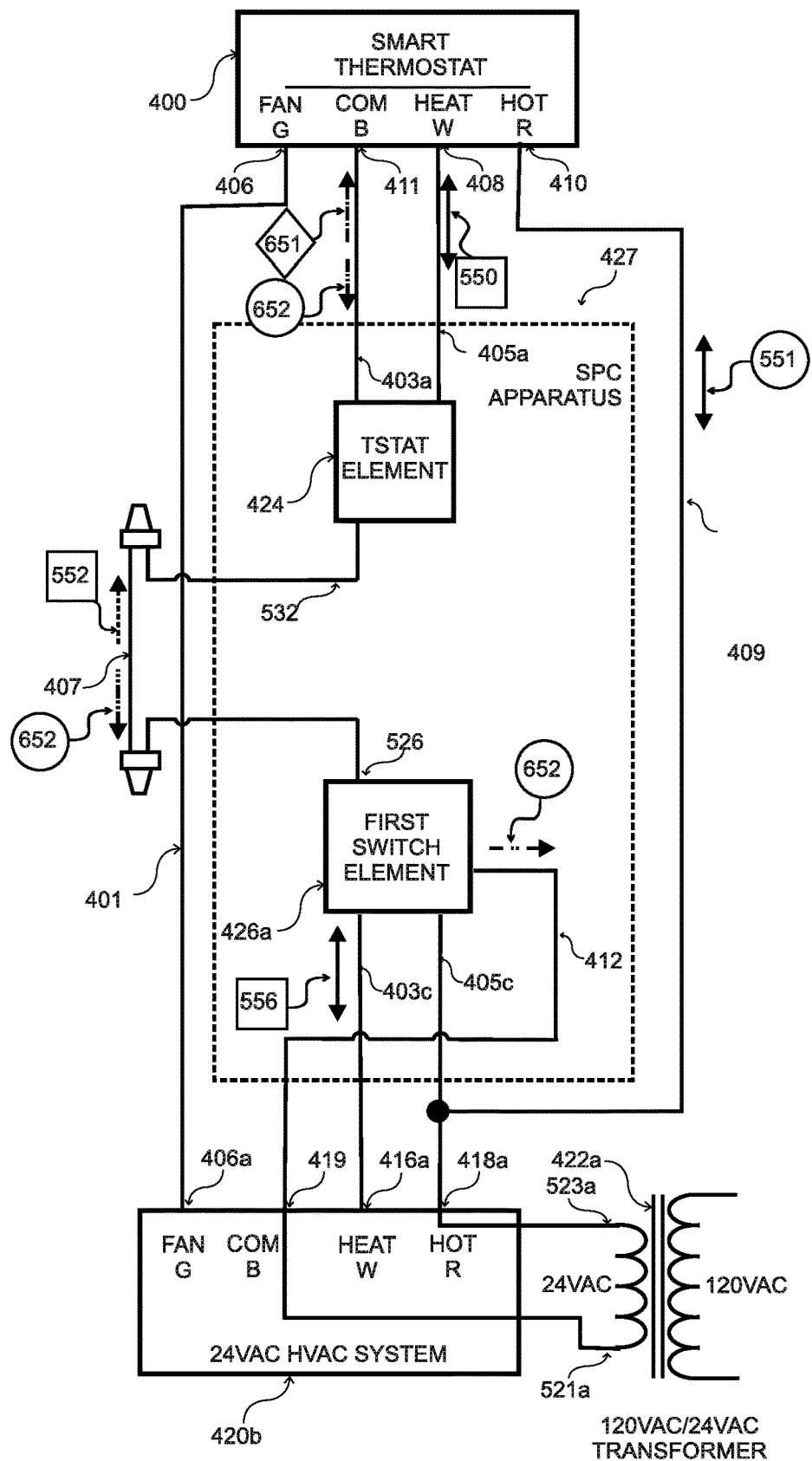
FIG. 2C shows the connections between the smart thermostat, the SPC apparatus, and a 24 VAC system with a 120 VAC/24 VAC transformer. The functionality is similar to FIG. 2B with the addition of the wire 401 which is connected between the smart thermostat fan G terminal and the fan G terminal of the 24 VAC system.

FIG. 2C shows the components, connections, and electrical signals for an embodiment of the SPC apparatus 427 to control a 24 VAC system 420*b* with a 120 VAC/24 VAC transformer 422*a*. The functionality is similar to FIG. 2B with the addition of the wire 401 which is connected between the fan G terminal 406 of the smart thermostat 400 and the fan G terminal 406*a* of the 24 VAC system 420*b*. FIG. 2C shows the SPC apparatus can be used in any HVAC system with at least two wires. One of the at least two wires is, the heat W wire 407*a* shown in FIG. 1A and FIG. 2A which is repurposed as a common/control wire 407. The other wire is a hot R wire connected to either a hot R terminal 418*a* of a 24 VAC system 420*a* or a hot R terminal 523*a* of a 120/24 VAC transformer 422*a*. The COM B terminal 411 of the smart thermostat 400 is connected to the thermostat element common wire 403*a* and the heat W terminal 408 is connected to the thermostat element control wire 405a of the thermostat element 424. The common/control wire 407 is a pre-existing wire in the wall of a building, used by the SPC apparatus but not included in the SPC apparatus. FIG. 2C shows the common/control wire 407 outside the envelope of the SPC apparatus 427 and electrically connected to the thermostat element link wire 532 of the thermostat element 424 and the switch element link wire 526 of the first switch element 426a using wire nuts. A 24 VAC system can also use the SPC apparatus to supply a first rectified current signal 651 (before or after the call for heating) and a second rectified current signal 652 (independent of a call for heating) to the COM B terminal 411 to charge the battery 404 of the smart thermostat 400. The SPC apparatus provides additional functionality for HVAC systems with heating and air conditioning. If the HVAC system has at least two wires at the thermostat location, then the SPC apparatus can be used in an HVAC system with at least 3 wires to allow one of the existing wires to be re-purposed to carry additional signals from the thermostat to an HVAC economizer, fan, or other device. For example, an occupancy sensor signal can be carried on the SPC apparatus to turn off an HVAC fan during unoccupied periods. A dehumidification/humidification control signal or a fan control signal can also be added with the SPC apparatus without installing separate control wires in the wall.

Figures 3A, 3B:
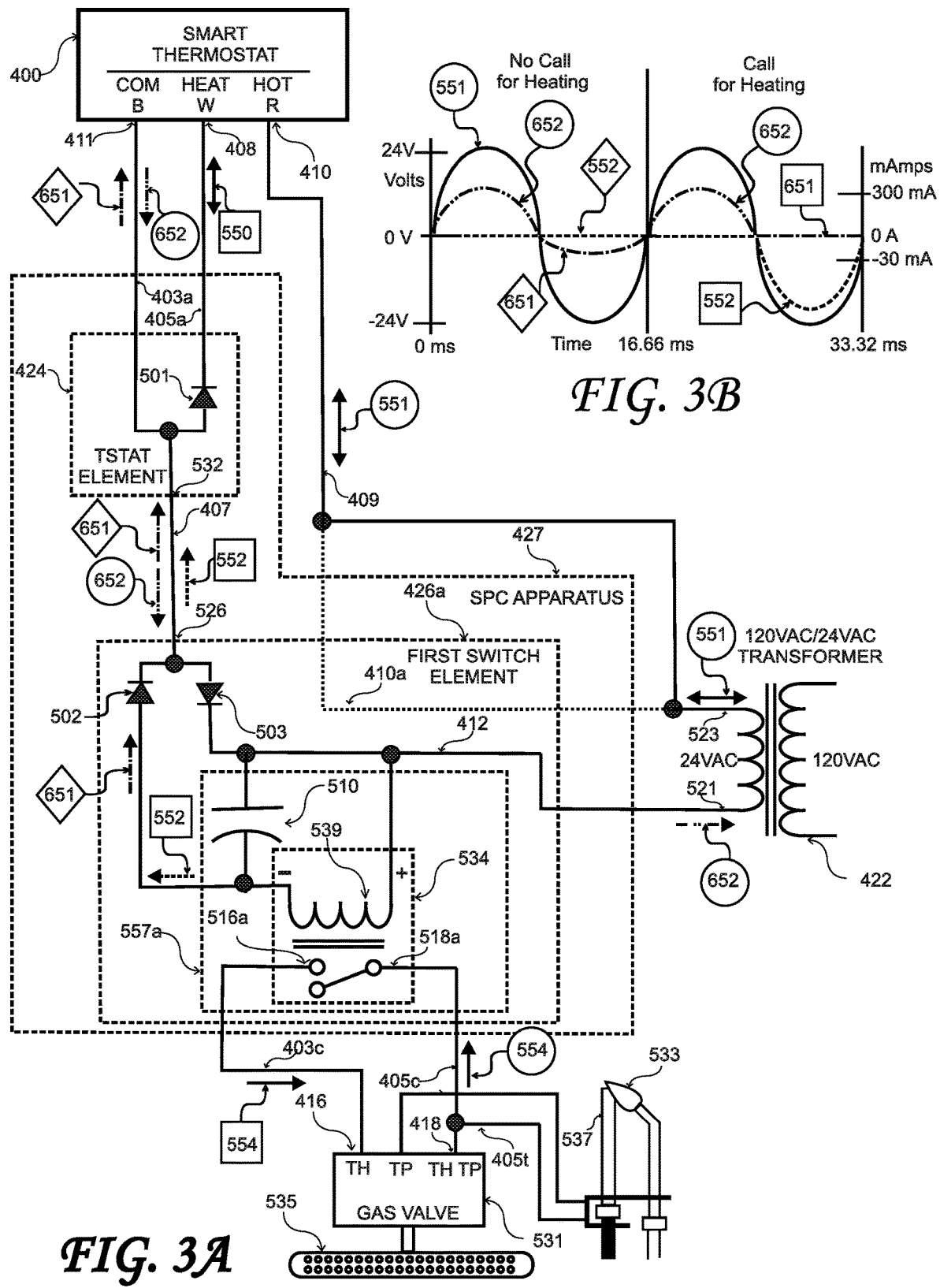
FIG. 3A shows the connections between the smart thermostat, the SPC apparatus, and the millivolt gas valve of the at least one 2-wire millivolt heating system, and electrical components and connections inside with the thermostat element and the switch element of the SPC apparatus.
FIG. 3B shows a graph of the rectified current and rectified voltage signals on the common/control wire 407 of the SPC apparatus before and during a call for heating to charge the battery 404 of the smart thermostat 400 and enable the smart thermostat 400 to control a heating system.

FIG. 3A shows the internal components, connections and electrical signals for an embodiment of the SPC apparatus 427 to charge a battery 404 of a smart thermostat 400 with or without a call for heating. The SPC apparatus is also used to control at least one 2-wire millivolt heating system selected from the group consisting of: a 2-wire millivolt gas fireplace 538a, and a 2-wire millivolt gas heating system 538. The hot R voltage signal 551 is shown as a solid line with two arrows, the rectified heat W control voltage signal 552 is shown as a dash-dash line with one arrow. The first rectified current signal 651 is shown as a dash-dot-dash line with one arrow, and the second rectified current signal 652 is shown as a dash-dot-dot-dash line with one arrow. The first rectified current signal 651 and the second rectified current signal 652 flow in opposite directions based on the polarity of the hot R voltage signal 551 (24 VAC control signal). Starting on the left side of FIG. 3A without a call for heating, the rectified heat W control voltage signal 552 is zero (dash-dash line). The hot R voltage signal 551 is always energized from a hot R terminal 523 of the 120/24 VAC transformer 422. The hot R voltage signal 551 generates a second rectified current signal 652 (dash-dot-dot-dash line) that is positive with a typical maximum of +300 mA every other 8.33 millisecond (ms) time period, and a first rectified current signal 651 (dash-dot-dash) with a typical minimum of −30 mA every other 8.33 ms time period.

FIG. 3A shows the first rectified current signal 651 element number with a diamond to indicate the first rectified current signal 651 is only energized without the call for heating. FIG. 3A also shows the second rectified current signal 652 with a circle to indicate the second rectified current signal 652 is always energized (i.e., before, during, and after the call for heating). The direction of the first rectified current signal 651 is shown pointing toward the smart thermostat 400. This is due to the orientation of the second diode 502 which blocks current from flowing in the opposite direction. The first rectified current signal 651 flows when the hot R voltage signal 551 is negative and flows into the smart thermostat to complete a current loop to the hot R terminal 523 of the 120/24 VAC transformer 422. The direction of the second rectified current signal 652 is shown pointing away from the smart thermostat 400. This is due to the orientation of the third diode 503 which blocks current from flowing in the opposite direction. The second rectified current signal 652 flows when the hot R voltage signal 551 is positive and flows into first switch element 426a to complete a current loop to the common terminal 521 of the 120/24 VAC transformer 422. When there is no call for heating, the first rectified current signal 651 charges the battery 404 of the smart thermostat 400 with a rectified current signal of typically −30 mA depending on the polarity of the diodes in the SPC apparatus (see FIG. 3A vs FIG. 5A). The COM B terminal 411 of the smart thermostat 400 is connected to the thermostat element common wire 403a of the thermostat element 424, and the heat W terminal 408 is connected to the thermostat element control wire 405a of the thermostat element 424. The common/control wire 407 is shown electrically connected to the thermostat element link wire 532 of the thermostat element 424 and the switch element link wire 526 of a first switch element 426a. The common/control wire 407 is a pre-existing wire in the wall of a building, used by the SPC apparatus but not included in the SPC apparatus. The common/control wire 407 is typically a heat W wire 407a (shown in FIG. 1A and FIG. 2A), which is repurposed as a common/control wire 407. The first rectified current signal 651 flows from a first capacitor 510 through a second diode 502, through the switch element link wire 526 of the first switch element 426a. The first rectified current signal 651 continues to flow on the common/control wire 407 to the COM B terminal 411, to the power supply 402, to charge the battery 404 of the smart thermostat 400 (see FIG. 4A). The first rectified current signal 651 to charge the battery 404 is initially generated by the first capacitor 510 when there is no call for heating. Excess charge on the first capacitor 510 caused by providing the first rectified current signal 651 is removed by the flow of current from the common terminal 521 of the 120/24 VAC transformer 422 through a switch element common wire 412 of the first switch element 426a through the coil 539 of the isolated-dry-contact relay 534 to the first capacitor 510. This keeps the voltage of the first capacitor 510 close to the potential of the common terminal 521 of the 120/24 VAC transformer 422 and allows the first capacitor 510 to provide an approximately 0 VAC potential at the COM B terminal 411, and a source of the first rectified current signal 651 to charge the battery 404. The function provided by this step is essential to charge the battery 404 of most smart thermostats. Alternatively, the first rectified current signal 651 can be provided by current flowing through other electrical components (e.g., resistor 511 shown in FIG. 7C and FIG. 7D, etc.) from the common terminal 521 of the 120/24 VAC transformer 422. The second rectified current signal 652 flows (with or without a call for heating) from the hot R terminal 523 of the 120/24 VAC transformer 422 through the hot R wire 409 through the hot R terminal 410, the power supply 402, the battery 404, and the COM B terminal 411 of the smart thermostat 400 through the common/control wire 407 through a third diode 503, and then flows to the common terminal 521 of the 120/24 VAC transformer 422. Alternatively the second rectified current signal 652 can flow on a hot R wire 410a shown as a dashed line in the first switch element 426a through the first switch element 426a and further through the system as described above.

FIG. 3A shows the heat W voltage signal 550 element number inside a square to indicate that the heat W voltage signal 550 is only energized when the smart thermostat 400 initiates a call for heating and energizes the heat W terminal 408. The heat W voltage signal 550 is conducted on thermostat element control wire 405a through the first diode 501 in the thermostat element 424 as a rectified heat W control voltage signal 552 carried on the common/control wire 407 to a second diode 502 (similarly biased in series with the first diode 501) in the first switch element 426a. The rectified heat W control voltage signal 552 charges a first capacitor 510 which energizes the isolated-dry-contact relay 534 and closes an electrical connection between a first contact 516a and a second contact 518a to conduct the millivolt signal 554. The millivolt signal 554 is generated by the thermopile 537 indicated as always energized by a circle around the millivolt signal 554. The thermopile millivolt signal is conducted from the thermopile 537 to the TH TP terminal 418 using a wire 405t. The isolated-dry-contact relay 534 of the first switch element 426a conducts the millivolt signal 554 from switch element hot wire 405c of the first switch element 426a (isolated-dry-contact relay 534 input) to the switch element control wire 403c of the first switch element 426a (isolated-dry-contact relay 534 output) to provide the millivolt signal 554 (indicated as energized during the call for heating by a square around the millivolt signal 554) to open the millivolt gas valve 531, and allow a standing gas pilot flame 533 to ignite a gas burner 535.

FIG. 3A shows the thermostat element 424, the common/control wire 407, and the first switch element 426a. The thermostat element 424 comprises a first diode 501 configured to rectify a heat W voltage signal 550 from the smart thermostat 400. The common/control wire 407 electrically connects the thermostat element 424 to the first switch element 426a. The common/control wire 407 is configured to conduct at least one rectified current signal to charge a battery 404 of the smart thermostat 400. During the call for heating the common/control wire 407 conducts the second rectified current signal 652 and the rectified heat W control voltage signal 552, wherein the rectified signals are conducted for a fraction of time in an alternating pattern based on a polarity of a hot R voltage signal 551 from the hot R terminal 523 of a 120/24 VAC transformer 422, and wherein each signal is transmitted or received by the thermostat element 424 and the first switch element 426a. The first switch element 426a comprises a second diode 502, a third diode 503, and a first switch device 557a. The second diode 502 of the first switch element 426a is configured to conduct the at least one rectified current signal for a fraction of time in an alternating pattern before or after a call for heating to charge the battery 404 of the smart thermostat 400 and the second diode 502 is further configured to conduct the rectified heat W control voltage signal 552 during the call for heating to energize the first switch device 557a. The third diode 503 of the first switch element 426a is configured to conduct the second rectified current signal 652 for a fraction of time in an alternating pattern to charge the battery 404 of the smart thermostat 400. The switch device 557 of the first switch element 426a is configured to conduct at least one voltage signal selected from the group consisting of: the millivolt signal 554 to enable the smart thermostat 400 to control the at least one 2-wire millivolt heating system, and a hot R voltage signal 551 (24 VAC) to enable the smart thermostat 400 to control a 24 VAC system with 2 or more control wires.

Figures 5A, 5B:
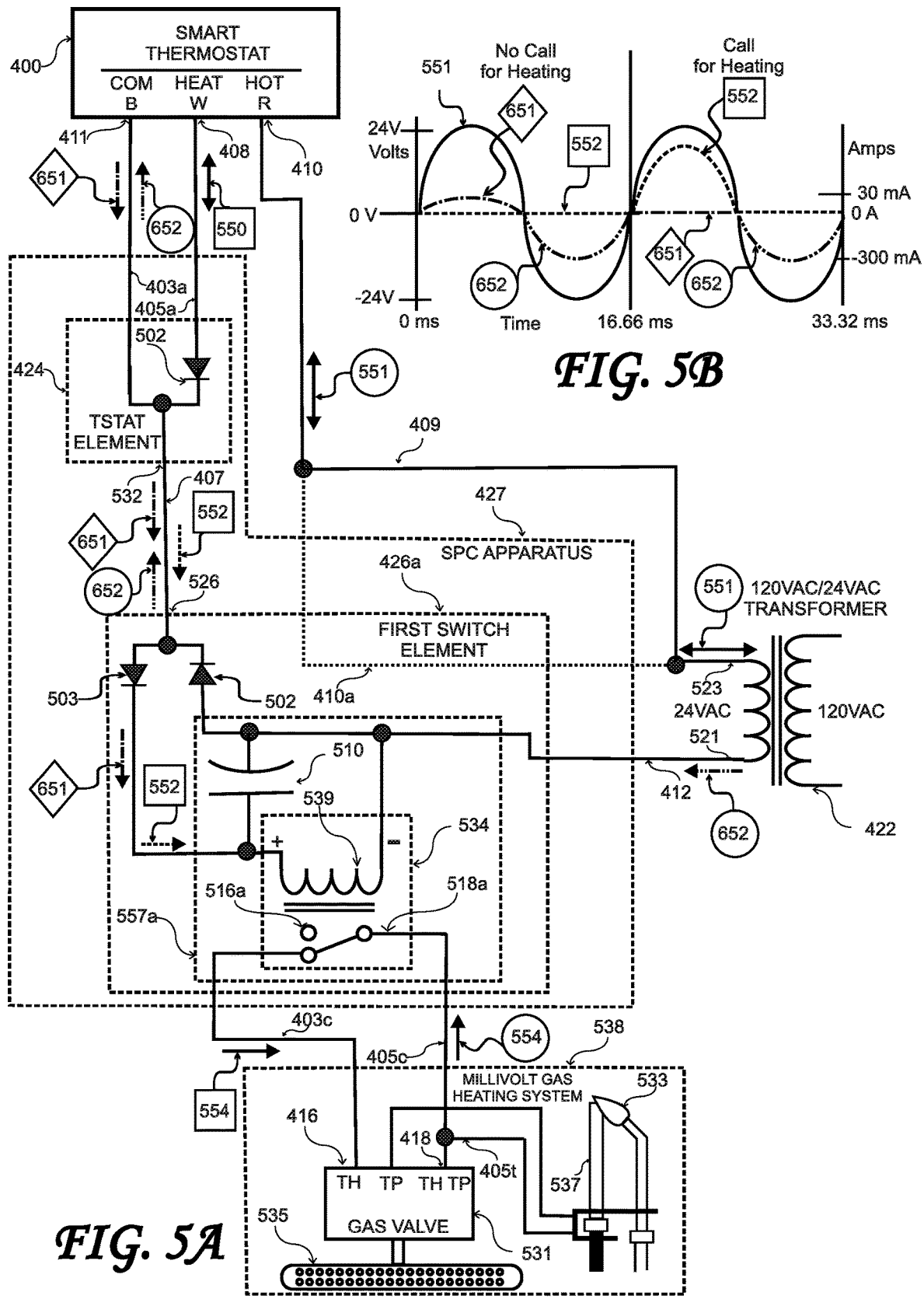
FIG. 5A shows the connections between the SPC apparatus when the diodes are reversed compared to FIG. 3A.
FIG. 5B shows a similar graph to FIG. 3B with the currents and voltage polarities reversed to account for the reversed diodes shown in FIG. 5A.

FIG. 3A shows the first diode 501 and the second diode 502 in a same direction and the third diode 503 is in an opposite orientation. The flow of current to charge the battery 404 of the smart thermostat 400 is based on the orientation of the diodes. FIG. 3A shows a first orientation of the diodes wherein the first rectified current signal 651 flows from a COM B terminal 419 of a 24 VAC system or a common terminal 521 of an external 120/24 VAC transformer 422 through the second diode 502 of the first switch element 426a which is electrically connected to a common/control wire 407 which is a pre-existing repurposed wire electrically connected to the thermostat element 424 wherein the first rectified current signal 651 flows through the thermostat element 424 to the COM B terminal 411 of the smart thermostat 400. FIG. 3A also shows the first orientation of the diodes wherein the second rectified current signal 652 flows from the COM B terminal 411 of the smart thermostat 400 through the thermostat element 424 through the common/control wire 407 which is a pre-existing repurposed wire electrically connected to the third diode 503 of the first switch element 426a wherein the second rectified current signal 652 flows to the COM B terminal 419 of the 24 VAC system or the common terminal 521 of the external 120/24 VAC transformer 422. The second diode orientation is shown in FIG. 5A.

The SPC apparatus can be used to charge the battery 404 of a smart thermostat 400 using at least one HVAC control wire that carries a 24 VAC control voltage including at least one HVAC control voltage signal selected from the group consisting of: a heat W signal, an AC compressor Y signal, a fan G signal, a reversing valve O/B signal, an occupancy sensor OCC signal, and an exhaust fan AUX signal. The at least one HVAC control signal may comprise a first-stage, a second-stage, or an nth-stage AC compressor Y signal, heat W signal, reversing valve O/B signal, exhaust fan AUX signal, or fan G signal. The first rectified current signal 651 would be on the common/control wire 407 before or after the smart thermostat 400 call for control, such as a call for cooling or fan-only operation. The rectified Heating, Ventilating, Air Conditioning (HVAC) control voltage, similar to the rectified heat W control voltage signal 552 would be on the common/control wire 407 when the smart thermostat 400 calls for control. The second rectified current signal 652 would be on the common/control wire independent of a thermostat call for control.

FIG. 3B shows a graphical representation of time (x-axis) in milliseconds (ms) versus voltage (V) signals (left y-axis) and current signals (right y-axis) in milli-amperage (mA) on the common/control wire 407 of the SPC apparatus before and during a call for heating. The label 24V refers to units of voltage from minus −24V to plus +24V. The units of current go from −300 mA to +300 mA. The units of time go from 0 to 33.32 ms. The graph is using a 24 VAC 60 Hz reference as a typical voltage and frequency. The SPC apparatus provides a complete current path between the hot R terminal 523 and the common terminal 521 of the 120 VAC/24 VAC transformer 422 to charge the battery 404 of the smart thermostat 400. In the first 8.33 ms, the hot R voltage signal 551 rises from 0 VAC sinusoidally to 24 VAC and back to 0 VAC. As the hot R voltage signal 551 rises a second rectified current signal 652 is generated. The current path for the second rectified current signal 652 is described above. FIG. 3B shows the second rectified current signal 652 rising to a typical value of +300 ma in a sinusoid manner and then falling to 0 ma as the hot R voltage signal 551 crosses through 0 VAC at 8.33 ms. Since there is no call for heating, the rectified heat W control voltage signal 552 is shown as 0 VAC.

At 8.33 ms of FIG. 3B, the hot R voltage signal 551 is shown going below 0 VAC. With no call for heating, a first rectified current signal 651 is generated. The current path for the first rectified current signal 651 is described above. FIG. 3B shows the first rectified current signal 651 falling to a typical value of −30 ma in a sinusoidal manner and then increasing to 0 ma as the hot R voltage signal 551 crosses through 0 VAC at 16.66 ms. Since there is no call for heating, the rectified heat W control voltage signal 552 is shown as 0 VAC. During the negative phase of the hot R voltage signal 551 the voltage on the first capacitor 510 slightly decreases below 0 VAC as the first rectified current signal 651 is drawn from the first capacitor 510. During the positive phase of the hot R voltage signal 551, the capacitor voltage is restored to 0 VAC through the coil 539 of the isolated-dry-contact relay 534 making the 0 VAC reference on the first capacitor 510 ready to supply the first rectified current signal 651 on the next negative cycle of the hot R voltage signal 551.

FIG. 3B shows a call for heating starting at 16.66 ms with another positive cycle of the hot R voltage signal 551. The heat W voltage signal 550 is on thermostat element control wire 405a and the first diode 501 blocks the heat W voltage from the common/control wire 407. During the positive phase of the hot R voltage signal 551 (as described above), the second rectified current signal 652 flows on the common/control wire 407 through the third diode 503 to the common terminal 521 of the 120 VAC/24 VAC transformer to maintain the charge on the battery 404 of the smart thermostat 400. FIG. 3B shows the second rectified current signal rising in a sinusoidal manner to typically 300 ma.

FIG. 3B also shows the call for heating from 25 ms to 33.32 ms where the hot R voltage signal 551 is negative. At 25 ms, the rectified heat W control voltage signal 552 is passed through the first diode 501 and carried on the common/control wire 407 to charge the first capacitor 510 and activate the isolated-dry-contact relay 534 to energize the gas heating system (as described above). Since the voltage on the common/control wire 407 follows the voltage of the hot R voltage signal 551, an insignificant amount of current flows into the COM B terminal 411 of the smart thermostat 400, and FIG. 3B shows the first rectified current signal 651 as 0 ma. For a typical call for heating, the graph shown in FIG. 3B from 16.66 ms to 33.32 ms would continue until the call for heating is terminated.

Figures 4A, 4B:
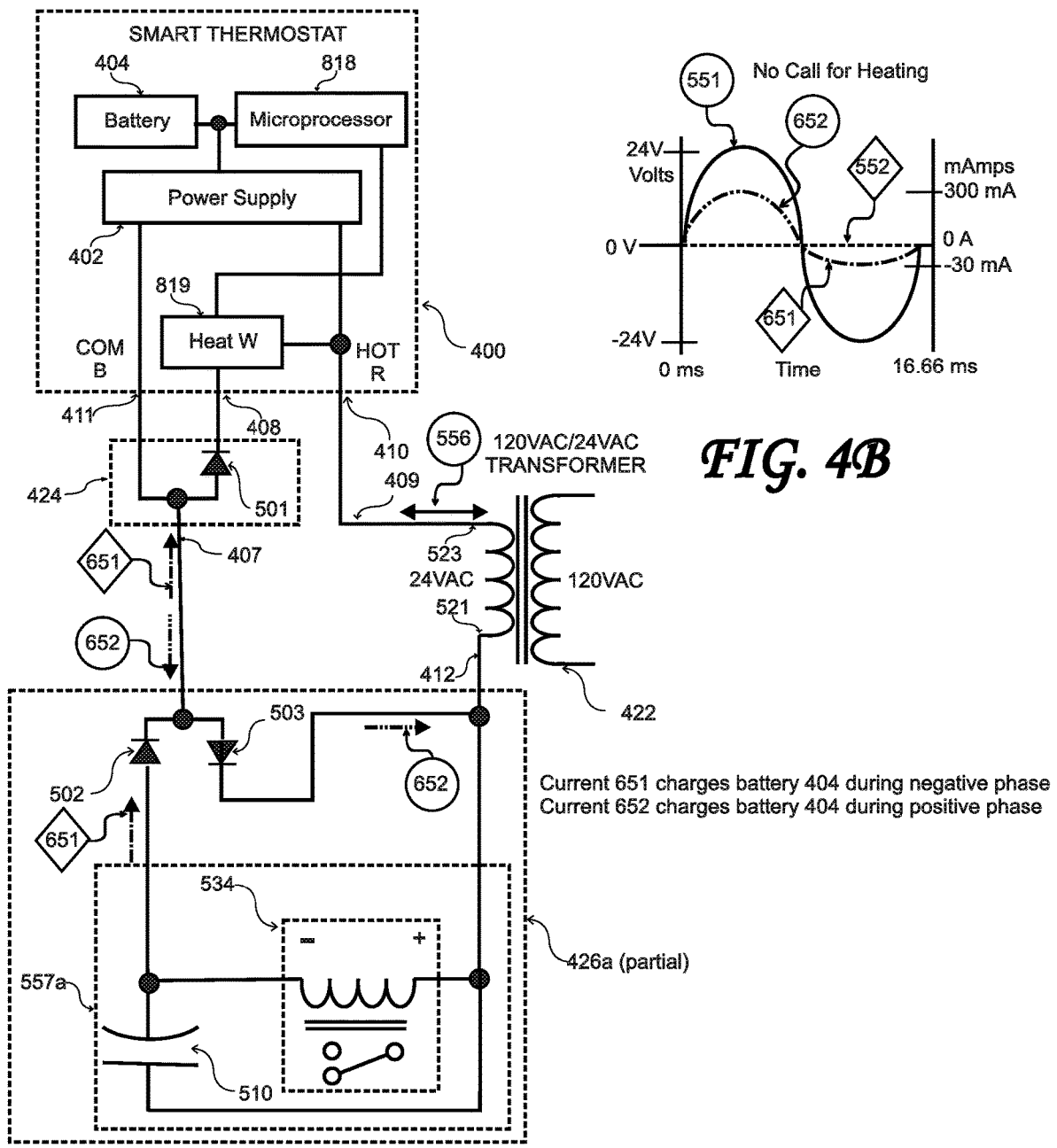
FIG. 4A shows a more detailed view of the smart thermostat with a power supply 402 and a battery connected to the thermostat element and the active components in the switch element when the battery is being charged with the first rectified current signal 651 the second rectified current signal 652.
FIG. 4B shows a graph of how the SPC apparatus enables the first rectified current signal 651 and the second rectified current signal 652 to charge the battery 404 of the smart thermostat 400 with no call for heating.

FIG. 4A shows the internal components, connections and electrical signals for an embodiment of the SPC apparatus 427 to charge a battery 404 of a smart thermostat 400 with no call for heating. The description of FIG. 4A is similar to FIG. 3A with more detail shown internal to the smart thermostat 400. The battery 404 of the smart thermostat 400 is connected to a power supply 402 which regulates the voltage used to charge the battery 404. The microprocessor 818 of the smart thermostat 400 is shown connected to the power supply and the Heat W switch 819. The microprocessor activates the Heat W switch when the temperature in the conditioned space drops below the user specified temperature.

FIG. 4B shows a graphical representation of the currents and voltages with no call for heating. The description of FIG. 4B is similar to FIG. 3B from 0 ms to 16.66 ms.

FIG. 5A is similar to FIG. 3A with the exception that the polarity of the first diode 501 is reversed, and the positions of the second diode 502 and third diode 503 are interchanged. The function of the SPC apparatus 427 is maintained, but the polarity of the rectified heat W control voltage signal 552 and the directions of the first rectified current signal 651 and the second rectified current signal 652 are reversed. FIG. 5A shows the first diode 501 and the second diode 502 in a same direction and the third diode 503 is in an opposite orientation. The flow of current to charge the battery 404 of the smart thermostat 400 is based on the orientation of the diodes. FIG. 5A shows a second orientation of the diodes wherein the first rectified current signal 651 flows from the COM B terminal 411 of the smart thermostat 400 through the thermostat element 424 through the common/control wire 407 which is a pre-existing repurposed wire electrically connected to the third diode 503 of the first switch element 426a wherein the first rectified current signal 651 flows to the COM B terminal 419 of the 24 VAC system or the common terminal 521 of the external 120/24 VAC transformer 422. FIG. 5A also a second orientation of the diodes wherein the second rectified current signal 652 flows from a COM B terminal 419 of a 24 VAC system or a common terminal 521 of an external 120/24 VAC transformer 422 through the second diode 502 of the first switch element 426a which is electrically connected to a common/control wire 407 which is a pre-existing repurposed wire electrically connected to the thermostat element 424 wherein the second rectified current signal 652 flows through the thermostat element 424 to the COM B terminal 411 of the smart thermostat 400.

The first rectified current signal 651 flows from the COM B terminal 411a of the first integrated smart thermostat 400a through the common/control wire 407 to the COM B terminal 419 of the 24 VAC system or the common terminal 521 of the external 120/24 VAC transformer 422, and the second rectified current signal 652 flows from the COM B terminal 419 of the 24 VAC system or the common terminal 521 of the external 120/24 VAC transformer 422 through the common/control wire 407 to the COM B terminal 411a of the first integrated smart thermostat 400a. The common/control wire 407 is a pre-existing wire in the wall of a building, used by the SPC apparatus but not included in the SPC apparatus.

FIG. 5B is similar to FIG. 3B with the exception that the polarities of the currents and voltages are reversed.

Figures 6A, 6B:
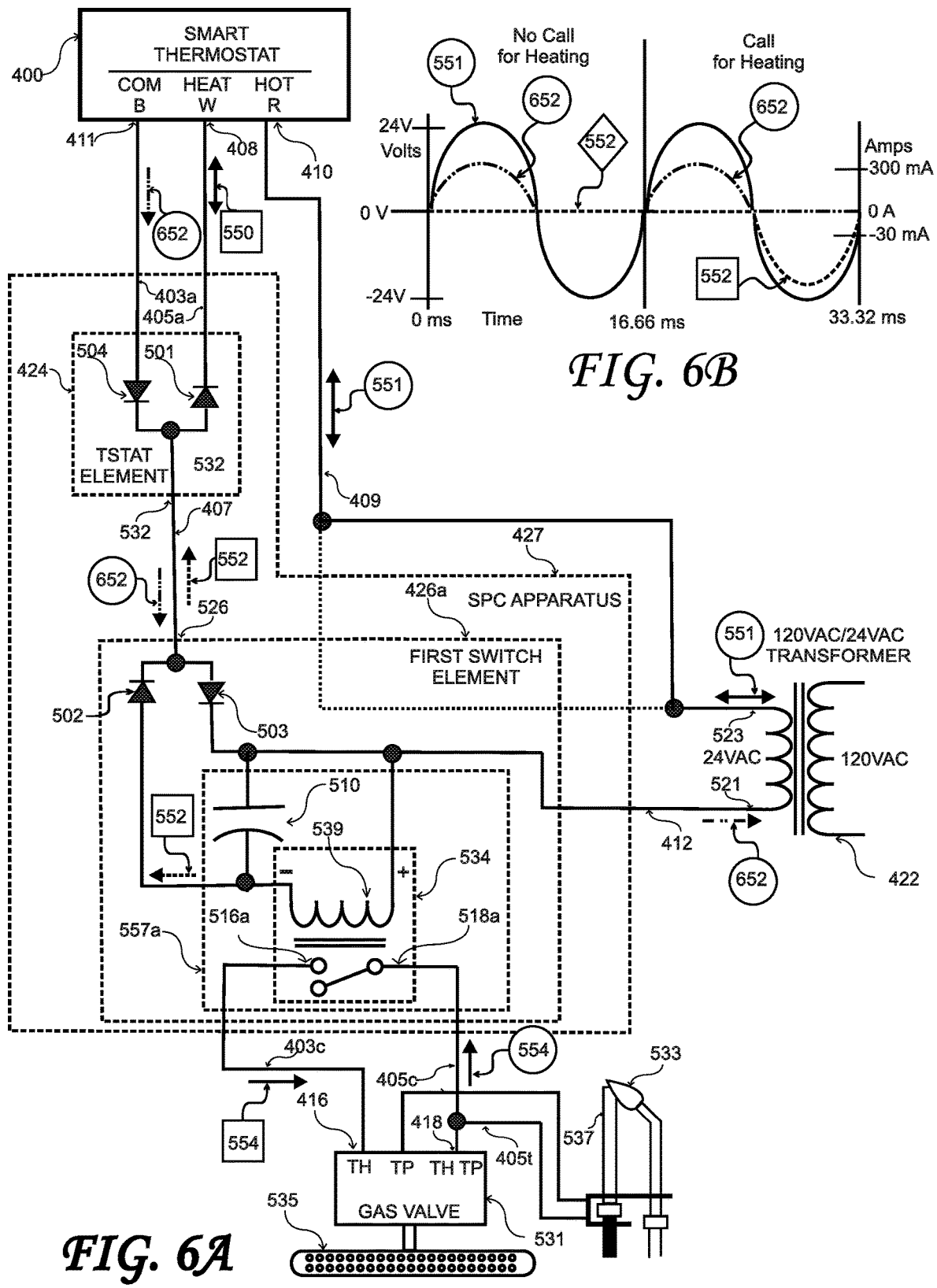
FIG. 6A is similar to FIG. 3A with the addition of a another diode in the thermostat element 424 to block the first rectified current signal 651 when the hot R voltage signal is negative from the hot R terminal of the 120/24 VAC transformer.
FIG. 6B shows a similar graph to FIG. 3B without the first rectified current signal 651 which is blocked by a fourth diode shown in FIG. 6A.

FIG. 6A is similar to FIG. 3A with the exception that a fourth diode 504 has been added in the thermostat element 424. The fourth diode 504 blocks the first rectified current signal 651 from the COM B terminal 411 of the smart thermostat.

FIG. 6B is similar to FIG. 3B with the exception that the first rectified current signal 651 is not present and therefore not shown.

Figure 7A:
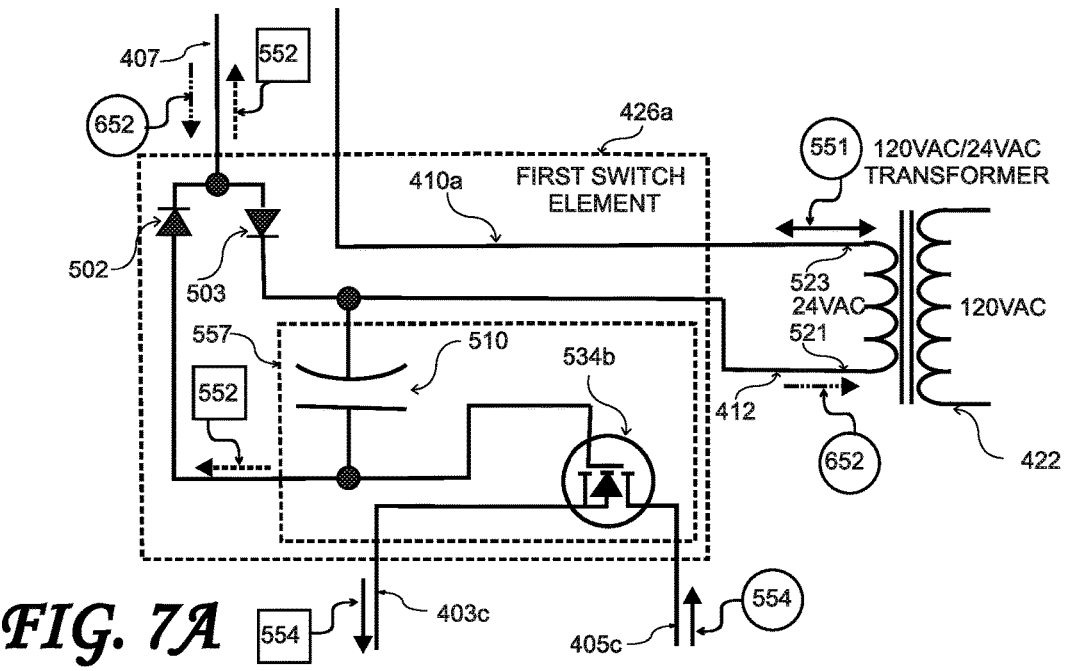
FIG. 7A shows the switch element with a solid-state FET switch in place of the isolated-dry-contact relay.

FIG. 7A shows the first switch element 426a with a solid-state Field Effect Transistor (FET) switch 534b in place of the isolated-dry-contact relay 534. The function of the solid-state FET switch 534b is to switch the millivolt signal 554 present on the millivolt gas valve 531 using the switch element hot wire 405c to the switch element control wire 403c of the first switch element 426a. The FET is less expensive than the isolated-dry-contact relay shown in FIG. 7A and can only be used to energize the millivolt gas valve 531, but cannot be used to energize a 24 VAC system 420a.

Figure 7B:
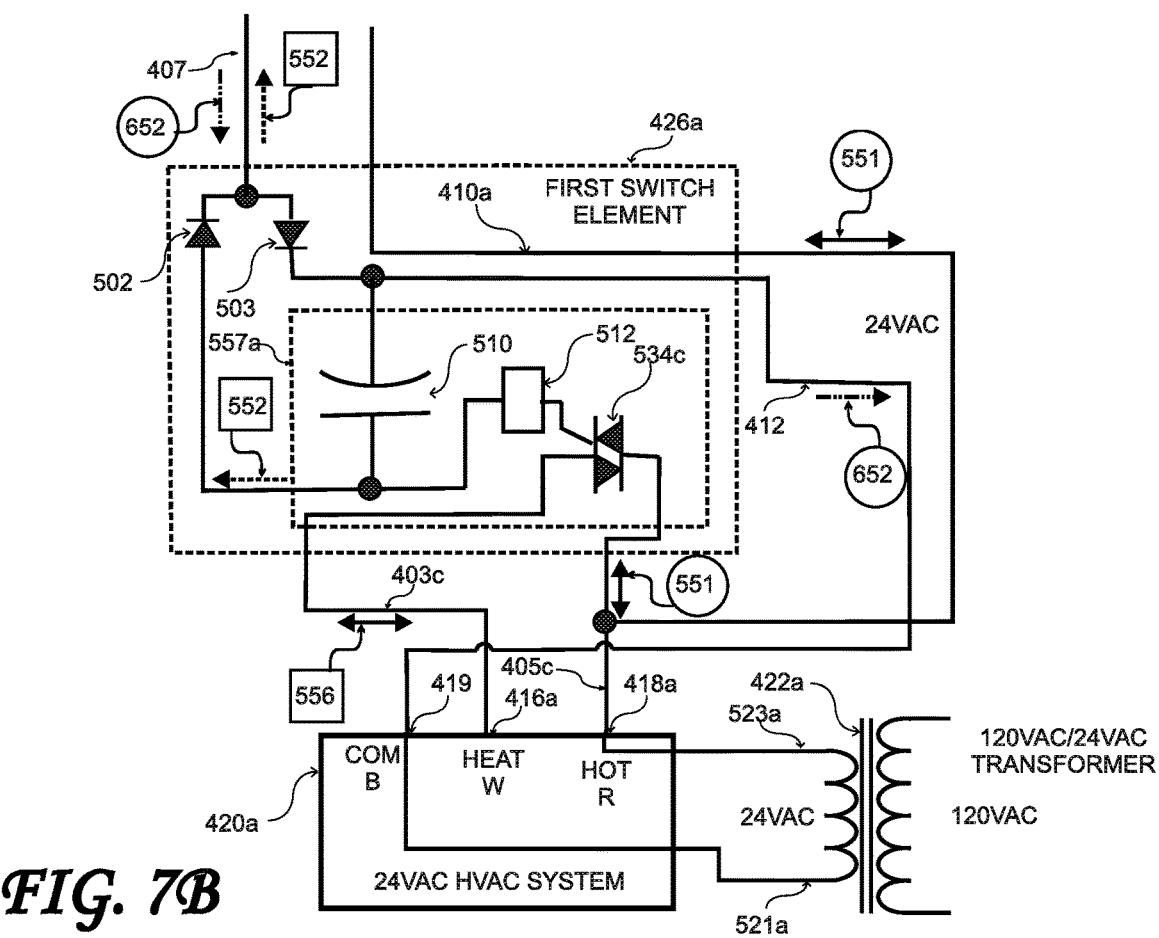
FIG. 7B shows the switch element with a TRIAC in place of the isolated-dry-contact relay for use with the 24 VAC system where the TRIAC gate is controlled by a DC signal conditioning element.

FIG. 7B shows the first switch element 426a with a TRIAC 534c to replace the isolated-dry-contact relay 534 which can only be used to energize a 24 VAC system 420a. The TRIAC gate is controlled by a DC signal conditioning element 512 (i.e., DC refers to direct current). The DC signal conditioning element 512 converts the charge on the first capacitor 510 into a gate pulse for the TRIAC 534c. When the TRIAC 534c is gated on, the hot R voltage signal 551 is passed from the switch element hot wire 405c to the switch element control wire 403c of the first switch element 426a which activates the heat W terminal 416a of the 24 VAC system 420a to initiate a heating cycle. The TRIAC 534c is an AC switching device and is unable to provide a millivolt signal 554 to control the millivolt gas valve 531. The TRIAC 534c could be replaced with a solid-state switch of another configuration.

Figure 7C:
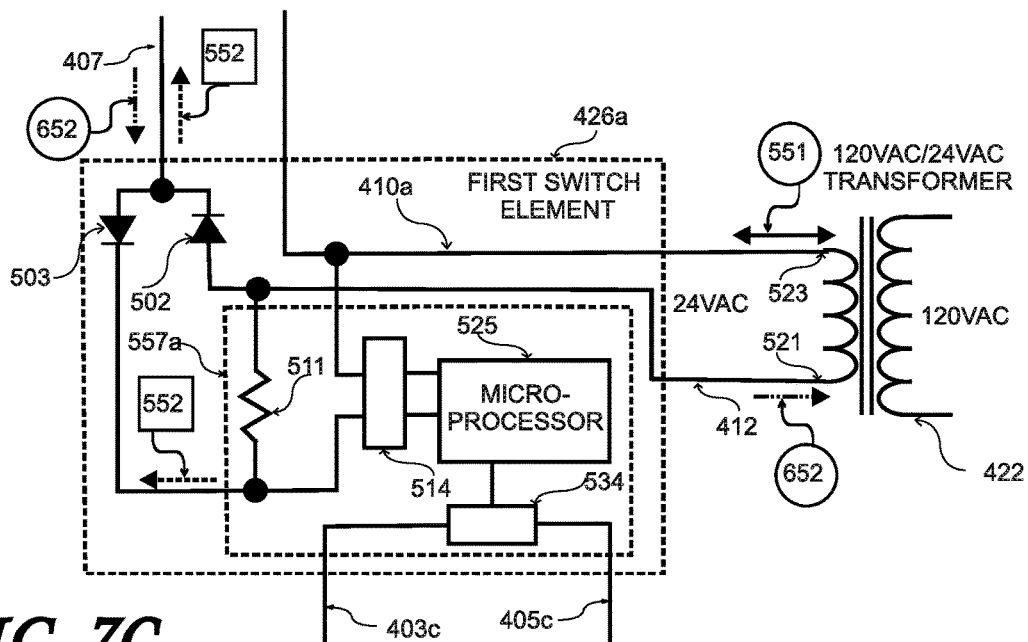
FIG. 7C shows the switch element with a signal conditioning element, a microprocessor and the isolated-dry-contact relay.

FIG. 7C shows the first switch element 426a with a microprocessor 525 energizing the isolated-dry-contact relay 534. The first capacitor 510 is replaced with a resistor 511. During the call for heating the rectified heat W control voltage signal 552 is provided to the signal conditioning element 514. The microprocessor 525 uses the hot R voltage signal 551 (from the 120/24 VAC transformer through the signal conditioning element 514) as a timing signal. When the timing signal transitions from a positive voltage to a negative voltage, the microprocessor 525 samples the rectified heat W control voltage signal 552 on the resistor 511 and determines if the smart thermostat 400 is providing a call for heating based on the rectified heat W control voltage signal 552. If the rectified heat W control voltage signal 552 is present, then the microprocessor 525 energizes the isolated-dry-contact relay 534 and connects the switch element hot wire 405c to the switch element control wire 403c which initiates the heating cycle for either a 24 VAC system or the at least one 2-wire millivolt heating system.

Figure 7D:
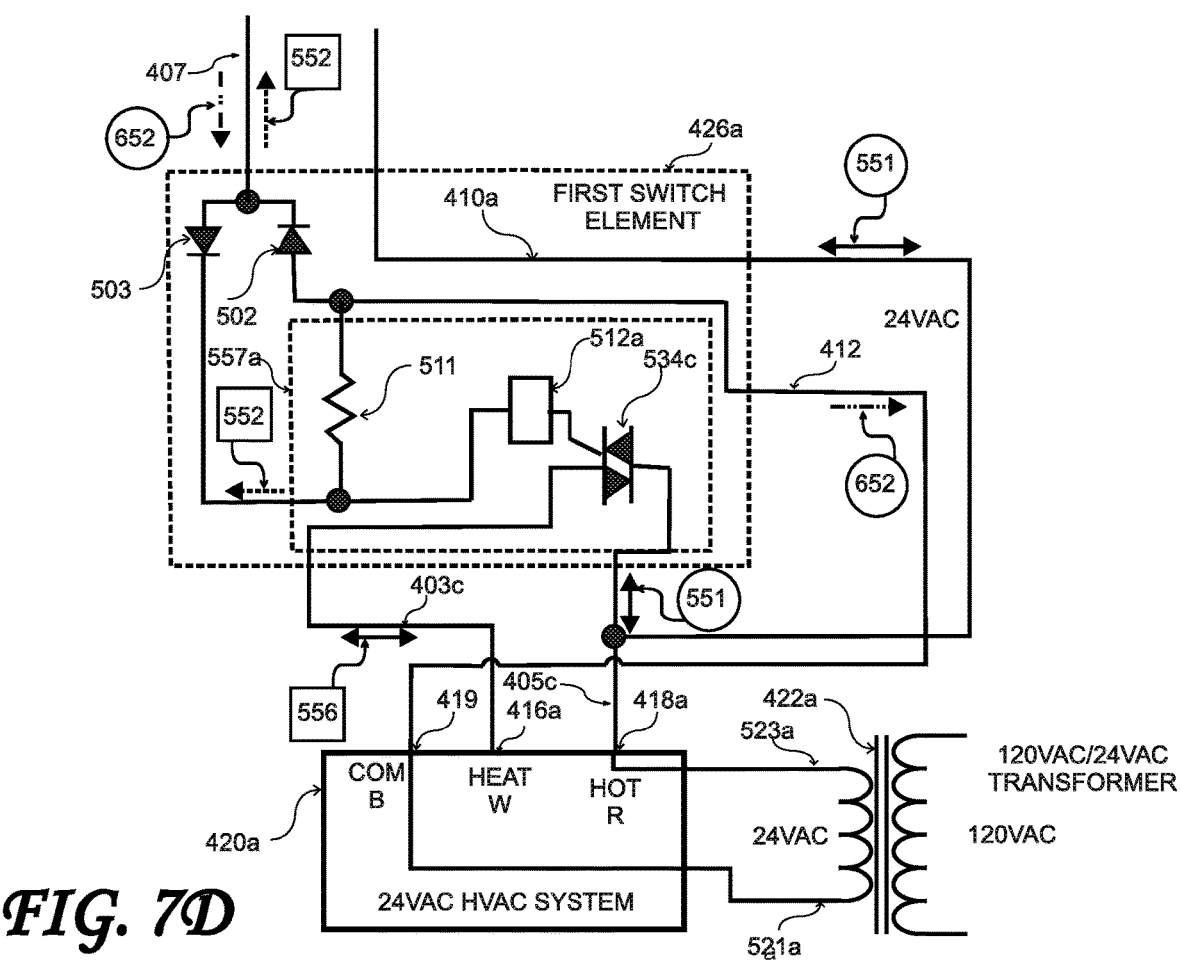
FIG. 7D shows the switch element with a TRIAC in place of the isolated-dry-contact relay for use with the 24 VAC system where the TRIAC is controlled by a phase-shifting signal conditioning element.

FIG. 7D shows the first switch element 426a with a TRIAC 534c in place of the isolated-dry-contact relay 534 for use with a 24 VAC system 420a. The gate of the TRIAC 534c is controlled by a phase shifting signal conditioning element 512a. FIG. 7D shows a resistor 511 (replacing the first capacitor 510). The phase shifting signal conditioning element 512a shifts the rectified heat W control voltage signal 552 in time to create a gate signal for the TRIAC 534c. During the call for heating when the TRIAC 534c is gated on, the hot R voltage signal 551 is passed from the switch element hot wire 405c to the switch element control wire 403c of the first switch element 426a which activates the heat W terminal 416a of the 24 VAC system 420a to initiate a heating cycle. The TRIAC 534c is an AC switching device and is not applicable to switch a millivolt signal 554. The TRIAC 534c could be replaced with a solid-state switch of another configuration.

FIG. 8A shows two pieces of the SPC apparatus embodied in a first integrated smart thermostat 400a including: a head unit 804 of the first integrated smart thermostat 400a with a first diode 501a and at least one switch 816 which replaces the thermostat element 424 (as a separate component), and a back plate 806 of the first integrated smart thermostat 400a. The back view of the head unit 804 of the first integrated smart thermostat 400a shows a connector 808, a heat W connector pin 810 (used for the heat W terminal 408), a common connector pin 812 (used for the COM B terminal 411a), a hot R connector pin 814 (used for the hot R terminal 410), a first diode 501a, at least one switch 816, a battery 404, a power supply 402, and a microprocessor 818. The parts shown on the head unit 804 of FIG. 8A may be included as integral parts of the design of the head unit 804. The back plate 806 of the first integrated smart thermostat 400a shows a connector 808a that mates with the connector 808 when the head unit 804 and the back plate 806 are joined. The pin and socket sides of the connector 808 and the connector 808a may vary due to manufacturing preference. The back plate 806 of the first integrated smart thermostat 400a also shows a heat W connector socket 810a, a common connector socket 812a, a hot R wire 409, and a common/control wire 407. The heat W connector pin 810 mates with the heat W connector socket 810a, the common connector pin 812 mates with the common connector socket 812a, and the hot R connector pin 814 on the head unit 804 mates with the hot R connector socket 814a when the head unit 804 and the back plate 806 are joined. The original position of the heat W wire 407a is shown with dashed lines going to the W1 terminal on the back plate 806. The heat W wire 407a is moved to the COM B terminal 411a (shown on the back plate 806 as "C") of the back plate and repurposed as the common/control wire 407. The COM B terminal 411a is abbreviated in the drawings as the "COM B" terminal in FIG. 1A through FIG. 6A, FIG. 7B and FIG. 7D, FIG. 8B through FIG. 8E, FIG. 9, and FIG. 10.

The SPC apparatus 428 shown in FIG. 8A may include an embodiment wherein the microprocessor 818 in the first integrated smart thermostat 400a detects that only the hot R wire 409 and the heat W wire 407a are connected to the back plate 806 at the hot R terminal 410 and the W1 terminal (also referred to as the heat W terminal 408). For the first embodiment, after the head unit 804 is connected to the back plate 806, the first integrated smart thermostat 400a may execute a power-up sequence. The heat W wire 407a is repurposed to be the common/control wire 407. The common/control wire 407 is a pre-existing wire in the wall of a building, used by the SPC apparatus but not included in the SPC apparatus. After the power-up sequence is completed (and any other initialization steps), the first integrated smart thermostat 400a may ask a first question of the user. Q1: "Is a common wire available at the thermostat?" where a user selects "Yes" or "No." If the answer to Q1 is "Yes," then the first integrated smart thermostat 400a may ask a second question of the user. Q2: "If a common wire is available, then please connect the common wire to the C terminal." In this case the user must remove the head unit 804 from the back plate 806, connect the common wire to the COM B terminal 411a, reconnect the head unit 804 to the back plate 806, and continue the installation process without requiring the first switch element 426a of the SPC apparatus. If the answer to Q1 is "No," then the first integrated smart thermostat 400a may guide the user to connect the heat W wire 407a to the COM B terminal 411a. The user will then remove the head unit 804 from the back plate 806 to remove the heat W wire 407a from the W1 terminal (or the heat W terminal 408) and connect the heat W wire 407a to the COM B terminal 411a, and reinstall the head unit 804 to the back plate 806. The heat W wire 407a is repurposed to be the common/control wire 407. After the head unit 804 is reinstalled on the back plate 806, the common connector pin 812 is connected to the COM B terminal 411a on the back plate 806. The first integrated smart thermostat 400a will then energize the at least one switch 816 to connect a first diode 501a between the heat W connector pin 810 and the common connector pin 812 and assign the rectified heat W control voltage signal 552 to the common/control wire 407 connected to the COM B terminal 411a using the at least one switch 816 and a first diode 501a connected to the common connector pin 812.

After all thermostat wiring connections are completed, the SPC apparatus may be configured to enable the first integrated smart thermostat 400a to provide at least one instructional step selected from the group consisting of: a software application graphical display showing connected wires for a HVAC system where a common wire connection to the thermostat is missing and further showing at least one HVAC control wire to connect to the COM B terminal 411a of the first integrated smart thermostat 400a, the software application graphical display showing at least one wire connection to a HVAC equipment terminal where the at least one wire connection is selected from the group consisting of: a switch element control wire 403c corresponding to the HVAC control wire, a switch element common wire 412, and a switch element hot wire 405c, and the software application graphical display or message showing that the at least one wire connection is correctly connected to charge the battery 404 of the first integrated smart thermostat 400a and to control the HVAC system.

For the 24 VAC heating system example, the following switch element wires are connected to the heating system: 1) a switch element control wire 403c to conduct the 24 VAC voltage signal 556; 2) a switch element common wire 412 to conduct a first rectified current signal 651 and a second rectified current signal 652 to charge the battery 404 of the first integrated smart thermostat 400a; and 3) a switch element hot wire 405c to conduct the hot R voltage signal 551. For the at least one 2-wire millivolt heating system the following switch element wires are connected: 1) the switch element control wire 403c is connected to the TH terminal 416 of the millivolt gas valve 531 to conduct the millivolt signal 554 during a call for heating; 2) the switch element hot wire 405c is connected to the TH TP terminal 418 of the millivolt gas valve 531 as a source of the millivolt signal 554; and 3) the switch element common wire is connected to a 120/24 VAC transformer 422 common terminal 521.

For an 24 VAC system with more than 2 wires, the present invention SPC apparatus may provide an embodiment for the microprocessor 818 of the first integrated smart thermostat 400a to detect a missing wire for a given system configuration. For this embodiment, the first integrated smart thermostat 400a may test at least one HVAC control wire connected to the 24 VAC system 420a to determine if there are any broken or shorted wires, where the at least one HVAC control wire is selected from the group consisting of: a fan G wire, an AC compressor Y wire, a heat W wire, and a reversing valve O/B wire connected. If a fan G wire is connected to the 24 VAC system 420a, then the first integrated smart thermostat 400a may ask a third question Q3: "Is the HVAC fan working?" If the HVAC fan is working, then a user may enter "Yes" and the first integrated smart thermostat 400a would go to another screen to finish the installation. However, if the HVAC fan is not working, then the first integrated smart thermostat 400a may ask a fourth question. Q4: "Troubleshoot?" If the user chooses to troubleshoot, and there is a common wire connected to the COM B terminal 411a of the first integrated smart thermostat 400a, then the embodiment may include the first integrated smart thermostat 400a asking a fifth question Q5: "Okay to repurpose common wire to carry fan G signal?" If user selects "Yes' then the first integrated smart thermostat 400a will assign the fan G wire (or the wire 401) to the COM B terminal 411a of the first integrated smart thermostat 400a using the at least one switch 816 and a first diode 501a connected to the common connector pin 812.

For the first embodiment, the common/control wire 407 is used to charge the battery 404 and conduct a control voltage signal from the first integrated smart thermostat 400a to control the 24 VAC system without requiring an additional wire for the non-functional fan G wire. For the second embodiment, the first integrated smart thermostat 400a may also provide a graphical display to show the wire connections from the first switch element 426a to the HVAC equipment terminal where the at least one wire connection is selected from the group consisting of: a switch element control wire 403c corresponding to the broken/shorted wire from the thermostat, a switch element common wire 412, and a switch element hot wire 405c. For this example, if the fan G wire is not working, the graphical display will provide the user with information to complete the installation of the first switch element 426a with the fan G wire. After the user completes the installation of the fan G wire and all of the other wire connections to the first switch element 426a, then the software application may provide a graphical display or message indicating that all wire connections are properly installed in order to charge the battery 404 of the first integrated smart thermostat 400a and control the 24 VAC system 420a. For these examples the SPC apparatus provides a solution to resolve the unresolved problem of providing a missing common wire to a first integrated smart thermostat 400a or to replace a broken/shorted thermostat wire between the thermostat and the HVAC system.

The present invention may also provide an embodiment using another TDM process, where the microprocessor 818 of the first integrated smart thermostat 400a may use another modulation method to encode more than one control voltage signal on the common/control wire 407. The microprocessor 525 in the first switch element 426a may monitor the common/control wire 407 and enable multiple switch devices in response to a modulated signal from the microprocessor 818 in the first integrated smart thermostat 400a. For this embodiment 2 or more control voltage signals from the first integrated smart thermostat 400a may be carried over a single common/control wire 407 to control a 24 VAC system requiring 2 or more control voltage signal (with only 2 wires in a wall of a building) while also charging the battery 404 of the first integrated smart thermostat 400a.

In a third embodiment, the first integrated smart thermostat 400a may use a first diode 501a similar to the first diode 501 in the thermostat element 424 to control a 24 VAC heating system. The first integrated smart thermostat 400a may also use a software application on a smart phone, tablet, or computer to configure the microprocessor 818 to energize the at least one switch 816. The above description uses the at least one switch 816 to connect the heat W connector pin 810 to the common connector pin 812. For an HVAC system with Air Conditioning (AC), any terminal may be substituted for the heat W connector pin 810 including at least one terminal selected from the group consisting of: an AC compressor Y, a heat W, a fan G, a reversing valve O/B, a second-stage compressor Y2, a second-stage heat W2, an occupancy sensor OCC, and an exhaust fan AUX. For this example the first switch element 426a would connect to the matching control connector on the 24 VAC system 420a.

A nonpatent publication by Honeywell International Inc., and Resideo Inc., regarding the T9 Thermostat which is a smart thermostat with a "K" Terminal which includes two diodes integrated into the T9 Thermostat to conduct a rectified fan G signal and a rectified AC compressor Y signal on a single pre-existing wire in the wall of a building to control the fan and the AC compressor, and allow another pre-existing wire to be used as a common wire to provide power to the thermostat. The Honeywell C-wire adaptor product is similar to the Add-a-Wire™ C-wire adaptor described in the nonpatent publication by Venstar Inc. Both of these adaptors require two diodes either in the thermostat (Honeywell T9 Thermostat) or external to the thermostat (Venstar Add-a-Wire). The Honeywell T9 Thermostat with the Honeywell C-wire Adaptor and the Venstar Add-a-Wire cannot be used for the at least one 2-wire-millivolt heating system or the 24 VAC system with only two pre-existing wires. The SPC apparatus 427 uses a first diode 501 either in a first integrated smart thermostat 400a or external to the smart thermostat 400 to provide a solution to resolve the unresolved to charge a battery of a smart thermostat and enable control of the at least one 2-wire millivolt heating system or the 24 VAC system with two or more pre-existing wires. The locations of the heat W connector pin 810 and the common connector pin 812 shown are for illustration only. The physical locations of the pins may vary based on manufacturer requirements. The direction of the first diode 501a may also vary based on the direction of the second diode 502 and third diode 503.

FIG. 8B shows the back plate 806 of an embodiment of the first integrated smart thermostat 400a with the COM B terminal 411a to connect the common/control wire 407 and enable control of the at least one 2-wire millivolt heating system. The first integrated smart thermostat 400a also includes a first diode 501a and the at least one switch 816 to provide the same functions as the thermostat element 424. The first integrated smart thermostat 400a has only two wires connected, the hot R wire 409 and the common/control wire 407. As described in FIG. 8A, a first diode 501a sends a rectified heat W control voltage signal 552 to the COM B terminal 411a of the first integrated smart thermostat 400a during a call for heating, eliminating the requirement for a wire to be connected to the heat W terminal 408. Other elements shown in FIG. 8B function as described in FIG. 1B.

FIG. 8C shows the SPC apparatus 428 with the first integrated smart thermostat 400a, the common/control wire 407, and the first switch element 426a. The first integrated smart thermostat 400a includes a first diode 501a and the at least one switch 816 to provide the same functions as the thermostat element 424. The first integrated smart thermostat 400a has at least two wires connected: the hot R wire 409, and the common/control wire 407. FIG. 8C shows additional wires (as dashed lines) connected to the smart thermostat for control of a 24 VAC system 420b with gas heat, a fan, and air conditioning. The additional wires are a fan G wire 214 (to control the HVAC fan) and an AC Y wire (to control an AC compressor). Either of these two additional wires may be repurposed as the common/control wire 407 instead of the heat W wire used in this example. If a common wire is available at the first integrated smart thermostat 400a, then the user will connect the heat W wire to the heat W terminal 408 on the first integrated smart thermostat 400a and the heat W terminal 416a on the 24 VAC system. FIG. 8C shows the heat W wire 407a repurposed as the common/control wire 407 and connected to the COM B terminal 411a and the switch element link wire 526 of the first switch element 426a. As described in FIG. 8A, a first diode 501a and at least one switch 816 sends a rectified heat W control voltage signal 552 to the COM B terminal 411a of the first integrated smart thermostat 400a during a call for heating eliminating the requirement for a wire to be connected to the heat W terminal 408. The other elements shown in FIG. 8C function as described in FIG. 2B.

FIG. 8C shows wires connected to the hot R terminal 410 (shown as the Rh terminal on FIG. 8A), the fan G terminal 204 (dashed line), and the AC compressor Y terminal 207 (dashed line). FIG. 8C shows the heat W wire 407a repurposed as the common/control wire 407 and connected to the COM B terminal 411a and the switch element link wire 526 of the first switch element 426a of the SPC apparatus. FIG. 8C shows another example of connections with two dashed lines representing wires for an AC Y wire 275 (dashed line) and a fan G wire (dashed line) for a 24 VAC system 420a with AC compressor cooling (controlled with the AC Y wire) and an HVAC fan (controlled with the G wire). While FIG. 8C shows the heat W wire 407a repurposed as the common/ control wire 407, the user would start the installation with the heat W connected to the W1 terminal (or the heat W terminal 408). For this example, the first integrated smart thermostat 400a would guide the user to move at least one wire to the COM B terminal 411a where the at least one wire is selected from the group consisting of: the heat W wire 407a, the AC Y wire 275 (dashed line), or the fan G wire (dashed line). The first integrated smart thermostat 400a would then guide the user to connect the switch element control wire 403c to the heat W terminal 416a of the 24 VAC system 420a or the 24 VAC system 420b. The switch element control wire 403c might also be connected to the AC compressor Y terminal 207a, or the fan G terminal 204a. Any of these wires will work to provide power to the battery 404 and to control any of these devices.

FIG. 8D shows an integrated SPC apparatus 428a with a first integrated smart thermostat 400a connected to a third 24 VAC system 420c where there are only 2 or more pre-existing thermostat wires available in the wall at the thermostat (i.e., there is no pre-existing common wire to the thermostat). The first integrated smart thermostat 400a is described above. The third 24 VAC system 420c contains an embodiment of the first switch element 426a embedded into the third 24 VAC system 420c. A fourth switch element 426d functions in a similar manner to the first switch element 426a as detailed in the description of FIG. 3A. The common/ control wire 407 electrically connects the first integrated smart thermostat 400a to the third 24 VAC system 420c. The common/control wire 407 conducts at least one rectified current signal to charge a battery 404 of the first integrated smart thermostat 400a. The common/control wire 407 is a pre-existing wire in the wall of a building, used by the SPC apparatus but not included in the SPC apparatus. During the call for heating the common/control wire 407 conducts the second rectified current signal 652 and the rectified heat W control voltage signal 552, wherein the rectified signals are conducted for a fraction of time in an alternating pattern based on a polarity of a hot R voltage signal 551 from the hot R terminal 523 of a 120/24 VAC transformer 422, and wherein each signal is transmitted or received by the third 24 VAC system 420c. The fourth switch element 426d comprises a second diode 502a, a third diode 503a, and a fourth switch device 557d. The second diode 502a, the third diode 503a, and the fourth switch device 557d function as described in FIG. 3A to charge the battery of the first integrated smart thermostat 400a and allow the integrated smart thermostat to control the third 24 VAC system 420c.

FIG. 8E shows another embodiment of an integrated SPC apparatus 428b which enables two rectified control voltage signals to be conducted on a voltage control wire 401a. The integrated SPC apparatus 428b with a second integrated smart thermostat 400b connected to a fourth 24 VAC system 420d where there are only 2 or more pre-existing thermostat wires available in the wall to the thermostat (i.e., there is no pre-existing common wire at the thermostat). In this embodiment, the heat W wire is repurposed as the common/ control wire 407. The common/control wire 407 is a pre-existing wire in the wall of a building, used by the SPC apparatus but not included in the SPC apparatus. This common wire carries the current required to charge the battery in the second integrated smart thermostat 400b. The voltage control wire 401a is used to conduct a combination of rectified control voltage signals. FIG. 8E shows a rectified heat W control voltage signal 552a (in a square), and a rectified fan G control voltage signal 553a (in a square) from the second integrated smart thermostat 400b to the fifth switch element 431 to control the heating system or the fan of the fourth 24 VAC system 420d. Any two 24 VAC control voltage signals could be substituted for one or more of these two signals. The two rectified HVAC control voltage signals (the rectified heat W control voltage signal 552 and the rectified fan G control voltage signal 553) are carried on the voltage control wire 401*a* to the fourth 24 VAC system 420*d* where the signals are used to create two full wave 24 VAC control voltage signals used to control the heat W and fan G operations internal to the fourth 24 VAC system 420*d*. The battery of the second integrated smart thermostat 400*b* is charged using the repurposed heat W wire 407*a* as common on the COM B terminal 411 and the hot R voltage signal present at the hot R terminal 410 of the second integrated smart thermostat 400*b*. Any two 24 VAC control voltage signals could be substituted for the heat W or the fan G control voltage signals.

Figure 8F:
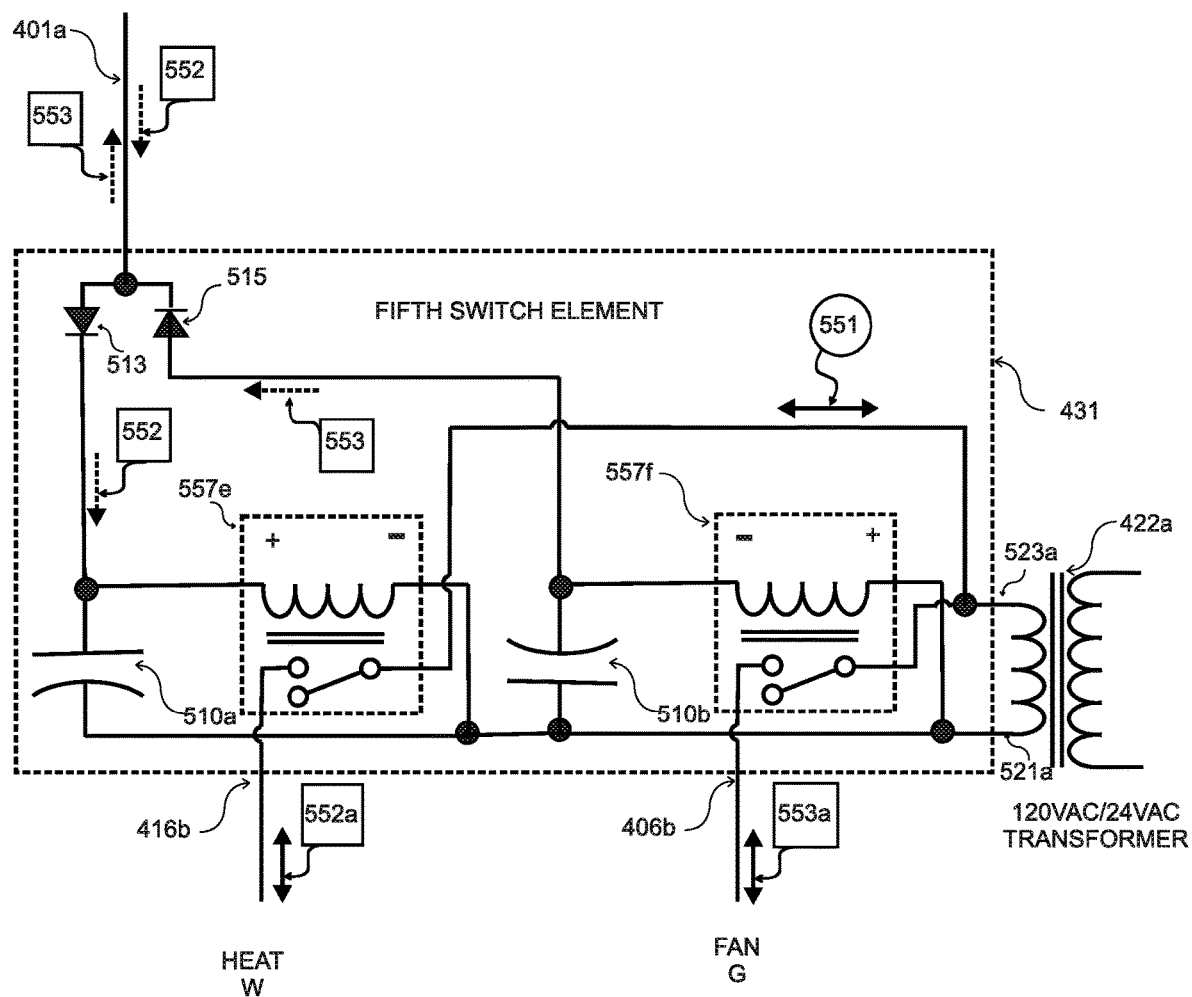
FIG. 8F shows the details of the fifth switch element which is embedded into an integrated 24 VAC system.

FIG. 8F shows details of the fifth switch element 431 built into and used to control a fourth 24 VAC system 420*d*. The fifth switch element 431 may include: an eighth diode 513 and a ninth diode 515. The eighth diode 513 is configured to conduct a rectified heat W control voltage signal to charge a second capacitor 510*a* of the fifth switch element 431 during a call for heating when the rectified heat W control voltage signal 552 is used to energize a fifth switch device 557*e*. The ninth diode 515 is configured to conduct a rectified fan G control voltage signal 553 to charge a third capacitor 510*b* of the fifth switch element 431 when the rectified fan G control voltage signal 553 is active to energize the sixth switch device 557*f* The fifth switch element 431 is configured to conduct the 24 VAC voltage signal 556 from the hot R terminal 523*a* of the 120/24 VAC transformer 422*a*. The 24 VAC control voltage signal from the fifth switch device 557*e* is conducted from the output terminal 416*b* of the fifth switch element 431 to the heat W terminal 416*a* of the fourth 24 VAC system 420*d* during a call for heating. FIG. 8F shows an unrectified heat W control voltage signal 552*a* (in a square) to control the heating system of the fourth 24 VAC system 420*d*. FIG. 8F also shows an unrectified fan G control voltage signal 553*a* (in a square) to control the fan of the fourth 24 VAC system 420*d*. The 24 VAC control voltage signal out of the sixth switch device 557*f* is conducted to the fan G control terminal of the fourth 24 VAC system 420*d* when a fan signal is activated by the second integrated smart thermostat 400*b*. In this embodiment, the fan G terminal 406*a* conducts the two rectified control voltage signals (the rectified heat W control voltage signal 552 and the rectified fan G control voltage signal 553) from the sixth switch device 557*f*. The fan G terminal is connected internally to the fan control of the fourth 24 VAC system 420*d*. Any two 24 VAC control voltage signals could be substituted for one or more of these two signals.

Figure 8G:
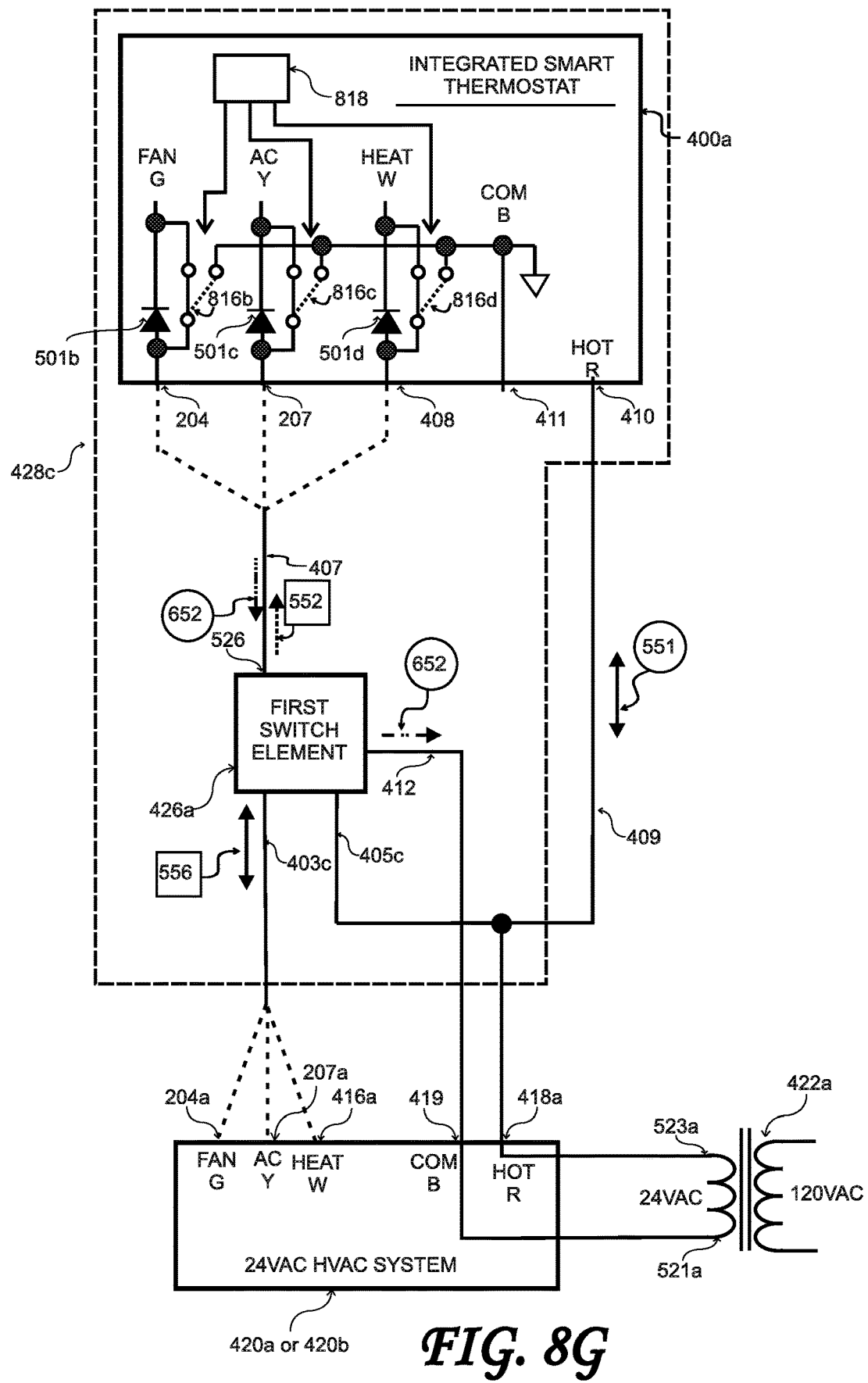
FIG. 8G shows another embodiment of the integrated smart thermostat with a diode and single-pole double-throw switch on each thermostat control terminal to allow any terminal to be the common/control terminal.

FIG. 8G shows another embodiment of the SPC apparatus 428*c* wherein the integrated smart thermostat has a plurality of diode and switch pairs at each integrated smart thermostat control terminal including: a diode 501*b* and a switch 816*b*, a diode 501*c* and a switch 816*c*, a diode 501*d* and a switch 816*d*. For clarity the power supply and battery are not shown. Each switch is shown with a control connection to the microprocessor 818 in the integrated smart thermostat. For this discussion, the diode 501*b* and switch 816*b* will be used as an example, but similar diode/switch pairs could be included on each terminal of the integrated smart thermostat. When in the normally closed position (solid line), switch 816*b* bypasses diode 501*b* and the unrectified fan G signal is conducted to the fan G terminal 204. When the switch 816*b* is in the normally open position (dashed line) the diode 501*b* negatively rectifies the fan G control voltage signal conducted through the fan G terminal 204. In the normally open position, switch 816*b* connects the fan G terminal 204 to the COM B terminal 411*a* to conduct the first rectified current signal 651 and the second rectified current signal 652 to the COM B terminal 411*a* when there is no call for fan operation. When there is a call for fan operation, the negatively rectified fan G control voltage signal is conducted to the fan G terminal 204 when the hot R terminal 410 is negative. The second rectified current signal 652 is conducted through the switch 816*b* to the COM B terminal 411*a* to charge the battery 404 of the first integrated smart thermostat 400*a* when the hot R terminal 410 is positive. This embodiment allows the first integrated smart thermostat 400*a* to maintain the existing wire connections that are present at the back plate 806 without requiring a wire to be moved to the COM B terminal 411*a*. The integrated smart thermostat software would then guide the installation of the first switch element 426*a* to correctly connect the switch element control wire 403*c* of the first switch device 557*a* to the 24 VAC system. This process could use any of the first integrated smart thermostat (400*a*) terminals as connections for the common/control wire as shown in FIG. 8G as dashed lines from the integrated smart thermostat to the common/control wire 407 and as dashed lines from the switch element control wire 403*c* to the 24 VAC HVAC terminals. Additionally, the use of the normally open and normally closed positions could be reversed since the switch operation is controlled by the first integrated smart thermostat 400*a* microprocessor 818 based on wires detected on the back plate 806 or based on user input.

Figure 9:
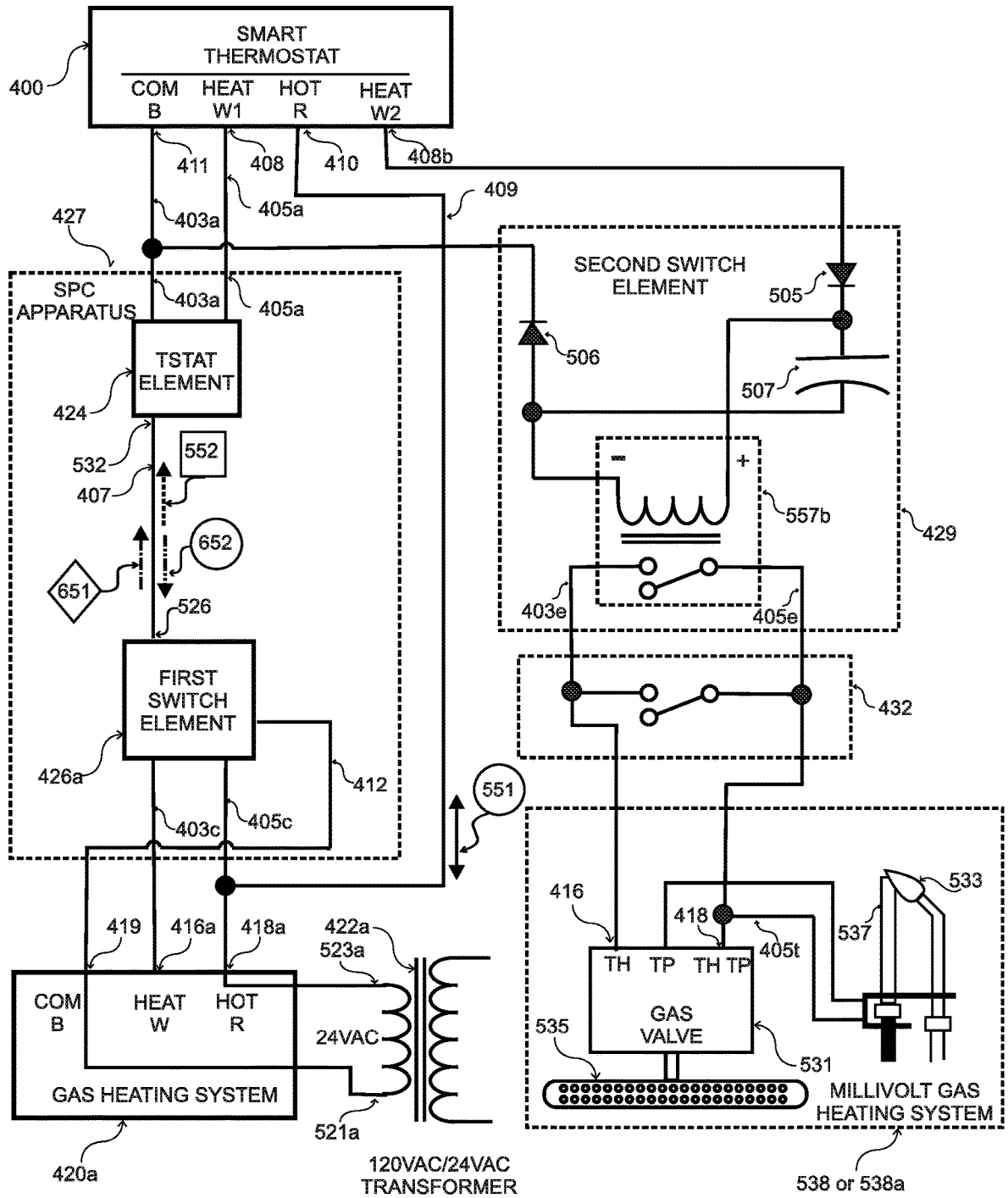
FIG. 9 shows two gas heating systems controlled by a single thermostat with only two wires available for each system using the SPC apparatus with a thermostat element and a switch element to provide power for the battery of the smart thermostat and control the first gas heating system and a second switch element to control the second gas heating system.

FIG. 9 shows a 24 VAC system 420*a* controlled by the SPC apparatus as described in FIG. 2B. The smart thermostat 400 has a heat W2 terminal 408*b* that controls the at least one 2-wire millivolt heating system or another 24 VAC system. The thermostat element common wire 403*a* of the thermostat element 424 is connected to the COM B terminal 411 of the smart thermostat 400. For a heating system with at least two pre-existing wires, one wire is typically a heat W wire 407*a* and one wire is a hot R wire 409. The heat W wire 407*a* (shown in FIG. 1A and FIG. 2A) is repurposed as a common/control wire 407. The common/control wire 407 is a pre-existing wire in the wall of a building, used by the SPC apparatus but not included in the SPC apparatus. The common/control wire 407 is electrically connected to the thermostat element link wire 532 of the thermostat element 424 and the switch element link wire 526 of a first switch element 426*a*. When the heat W2 control voltage signal is active, a tenth diode 505 in the second switch element 429 connected to the heat W2 terminal 408*b* positively rectifies the heat W2 control voltage signal and charges a fourth capacitor 507 in the second switch element 429. The common reference voltage for the fourth capacitor 507 is supplied an eleventh diode 506 connected to the fourth capacitor 507 and the COM B terminal 411 of the smart thermostat 400. The SPC apparatus conducts each current or voltage signal on a single common/control wire 407 for a fraction of time in an alternating pattern based on a polarity of a hot R voltage signal from a hot R terminal of a 120/24 VAC transformer.

FIG. 9 shows the second switch element 429 connected using the thermostat element common wire 403*a* to the COM B terminal 411 of the smart thermostat 400. The thermostat element common wire 403*a* carries the same signal as the common/control wire 407 shown in FIG. 3A. The fourth capacitor 507 in the second switch element 429 is charged when the common/control wire 407 of the smart thermostat 400 is at a zero voltage during a time when the hot R voltage signal from the hot R terminal of the 120/24 VAC transformer 422*a* is positive. The common/control wire 407 conducts a rectified heat W control voltage signal 552 (FIG. 5B) when a heat W voltage signal 550 is active, and the fourth capacitor 507 in the second switch element 429 holds sufficient charge to activate the second switch device 557b until another 60 Hz cycle of the positively rectified heat W2 control voltage signal. The fourth capacitor 507 in the second switch element 429 and the battery 404 of second integrated smart thermostat 400b both charge simultaneously when there is an active heat W2 control voltage signal. When there is a rectified heat W control voltage signal 552 on the common/control wire 407, the fourth capacitor 507 voltage is not affected.

The second switch element 429 provides a switch element wire 403e and a switch element hot wire 405e to enable control of the millivolt gas valve 531. The second switch element 429 is connected by a switch element hot wire 405e to the millivolt gas valve 531 TH TP terminal 418 to receive the 750 millivolt (mV) signal (signal may vary from 350 to 850 mV) generated by the thermopile 537, by a switch element wire 403e to the millivolt gas valve 531 TH terminal 416 to energize the millivolt gas valve during a call for heating. The thermopile millivolt signal is conducted from the thermopile 537 to the TH TP terminal 418 using a wire 405t. The second switch element 429 is also connected to common terminal 521 of the 120/24 VAC transformer 422. Also shown is a simple switch device 432 (or a time based switch device) used to energize the millivolt gas valve 531 to operate a 2-wire millivolt gas fireplace 538a or a 2-wire millivolt gas heating system 538.

The heat W2 terminal 408b can be energized by the user selecting an option to energize the second gas heating system from a display interface on the second integrated smart thermostat 400b or a voice activated or mobile software application. The traditional use of a heat W2 signal is also supported by a thermostat second-stage call for heating to provide additional heating capacity from the second 2-wire millivolt gas fireplace 538a or a 2-wire millivolt gas heating system 538 to satisfy the call for heating. FIG. 9 shows a 24 VAC system 420a connected to the SPC apparatus 427. The heating system might be a 2-wire millivolt gas fireplace 538a or a 2-wire millivolt gas heating system 538, or another device.

Figure 10:
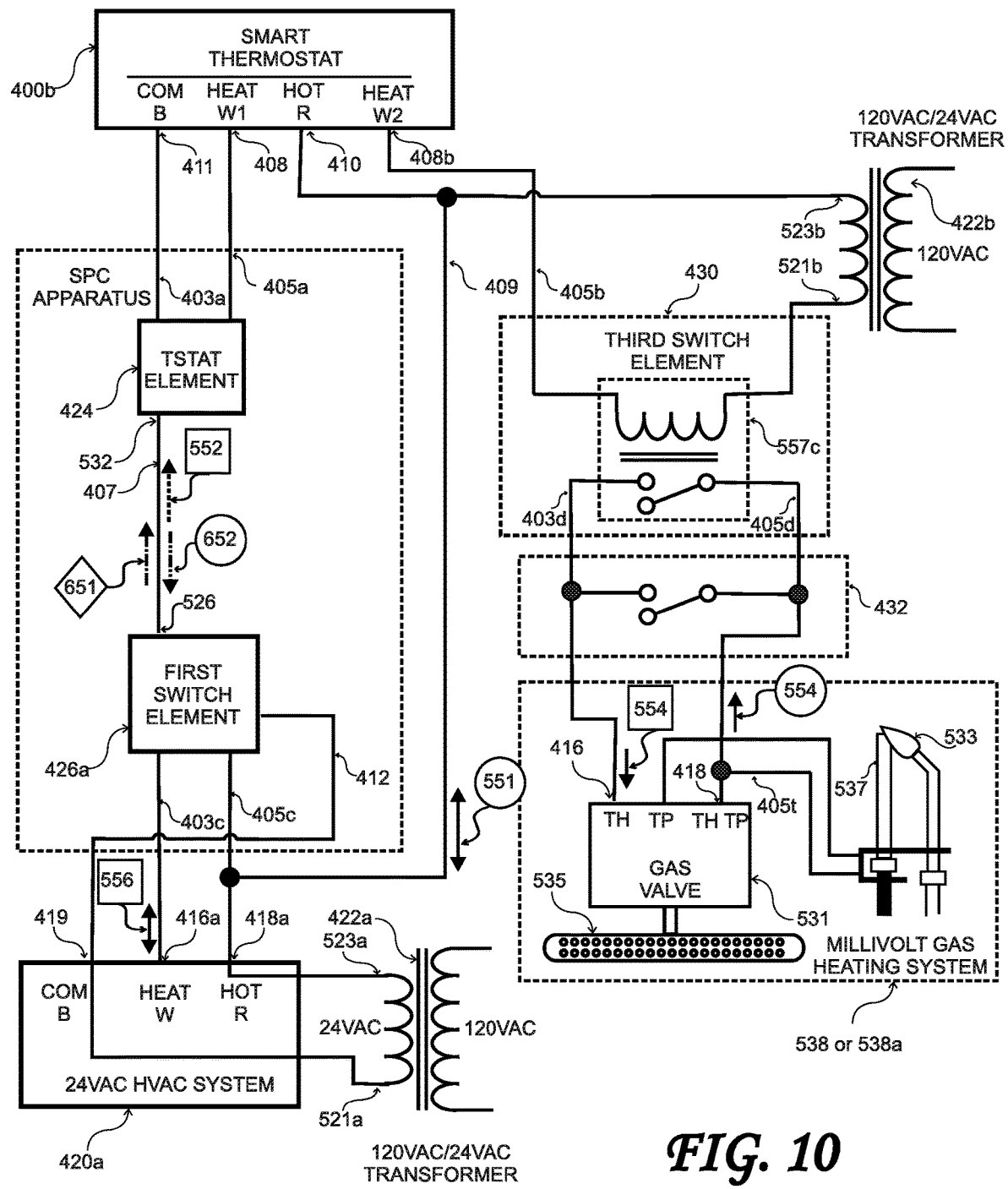
FIG. 10 shows two gas heating systems controlled by a single thermostat with only two wires available for each system using the SPC apparatus with a thermostat element and a switch element to provide power for the battery of the smart thermostat and control the first gas heating system and a third switch element to control the second gas heating system.

FIG. 10 shows a 24 VAC system 420a controlled by the SPC apparatus 427 as described in FIG. 2B. The smart thermostat 400 has a heat W2 terminal 408b to control a 2-wire millivolt gas fireplace 538a or a 2-wire millivolt gas heating system 538, or another HVAC system. A second 120/24 VAC transformer 422b hot terminal 523b is connected to the hot R wire 409. When the two hot signals are connected together as described above, the common terminal 521b of the second 120/24 VAC transformer will provide a similar voltage to the common terminal 521a of the first 120/24 VAC transformer 422a and create a remote common terminal for the second gas heating system including the at least one 2-wire millivolt heating system. Known prior art systems with two transformers do not connect the hot terminals of the two transformers to create a remote common signal for the thermostat. Known prior art systems isolate the Rc (hot R cooling) and Rh (hot R heating) with separate terminals on the thermostat. Connecting the two hot signals provides a solution to the unresolved need to provide a remote common signal. When the heat W2 terminal 408b is active, the third switch device 557c is energized by the heat W2 control voltage signal and the second 120/24 VAC transformer 422b common terminal 521b.

When the third switch device 557c is energized, as described in FIG. 1B, the third switch element 430 hot wire 405d is connected to the TH TP terminal 418 of the millivolt gas valve 531 as a source of the control voltage. The third switch element 430 is also connected to the TH terminal 416 of the millivolt gas valve 531 using wire 403d to conduct the millivolt gas valve signal and energize the millivolt gas valve 531 during a call for heating on the heat W2 signal wire 405b. The millivolt gas valve signal from the thermopile 537 is conducted to the TH TP terminal 418 using a wire 405t. Also shown is a simple switch device 432 (or a time-based switch) used to energize the millivolt gas valve 531 for a user to manually operate the at least one 2-wire millivolt heating system. The heat W2 terminal 408b can be energized by selecting an option to energize the second heating system including the at least one 2-wire millivolt heating system from a display interface on the second integrated smart thermostat 400b or a voice activated or mobile software application. The traditional use of a heat W2 signal is also supported by a thermostat second-stage call for heating to provide additional heating capacity from the second heating system including the at least one 2-wire millivolt heating system, to satisfy the call for heating. FIG. 10 shows a 24 VAC system 420a connected to the SPC apparatus 427, this could also be the at least one 2-wire millivolt heating system, or another device.

Figure 11:
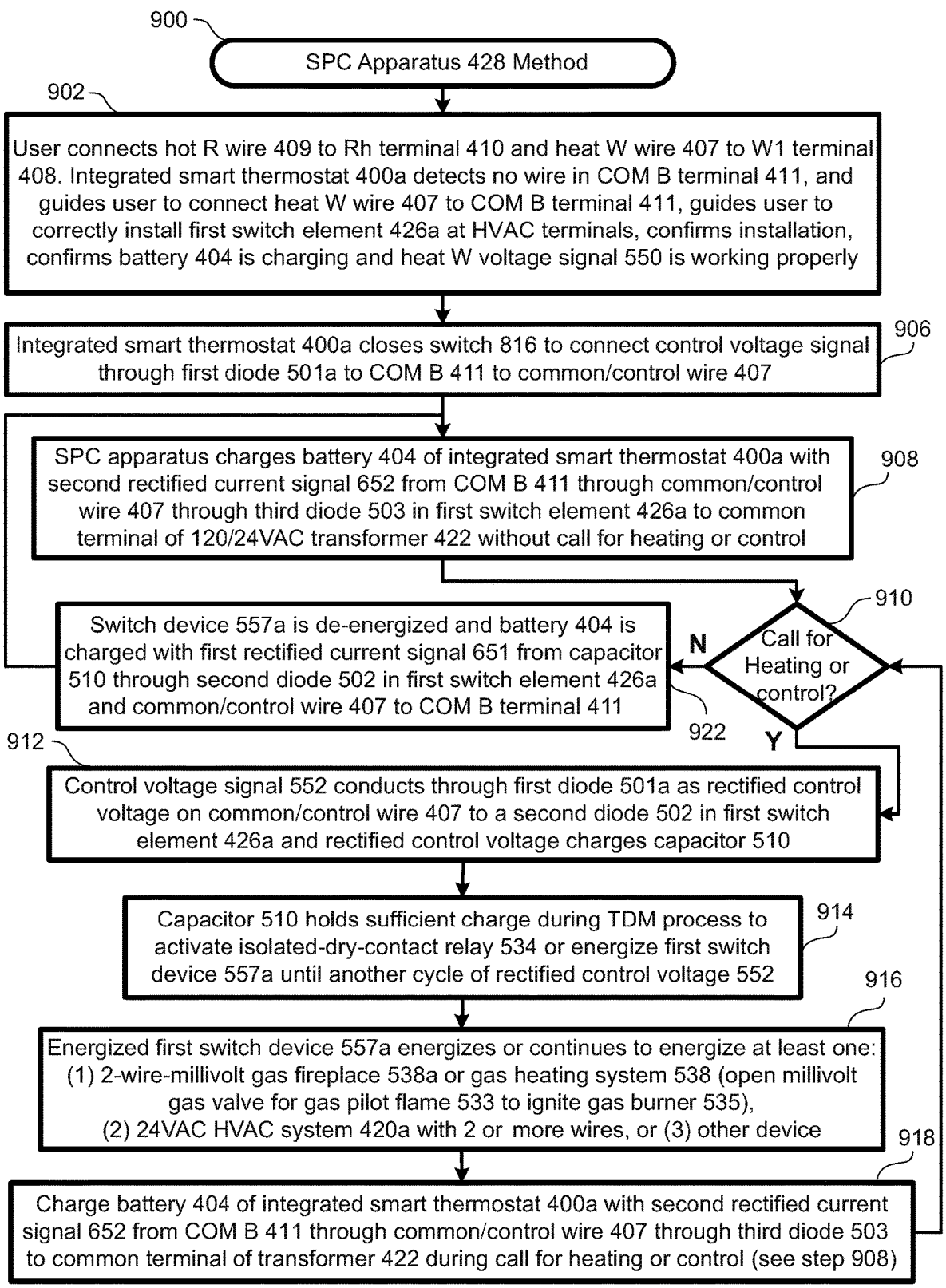
FIG. 11 provides a flow chart showing the process of the SPC apparatus including a diode in the smart thermostat eliminating the need for a thermostat element and enabling the smart thermostat to control a 24 VAC system or the at least one 2-wire millivolt heating system and charging the battery of a smart thermostat.

FIG. 11 provides a flow chart showing the SPC apparatus 428 method with a first integrated smart thermostat 400a including a first diode 501a and at least one switch 816 and a first switch element 426a to charge the battery 404 of the smart thermostat 400. FIG. 11 shows how the SPC apparatus enables the first integrated smart thermostat 400a to control the at least one 2-wire millivolt heating system or the 24 VAC system (shown in FIG. 3A and FIG. 4A).

The process starts at Step 900 of FIG. 11, and proceeds to step 902. At step 902, the user connects the Hot R wire 409 to the Rh (hot R terminal 410) and the heat W wire 407a to the W1 terminal (or the heat W terminal 408) or any other control wire (see below). Other wire connections may include at least connection selected from the group consisting of: W1, W2, G, Y1, Y2, O/B, occupancy OCC signal, etc. If the first integrated smart thermostat 400a detects the COM B terminal 411a has no wire connection, and the user previously answered "No" to Q1 ("Is a common wire available at the thermostat?"), then the user may remove the head unit 804 from the back plate 806. For this example, the user may connect the heat W wire 407a to the COM B terminal 411a, and reconnect the head unit 804 to the back plate 806. After the head unit 804 and the back plate 806 are mated, the common connector pin 812 is connected to the COM B terminal 411a on the back plate 806. The first integrated smart thermostat 400a will detect the heat W wire 407a has been moved to the COM B terminal 411a and the microprocessor 818 will energize the at least one switch 816 to enable the heat W voltage signal 550 to be rectified by the first diode 501a and conducted on the common/control wire 407. For this example, the first integrated smart thermostat 400a detected a wire connected to the Hot R terminal 410 and a wire connected to the W1 terminal (or the heat W terminal 408), but no wire connected to the COM B terminal 411a. Other wires listed above may be similarly repurposed to provide a common/control wire 407.

The first integrated smart thermostat 400a may be further configured to provide at least one software graphical display, message, or instructional step selected from the group consisting of: (1) show or indicate a common wire connection to the first integrated smart thermostat 400a is missing and further show or indicate how to connect at least one Heating, Ventilating, Air Conditioning (HVAC) control wire to a COM B terminal 411 of the first integrated smart thermostat 400a; (2) show or indicate how to connect the first switch element 426a to the at least one 2-wire millivolt heating system or the 24 VAC system; (3) show or indicate that the at least one HVAC control wire is correctly moved to the COM B terminal 411a of the first integrated smart thermostat 400a; (4) show or indicate that the first integrated smart thermostat 400a is properly configured to energize the at least one switch 816 to connect the at least one rectified 24 VAC control voltage signal from a pre-existing wire terminal through the first diode 501a to the COM B terminal 411a; (5) show or indicate that at least one thermostat control voltage signal is controlling the at least one HVAC system; (6) show or indicate that the first integrated smart thermostat 400a will automatically repurpose a pre-existing wire as a common/control wire 407, and (7) show or indicate which pre-existing wire is repurposed as a common/control wire 407. After step 902, the process continues to step.

At step 906 of FIG. 11, the first integrated smart thermostat 400a may close the at least one switch 816 to conduct a control voltage signal from the heat W terminal 408 where the heat W wire 407a was removed through a first diode 501a and the at least one switch 816 to the COM B terminal 411a. For a space conditioning system without heat, at least one control wire may be substituted for the heat W wire 407a, and at least one HVAC control voltage signal may be conducted through a first diode 501a and the at least one switch 816 to the COM B terminal 411a. The at least one control wire may be selected from the group consisting of: a heat W wire, an AC compressor Y wire, a fan G wire, a reversing valve O/B wire, an occupancy sensor OCC wire, and an exhaust fan AUX wire. The at least one control wire will be repurposed to serve as the common/control wire 407.

The known prior art thermostats do not guide a user to repurpose a pre-existing wire to serve as the common/control wire 407 when a common wire is not available. Nor do the known prior art thermostats automatically detect when only two wires are connected where one wire is connected to the COM B terminal and one wire is connected to the Hot R terminal. For example, having this configuration would provide the following second error message E2: "No heating or cooling wires detected. W1 or Y1 wire is required. Learn more at nest.com/e75." Detecting wires inserted into a terminal of the first integrated smart thermostat 400a may comprise at least one method selected from the group consisting of: detecting a connector terminal with an auxiliary signal to indicate when a wire has been inserted into the connector, and detecting a current draw when a control signal is activated. After step 906, the process continues to step 908.

At step 908 of FIG. 11, the SPC apparatus charges the battery 404 of the first integrated smart thermostat 400a with the second rectified current signal 652 flowing from the COM B terminal 411a of the first integrated smart thermostat 400a through a common/control wire 407 through a third diode in the first switch element 426a to a common terminal of 120/24 VAC transformer 422. The second rectified current signal 652 is conducted independent of a call for heating or control. The process continues to Step 910, and if Yes (Y), i.e., there is a call for heating or control, then the process proceeds to Step 912. At step 912 of FIG. 11, the control voltage signal from the COM B terminal enables the first integrated smart thermostat 400a to control the at least one 2-wire millivolt heating system, the 24 VAC system, or other device (including a fan G, AC compressor Y1, occupancy OCC signal, etc.). The control voltage signal (e.g., the heat W voltage signal 550) conducts through a first diode 501a and the at least one switch 816 as rectified control voltage on common/control wire 407 to second diode 502 in first switch element 426a and rectified control voltage charges the first capacitor 510. At step 914 of FIG. 11, the first capacitor 510 holds sufficient charge during to activate the isolated-dry-contact relay 534 or energize the switch device 557 until another 60 Hz cycle of the rectified control voltage. After step 914, the process continues to step 916.

At step 916 of FIG. 11, the SPC apparatus energizes the switch device 557 to energize or continue energizing the at least one space conditioning system or device. The process continues to step 918. At step 918, the SPC apparatus charges battery 404 of first integrated smart thermostat 400a with second rectified current signal 652 from the COM B terminal 411a through common/control wire 407 through third diode 503 to the common terminal of the 120/24 VAC transformer 422 during call for heating or control (see step 908). After step 918 of FIG. 11, the SPC process loops back to step 910 until the call for heating or control has ended.

If step 910 of FIG. 11 is No (N) (e.g., zero control voltage on the COM B terminal), then the SPC process continues to step 922 where the switch device 557 is de-energized and the battery 404 is charged with the first rectified current signal 651 from the first capacitor 510 through the second diode 502 in the first switch element 426a and the common/control wire 407 to the COM B terminal 411a. The SPC process then loops back to step 908 to continue charging the battery 404 of the first integrated smart thermostat 400a. The above paragraphs describe how the SPC apparatus charges the battery 404 of the first integrated smart thermostat 400a and energizes the gas burner 535 (or fan, AC system, or another device) based on the call for heating or control, or de-energizes the gas burner 535 (or turns off the fan, AC system, or other device) if there is no call for heating or control.

Figure 12:
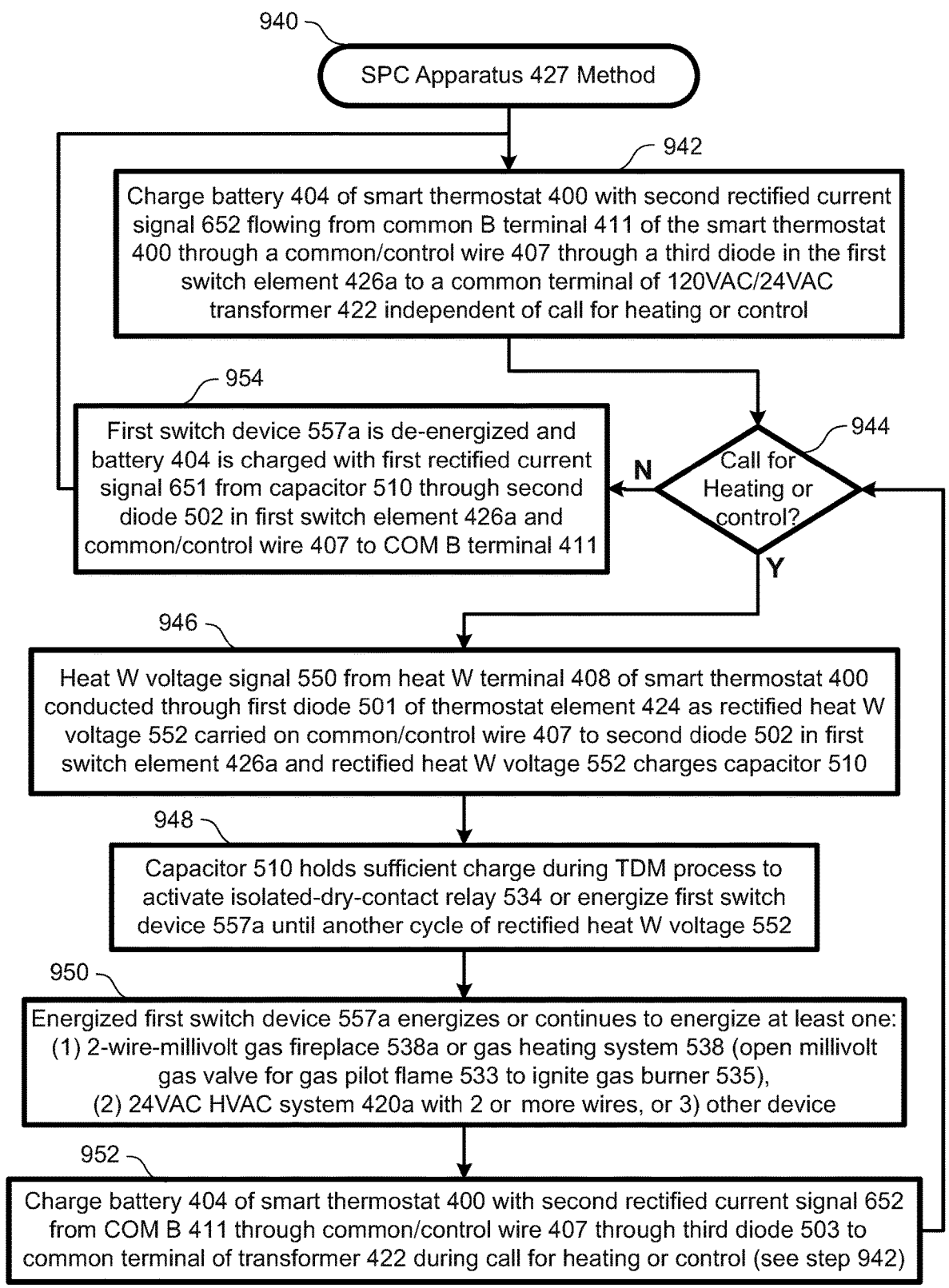
FIG. 12 provides a flow chart showing the process of the SPC apparatus with separate thermostat element and switch element enabling the smart thermostat to control a 24 VAC system or the at least one 2-wire millivolt heating system and charging the battery of a smart thermostat.

FIG. 12 provides a flow chart showing how the SPC apparatus 427 with a thermostat element 424 and a first switch element 426a charges the battery 404 of the smart thermostat 400 and enables the smart thermostat to control the at least one space conditioning system or device. FIG. 12 starts at Step 940 and proceeds to step 942 where the battery 404 of the smart thermostat 400 is charged with the second rectified current signal 652 from COM B terminal 411 of the smart thermostat 400 through a common/control wire 407 through a third diode in the first switch element 426a to a common terminal 521 of 120/24 VAC transformer 422. The second rectified current signal 652 is present independent of a call for heating.

If step 944 of FIG. 12 is Yes (Y), there is a call for heating or control, then the process proceeds to Step 946. At step 946 the heat W voltage signal 550 (or other control voltage) is conducted through a first diode 501 in the thermostat element 424 as the rectified heat W control voltage signal 552 (or other rectified control voltage) on common/control wire 407 through a second diode 502 in the first switch element 426a to charge a first capacitor 510. The SPC apparatus continues to step 948 where the first capacitor 510 holds sufficient charge to activate the isolated-dry-contact relay 534 or energize the switch device 557 until another 60 Hz cycle of the rectified heat W control voltage signal 552 (or other rectified control voltage). At step 950 of FIG. 12, during a call for heating or control, the SPC apparatus energizes the switch device 557 to energize or continue to energize the at least one space conditioning system or device. At step 952 of FIG. 12, during the call for heating or control, the SPC apparatus charges the battery 404 of the first integrated smart thermostat 400a with the second rectified current signal 652 from the COM B terminal 411 through the common/control wire 407 through the third diode 503 to the common terminal 521 of the 120/24 VAC transformer 422 (see step 942). After step 952 of FIG. 12, the SPC process loops back to step 944 until the call for heating or control has ended.

If step 944 of FIG. 12 is No (N) (e.g., zero control voltage on the COM B terminal), then the SPC process continues to step 954 where the switch device 557 is de-energized and the battery 404 is charged with the first rectified current signal 651 from the first capacitor 510 through the second diode 502 in the first switch element 426a and the common/control wire 407 to the COM B terminal 411. The SPC process then loops back to step 942 to continue charging the battery 404 of the first integrated smart thermostat 400a. The above paragraphs describe how the SPC apparatus charges the battery 404 of the first integrated smart thermostat 400a and energizes the gas burner 535 (or fan, AC system, or another device) based on the call for heating or control and de-energizes the gas burner 535 (or turns off the fan, AC system, or other device) if there is no call for heating or control.

Any other 24 VAC control voltage signal may be conducted on the common/control wire 407. The 24 VAC control voltage signal need not originate in the smart thermostat 400. For example, an occupancy sensor signal located near the thermostat could be conducted on the common/control wire 407. The 24 VAC control voltage signal output from the occupancy sensor could be connected to the thermostat element control wire 405a of the thermostat element 424 and conducted on the common/control wire to de-energize a fan G signal when the building is unoccupied. A humidify sensor signal may also be conducted on common/control wire 407 energize or de-energize a humidifier. This embodiment allows for control of additional external devices, or additional functions on the existing first 24 VAC system 420a than would be normally supported by the number of pre-existing wires in the building.

The smart thermostat power and control (SPC) apparatus also referred to as the SPC apparatus 428 comprises a first integrated smart thermostat 400a and a first switch element 426a. The first integrated smart thermostat 400a including a first diode 501a and at least one switch 816 connected to at least one terminal. The first diode 501a is configured to electrically connect to a second diode 502 in the first switch element 426a. The first diode 501a is further configured to conduct at least one rectified 24 VAC control voltage signal from the first integrated smart thermostat 400a to the second diode 502 in the first switch element 426a. The first switch element 426a comprises the second diode 502 configured to electrically connect to at least one device selected from the group consisting of: at least one first switch device, the first diode 501a, and the COM B terminal 411a of the first integrated smart thermostat 400a. The second diode is configured to conduct at least one signal selected from the group consisting of: the at least one rectified 24 VAC control voltage signal from the first diode 501a to energize the at least one switch device, and a first rectified current signal 651 to charge a battery 404 of the first integrated smart thermostat 400a. The first switch element 426a additional comprises a third diode 503 configured to electrically connect to the COM B terminal 411a of the first integrated smart thermostat 400a and further configured to conduct a second rectified current signal 652 to charge the battery 404 of the first integrated smart thermostat 400a. The first switch element 426a additional comprises at least one first switch device configured to conduct at least one output control voltage signal based on receiving the at least one rectified 24 VAC control voltage signal from the first diode (501a), wherein the at least one output control voltage signal is selected from the group consisting of: a millivolt signal (554), and at least one 24 VAC control voltage signal.

The SPC apparatus may be installed on a 2-wire millivolt heating system or a 24 VAC system. For either system, a hot R terminal 410 of the first integrated smart thermostat 400a is connected to a hot R terminal 523 of the external 120/24 VAC transformer 422. For the at least one 2-wire millivolt heating system, the first switch element 426a is connected to the COM B terminal 411a of the first integrated smart thermostat 400a, a TH terminal 416 of a millivolt gas valve 531, a TH TP terminal 418 of the millivolt gas valve 531, and a common terminal 521 of an external 120/24 VAC transformer 422. No connection to a heat W terminal 408 of the first integrated smart thermostat 400a is required since this signal is connected to the COM B terminal through the first diode 501a and the at least one switch 816. For the at least one 2-wire millivolt heating system, the first switch element 426a conducts the millivolt signal 554 from a thermopile 537 of a 2-wire millivolt gas fireplace 538a or a 2-wire millivolt gas heating system 538 to control the at least one 2-wire millivolt heating system or the 24 VAC system.

For the 24 VAC system, the first switch element 426a is connected to at least one terminal of the first integrated smart thermostat 400a selected from a group consisting of: the COM B terminal 411a, a heat W terminal 408, an AC compressor Y terminal 207, a fan G terminal 204, a Y2 terminal, a W2 terminal, a reversing valve O/B terminal, an occupancy sensor OCC terminal, an exhaust fan AUX terminal or any other thermostat control terminal. For the 24 VAC system, first switch element 426a is further connected to at least one 24 VAC system terminal selected from the group consisting of: a COM B terminal 419, a heat W terminal 416a, an AC compressor Y terminal 207a, a fan G terminal 204a, a reversing valve O/B terminal, a Y2 terminal, a W2 terminal, an occupancy sensor OCC terminal, and an exhaust fan AUX terminal. For the 24 VAC system, the first switch element 426a enables the at least one first switch device to conduct at least one 24 VAC control voltage signal from a hot R terminal 418a of a 24 VAC system 420a or a hot R terminal 523 of a 120/24 VAC transformer 422, wherein the 24 VAC control voltage signal is selected from the group consisting of: a heat W signal, an AC compressor Y signal, a fan G signal, a reversing valve O/B signal, a Y2 signal, a W2 signal, an occupancy sensor OCC signal, and an exhaust fan AUX signal.

The at least one switch 816 is used by the first integrated smart thermostat 400a to control the at least one signal at the at least one terminal wherein the at least one switch 816 is selected from a group consisting of: (1) a single-pole single-throw switch to control the at least one signal selected from the group consisting of: the at least one 24 VAC control voltage signal when the single-pole single-throw switch is open, and the at least one rectified 24 VAC control voltage signal through the first diode 501a to the at least one terminal when the single-pole single-throw switch is closed, (2) a single-pole double-throw switch to control the at least one signal selected from the group consisting of: the at least one 24 VAC control voltage signal when the single-pole single-throw switch is in a normally closed position, the at least one rectified 24 VAC control voltage signal through the first diode (501a) to the COM B terminal 411a when the single-pole double-throw switch is in a normally open position.

The first integrated smart thermostat 400a is configured to detect a hot R wire 409 is connected to the hot R terminal 410 of a back plate 806, at least one control voltage wire is connected to at least one control voltage terminal of the back plate 806, and a common wire is connected to the COM B terminal 411a of the back plate 806. The first integrated smart thermostat 400a is further configured perform at least one action selected from the group consisting of: energize the at least one switch 816 to connect the at least one control voltage terminal through the first diode 501a to the COM B terminal 411a to repurpose the at least one control voltage wire as a common/control wire 407, and provide at least one software graphical display, message, or instructional step for a installer to move and reconnect the least one control voltage wire to the COM B terminal 411a and energize the at least one switch 816 to connect the at least one 24 VAC control voltage signal through the first diode 501a and the at least one switch 816 to the COM B terminal 411a.

The known prior art Honeywell T9 Thermostat describes a "K" terminal to combine a fan G signal and a AC compressor Y signal on a single pre-existing wire in the wall of a building to connect to a Honeywell C-Wire Adaptor which converts the two rectified control voltage signals into two separate sinusoidal signals at the HVAC equipment terminal (see background above). The Honeywell T9 thermostat does not provide any software graphical display, messages, or instructional steps for an installer to properly connect C-wire Adaptor wires to the HVAC equipment terminals. The known prior art Nest smart thermostat provides a software display and instructional steps to connect standard thermostat wires to the Nest thermostat back plate. However, the Nest smart thermostat does not provide any software graphical display, messages, or instructional steps for an installer to properly connect a C-Wire Adaptor, an Add-a-Wire adaptor, or the first switch element 426a of the SPC apparatus to the HVAC equipment terminals.

The at least one switch 816 of the first integrated smart thermostat 400a is electrically connected to at least one terminal of the first integrated smart thermostat 400a selected from the group consisting of: a heat W terminal, an AC compressor Y terminal, a fan G terminal, a reversing valve O/B terminal, a Y2 terminal, a W2 terminal, an occupancy sensor OCC terminal, an exhaust fan AUX terminal or any other thermostat control terminal. The at least one first switch device is selected from the group consisting of: a first capacitor 510, an isolated-dry-contact relay 534, a solid-state FET switch 534b, and a TRIAC 534c, a microprocessor 525, a signal conditioning element 514, a resistor 511, a DC signal conditioning element 512, and a phase shifting signal conditioning element 512a.

The first integrated smart thermostat 400a may be configured to provide at least one software graphical display, message, or instructional step selected from the group consisting of: (1) show or indicate a common wire connection to the first integrated smart thermostat 400a is missing and further show or indicate how to connect at least one HVAC control wire to the COM B terminal 411a of the first integrated smart thermostat 400a; (2) show or indicate how to connect the first switch element 426a to the at least one 2-wire millivolt heating system or the 24 VAC system; (3) show or indicate that the at least one HVAC control wire is correctly moved to the COM B terminal 411a of the first integrated smart thermostat 400a; (4) show or indicate that the first integrated smart thermostat 400a is properly configured to energize the at least one switch 816 to connect the at least one rectified 24 VAC control voltage signal from a pre-existing wire terminal through the first diode 501a to the COM B terminal 411a; (5) show or indicate that at least one thermostat control voltage signal is controlling the at least one HVAC system; (6) show or indicate that the first integrated smart thermostat 400a will retain the HVAC control wire connections and automatically repurpose a pre-existing wire as a common/control wire 407, and (7) show or indicate which pre-existing wire is repurposed as a common/control wire 407.

Another embodiment of the SPC apparatus 427 may comprise a first diode 501 in the thermostat element 424 where the first diode 501a is referred to as a first diode 501 (the first diode 501a and the first diode 501 perform the same function). The SPC apparatus 427 comprises: a thermostat element 424 and a first switch element 426a. The thermostat element 424 comprises a first diode 501 wherein the first diode 501 is configured to electrically connect to a second diode 502 in the first switch element 426a, and the first diode 501 is further configured to conduct at least one rectified 24 VAC control voltage signal from a smart thermostat 400 to the second diode 502 in the first switch element 426a. The first switch element 426a comprises the second diode 502 configured to electrically connect to at least one device selected from the group consisting of: at least one first switch device, the first diode 501, and a COM B terminal 411 of the smart thermostat 400. The second diode is configured to conduct at least one signal selected from the group consisting of: the at least one rectified 24 VAC control voltage signal from the first diode 501, and a first rectified current signal 651 to charge a battery 404 of the smart thermostat 400. The first switch element 426a additionally comprises a third diode 503 configured to electrically connect to the COM B terminal 411 of the smart thermostat 400 and further configured to conduct a second rectified current signal 652 to charge the battery 404 of the smart thermostat 400. The first switch element 426a additionally comprises at least one first switch device configured to conduct at least one output control voltage signal based on receiving the at least one rectified 24 VAC control voltage signal from the first diode (501a), wherein the at least one output control voltage signal is selected from the group consisting of: a millivolt signal (554), and at least one 24 VAC control voltage signal.

The SPC apparatus 427 may also be installed on a 2-wire millivolt heating system or a 24 VAC system. For the 2-wire millivolt heating system, a hot R terminal 410 of the smart thermostat 400 is connected to a hot R terminal 523 of the external 120/24 VAC transformer 422. The thermostat element 424 is connected to a COM B terminal 411 and a heat W terminal 408 of the smart thermostat 400, and is also connected to the first switch element 426a using a common/control wire 407. The first switch element 426a is connected to a TH terminal 416 of a millivolt gas valve 531, a TH TP terminal 418 of the millivolt gas valve 531, and a common terminal 521 of an external 120/24 VAC transformer 422. The first switch element 426a charges the battery 404 of the smart thermostat 400 and enables the at least one first switch device to conduct the millivolt signal 554 to control the at least one 2-wire millivolt heating system or the 24 VAC system.

For the 24 VAC system, a hot R terminal 410 of the smart thermostat 400 is connected to a hot R terminal 418a of a 24 VAC system 420a. The thermostat element 424 is connected to at least one terminal of the smart thermostat 400 selected from the group consisting of: a COM B terminal 411, a heat W terminal 408, an AC compressor Y terminal 207, a fan G terminal 204, a reversing valve O/B terminal, a Y2 terminal, a W2 terminal, an occupancy sensor OCC terminal, an exhaust fan AUX terminal or any other thermostat control terminal. The thermostat element 424 is also connected to the first switch element 426a using the common/control wire 407 comprising a repurposed pre-existing wire in a wall of a building. The first switch element 426*a* is connected to at least one 24 VAC system terminal selected from the group consisting of: a common terminal 521 of an HVAC system 120/24 VAC transformer 422*a*, a heat W terminal, an AC compressor Y terminal, a fan G terminal, a reversing valve O/B terminal, a Y2 terminal, a W2 terminal, an occupancy sensor OCC terminal, an exhaust fan AUX terminal, and a common terminal 521 of the HVAC system 120/24 VAC transformer 422*a*. The first switch element 426*a* charges the battery 404 of the smart thermostat 400 and enables the at least one first switch device to conduct at least one 24 VAC control voltage signal selected from the group consisting of: a heat W signal, an AC compressor Y signal, a fan G signal, a reversing valve O/B signal, a Y2 signal, a W2 signal, an occupancy sensor OCC signal, and an exhaust fan AUX signal.

For the SPC apparatus 427, the at least one first switch device is selected from the group consisting of: a first capacitor 510, an isolated-dry-contact relay 534, a solid-state FET switch 534*b*, and a TRIAC 534*c*, a microprocessor 525, a signal conditioning element 514, a resistor 511, a DC signal conditioning element 512, and a phase shifting signal conditioning element 512*a*.

For the SPC apparatus 427, the at least one rectified 24 VAC control voltage signal is selected from the group consisting of: a rectified heat W signal, a rectified AC compressor Y signal, a rectified fan G signal, a rectified reversing valve O/B signal, a rectified Y2 signal, a rectified W2 signal, a rectified occupancy sensor OCC signal, and a rectified exhaust fan AUX signal.

The SPC apparatus 427 may also comprise a third switch element 430 to control the second HVAC system. The third switch element 430 may include a fifth switch device 557*e* configured to conduct at least one voltage signal selected from the group consisting of: the millivolt signal 554, and the hot R voltage signal 551 (24 VAC). The SPC apparatus described above may also include a thermostat element 424 in place of a first integrated smart thermostat 400*a* with a first diode 501*a* (built-in) and at least one switch 816.

The SPC apparatus may also be comprised of an second integrated smart thermostat 400*b* and a fifth switch element 431. The second integrated smart thermostat 400*b* may be comprised of an embedded sixth diode 508 configured to conduct a second rectified HVAC control voltage signal and a seventh diode 509 configured to conduct a third rectified HVAC control voltage signal over the voltage control wire 401*a* from the second integrated smart thermostat 400*b* to the fifth switch element 431. The fifth switch element 431 integrated into a fourth 24 VAC system 420*d* may be comprised of an eighth diode 513 configured to conduct the second rectified HVAC control voltage signal to charge a second capacitor 510*a* to energize a fifth switch device 557*e* when the second rectified HVAC control voltage signal is active from the second integrated smart thermostat 400*b*. The fifth switch element 431 may also include a ninth diode 515 configured to conduct the third rectified HVAC control voltage signal to charge a third capacitor 510*b* to energize a sixth switch device 557*f* when the third rectified HVAC control voltage signal is active from the second integrated smart thermostat 400*b*.

The fifth switch device 557*e* of the SPC apparatus is configured to conduct a 24 VAC control voltage signal from the hot R terminal 523 of a 120/24 VAC transformer 422*a* to the output terminal 416*b* of the fifth switch device 557*e* to the heat W terminal 416*a* of a fourth 24 VAC system 420*d* when the second rectified HVAC control voltage signal is active from the second integrated smart thermostat 400*b*.

The sixth switch device 557*f* is configured to conduct a 24 VAC control voltage signal from the hot R terminal 523 of the 120/24 VAC transformer 422*a* to the output terminal 406*b* of the sixth switch device 557*f* to a fan G terminal 204*a* of a fourth 24 VAC system 420*d* when the third rectified HVAC control voltage signal is active from the second integrated smart thermostat 400*b*.

The SPC apparatus may include a 120/24 VAC adaptor including at least one element selected from the group consisting of: a 120/24 VAC adaptor, a Uninterruptable Power Supply (UPS) element, a MIFI element, a WIFI backup. In the event mains power is lost at a location with the at least one 2-wire millivolt heating system or the 24 VAC system, a UPS could be used to supply constant power to the SPC apparatus 427 to enable the battery 404 of a smart thermostat 400 or a first integrated smart thermostat 400*a* to maintain a charged condition and control the at least one 2-wire millivolt heating system or the 24 VAC system through the power outage. A WIFI or MIFI device could also be included and powered by the UPS to maintain wireless communication with the smart thermostat 400 or first integrated smart thermostat 400*a* while mains power was lost.

In another embodiment, the SPC apparatus may enable conducting at least one more 24 VAC control voltage signal than is supported by pre-existing thermostat wire in a wall of a building through the thermostat element 424, the common/control wire 407, and the first switch element 426*a*. The 24 VAC output from the at least one first switch device could be conducted to at least one device selected from the group consisting of: at least one HVAC fan, at least one HVAC system, at least one ultraviolet lamp assembly, at least one humidifier, and at least one exhaust fan, wherein the at least one 24 VAC control voltage signal is selected from the group consisting of: an auxiliary signal, an occupancy sensor signal, a humidity sensor signal, and an ion counter signal.

While the invention herein disclosed has been described by means of specific embodiments and applications thereof, numerous modifications and variations could be made thereto by those skilled in the art without departing from the scope of the invention set forth in the claims.

The invention claimed is:

1. A smart thermostat power and control apparatus, the control apparatus comprising:
 a first integrated smart thermostat (400*a*) and a first switch element (426*a*);
 the first integrated smart thermostat (400*a*) including a first diode (501*a*) and at least one switch (816) connected to at least one terminal wherein the first diode (501*a*) is configured to electrically connect to a second diode (502) in the first switch element (426*a*), and the first diode (501*a*) is further configured to conduct at least one rectified 24 VAC control voltage signal from the first integrated smart thermostat (400*a*) to the second diode (502) in the first switch element (426*a*); and
 the first switch element (426*a*) comprising:
  the second diode (502) configured to electrically connect to at least one first switch device, the first diode (501*a*), and a COM B terminal (411*a*) of the first integrated smart thermostat (400*a*), wherein the second diode (502) is configured to conduct at least one signal selected from the group consisting of: the at least one rectified 24 VAC control voltage signal from the first diode (501*a*) to energize the at least one first switch device, and a first rectified current signal (651) to charge a battery (404) of the first integrated smart thermostat (400*a*);

a third diode (503) configured to electrically connect to the COM B terminal (411*a*) of the first integrated smart thermostat (400*a*) and further configured to conduct a second rectified current signal (652) to charge the battery (404) of the first integrated smart thermostat (400*a*); and the at least one first switch device configured to conduct at least one output control voltage signal based on receiving the at least one rectified 24 VAC control voltage signal from the first diode (501*a*), wherein the at least one output control voltage signal is selected from the group consisting of: a millivolt signal (554), and at least one 24 VAC control voltage signal.

2. The apparatus of claim 1, wherein:

the first diode (501*a*) and the second diode (502) are in a same direction and the third diode (503) is in an opposite direction and a flow of current to charge the battery (404) of the first integrated smart thermostat (400*a*) is based on at least one orientation of the diodes selected from the group consisting of:

a first orientation of the diodes wherein the first rectified current (651) flows from a COM B terminal (419) of a 24 VAC system or a common terminal (521) of an external 120/24 VAC transformer (422) through the second diode (502) of the switch element (426*a*) electrically connected to a common/control wire (407) comprising a pre-existing repurposed wire electrically connected to the COM B terminal (411) of the smart thermostat (400*a*) wherein the first rectified current signal (651) flows to the COM B terminal (411) of the smart thermostat (400*a*), the first orientation of the diodes wherein the second rectified current signal (652) flows from the COM B terminal (411*a*) of the smart thermostat (400*a*) through the common/control wire (407) comprising a pre-existing repurposed wire electrically connected to the third diode (503) of the switch element (426*a*) wherein the second rectified current signal (652) flows through the third diode (503) to the COM B terminal (419) of the 24 VAC system or the common terminal (521) of the external 120/24 VAC transformer (422), a second orientation of the diodes wherein the first rectified current signal (651) flows from the COM B terminal (411*a*) of the smart thermostat (400*a*) through the common/control wire (407) comprising a pre-existing repurposed wire electrically connected to the third diode (503) of the switch element (426*a*) wherein the first rectified current signal (651) flows through the third diode (503) to the COM B terminal (419) of the 24 VAC system or the common terminal (521) of the external 120/24 VAC transformer (422), and the second orientation of the diodes wherein the second rectified current signal (652) flows from a COM B terminal (419) of a 24 VAC system or a common terminal (521) of an external 120/24 VAC transformer (422) through the second diode (502) of the switch element (426*a*) electrically connected to a common/control wire (407) comprising the pre-existing repurposed wire electrically connected to the thermostat element (424) wherein the second rectified current signal (652) flows through the thermostat element (424) to the COM B terminal (411) of the smart thermostat (400*a*).

3. The apparatus of claim 1, wherein:

a hot R terminal (410) of the first integrated smart thermostat (400*a*) is connected to a hot R terminal (523) of an external 120/24 VAC transformer (422);

the first switch element (426*a*) is connected to a COM B terminal (411*a*) of the first integrated smart thermostat (400*a*), a TH terminal (416) of a millivolt gas valve (531), a TH TP terminal (418) of the millivolt gas valve (531), and a common terminal (521) of an external 120/24 VAC transformer (422); and wherein the first switch element (426*a*) enables the at least one first switch device to conduct the millivolt signal (554) from a thermopile (537) of a 2-wire millivolt gas fireplace (538*a*) or a 2-wire millivolt gas heating system (538) to control at least one heating system selected from the group consisting of: a 2-wire millivolt gas heating system (538), and a 2-wire millivolt gas fireplace (538*a*).

4. The apparatus of claim 1, wherein:

a hot R terminal (410) of the first integrated smart thermostat is connected to a hot R terminal of a HVAC system 120/24 VAC transformer;

the first switch element (426*a*) is connected to at least one terminal of the first integrated smart thermostat (400*a*) selected from a group consisting of: a COM B terminal (411*a*), a heat W terminal (408), an AC compressor Y terminal (207), a fan G terminal (204), a reversing valve O/B terminal, a Y2 terminal, a W2 terminal, an occupancy sensor OCC terminal, an exhaust fan AUX terminal or any other thermostat control terminal;

wherein the first switch element (426*a*) is further connected to at least one 24 VAC system terminal selected from the group consisting of: a COM B terminal (419), a heat W terminal (416*a*), an AC compressor Y terminal (207*a*), a fan G terminal (204*a*), a reversing valve O/B terminal, a Y2 terminal, a W2 terminal, an occupancy sensor OCC terminal, and a exhaust fan AUX terminal; and wherein the first switch element (426*a*) enables the at least one first switch device to conduct at least one 24 VAC control voltage signal from a hot R terminal (418*a*) of a 24 VAC system (420*a*) or a hot R terminal (523) of a 120/24 VAC transformer (422), wherein the 24 VAC control voltage signal is selected from the group consisting of: a heat W signal, an AC compressor Y signal, a fan G signal, a reversing valve O/B signal, a Y2 signal, a W2 signal, an occupancy sensor OCC signal, and an exhaust fan AUX signal.

5. The apparatus of claim 1, wherein the at least one switch (816) is used by the first integrated smart thermostat (400*a*) to control the at least one signal at the at least one terminal wherein the at least one switch (816) is selected from a group consisting of:

a single-pole single-throw switch to control the at least one signal selected from the group consisting of: the at least one 24 VAC control voltage signal when the single-pole single-throw switch is open, and the at least one rectified 24 VAC control voltage signal through the first diode (501*a*) to a COM B terminal (411*a*) when the single-pole single-throw switch is closed, and a single-pole double-throw switch to control the at least one signal selected from the group consisting of: the at least one 24 VAC control voltage signal when the single-pole single-throw switch is in a normally closed position, the at least one rectified 24 VAC control voltage signal through the first diode (501a) to the COM B terminal (411a) when the single-pole double-throw switch is in a normally open position.

6. The apparatus of claim 1, wherein the first integrated smart thermostat (400a) is configured to detect a hot R wire (409) is connected to a hot R terminal (410) of a back plate (806) of the first integrated smart thermostat (400a), at least one control voltage wire is connected to at least one control voltage terminal of the back plate (806), and a common wire is connected to a COM B terminal (411a) of the back plate (806); and wherein the first integrated smart thermostat (400a) is further configured to perform at least one action selected from the group consisting of:
 energize the at least one switch (816) to connect the at least one control voltage terminal through the first diode (501a) to the COM B terminal (411a) to repurpose the at least one control voltage wire as a common/control wire (407), and
 provide at least one software graphical display, message, or instructional step to instruct an installer to move and reconnect the least one control voltage wire to the COM B terminal (411a) and energize the at least one switch (816) to connect the at least one 24 VAC control voltage signal through the first diode (501a) and the at least one switch (816) to the COM B terminal (411a).

7. The apparatus of claim 1, wherein the at least one switch (816) is electrically connected to at least one terminal of the first integrated smart thermostat (400a) selected from the group consisting of: a heat W terminal (208), an AC compressor Y terminal (207), a fan G terminal (204), a reversing valve O/B terminal, a Y2 terminal, a W2 terminal, an occupancy sensor OCC terminal, an exhaust fan AUX terminal or any other thermostat control terminal, and
 wherein the at least one first switch device of the first switch element (426a) is selected from the group consisting of: a capacitor (510), an isolated-dry-contact relay (534), a solid-state Field Effect Transistor (FET) switch (534b), and a TRIAC (534c), a microprocessor (525), a signal conditioning element (514), a resistor (511), a DC signal conditioning element (512), and a phase shifting signal conditioning element (512a).

8. The apparatus of claim 1, wherein the first integrated smart thermostat (400a) is configured to provide at least one software graphical display, message, or instructional step selected from the group consisting of:
 show or indicate a common wire connection to the first integrated smart thermostat (400a) is missing and further show or indicate how to connect at least one HVAC control wire to a COM B terminal (411a) of the first integrated smart thermostat (400a),
 show or indicate how to connect the first switch element (426a) to at least one HVAC system selected from the group consisting of: a 2-wire millivolt gas heating system (538), and a 2-wire millivolt gas fireplace (538a), and a 24 VAC system,
 show or indicate that the at least one HVAC control wire is correctly moved to the COM B terminal (411a) of the first integrated smart thermostat (400a),
 show or indicate that the first integrated smart thermostat (400a) is properly configured to energize the at least one switch (816) to connect the at least one rectified 24 VAC control voltage signal from a pre-existing wire terminal through the first diode (501a) to the COM B terminal (411a),
 show or indicate that at least one thermostat control voltage signal is controlling the at least one HVAC system,
 show or indicate that the integrated smart thermostat (400a) will retain the HVAC control wire connections and automatically repurpose a pre-existing wire as a common/control wire (407), and
 show or indicate which pre-existing wire is repurposed as a common/control wire (407).

9. A smart thermostat power and control apparatus, the apparatus comprising:
 a thermostat element (424) and a first switch element (426a);
 the thermostat element (424) comprising a first diode (501) wherein the first diode (501) is configured to electrically connect to a second diode (502) in the first switch element (426a), wherein the first diode (501) is further configured to conduct at least one rectified 24 VAC control voltage signal from a smart thermostat (400) to the second diode (502) in the first switch element (426a); and
 the first switch element (426a) comprises:
  the second diode (502) configured to electrically connect to at least one first switch device, the first diode (501), and a COM B terminal (411) of the smart thermostat (400), wherein the second diode is configured to conduct at least one signal selected from the group consisting of: the at least one rectified 24 VAC control voltage signal from the first diode (501) to energize the at least one first switch device, and a first rectified current signal (651) to charge a battery (404) of the smart thermostat (400);
  a third diode (503) configured to electrically connect to the COM B terminal (411) of the smart thermostat (400) and further configured to conduct a second rectified current signal (652) to charge the battery (404) of the smart thermostat (400); and
  the at least one first switch device configured to conduct at least one output control voltage signal selected from the group consisting of: a millivolt signal (554) from a thermopile (537) of a 2-wire millivolt gas fireplace (538a) or a 2-wire millivolt gas heating system (538), and at least one 24 VAC control voltage signal from a hot R terminal (418a) of a 24 VAC system (420a) or a hot R terminal (523) of a 120/24 VAC transformer (422).

10. The apparatus of claim 9, wherein:
 the first diode (501) and the second diode (502) are in a same direction and the third diode (503) is in an opposite orientation and a flow of current to charge the battery (404) of the smart thermostat (400) is based on at least one orientation of the diodes selected from the group consisting of:
  a first orientation of the diodes wherein the first rectified current signal (651) flows from a COM B terminal (419) of a 24 VAC system or a common terminal (521) of an external 120/24 VAC transformer (422) through the second diode (502) of the switch element (426a) which is electrically connected to a common/control wire (407) comprising a pre-existing repurposed wire electrically connected to the thermostat element (424) wherein the first rectified current signal (651) flows through the thermostat element (424) to the COM B terminal (411) of the smart thermostat (400),
  the first orientation of the diodes wherein the second rectified current signal (652) flows from the COM B terminal (411) of the smart thermostat (400) through the thermostat element (424) through the common/control wire (407) comprising a pre-existing repurposed wire electrically connected to the third diode (503) of the switch element (426a) wherein the second rectified current signal (652) flows through the third diode (503) to the COM B terminal (419) of the 24 VAC system or the common terminal (521) of the external 120/24 VAC transformer (422), a second orientation of the diodes wherein the first rectified current signal (651) flows from the COM B terminal (411) of the smart thermostat (400) through the thermostat element (424) through a common/control wire (407) comprising a pre-existing repurposed wire electrically connected to the third diode (503) of the switch element (426a) wherein the first rectified current signal (651) flows through the third diode (503) to the COM B terminal (419) of the 24 VAC system or the common terminal (521) of the external 120/24 VAC transformer (422), and the second orientation of the diodes wherein the second rectified current signal (652) flows from a COM B terminal (419) of a 24 VAC system or a common terminal (521) of an external 120/24 VAC transformer (422) through the second diode (502) of the switch element (426a) which is electrically connected to a common/control wire (407) comprising a pre-existing repurposed wire electrically connected to the thermostat element (424) wherein the second rectified current signal (652) flows through the thermostat element (424) to the COM B terminal (411) of the smart thermostat (400).

11. The apparatus of claim 9, wherein:

a hot R terminal (410) of the smart thermostat (400) is connected to a hot R terminal (523) of an external 120/24 VAC transformer (422);

the thermostat element (424) is connected to a COM B terminal (411) and a heat W terminal (408) of the smart thermostat (400), and the thermostat element (424) is also connected to the first switch element (426a) using a common/control wire (407);

the first switch element (426a) is connected to a TH terminal (416) of a millivolt gas valve (531), a TH TP terminal (418) of the millivolt gas valve (531), and a common terminal (521) of the external 120/24 VAC transformer (422); and wherein the first switch element (426a) enables the at least one first switch device to conduct the millivolt signal (554) to control at least one heating system selected from the group consisting of: a 2-wire millivolt gas heating system (538), and a 2-wire millivolt gas fireplace (538a).

12. The apparatus of claim 9, wherein:

a hot R terminal (410) of the smart thermostat (400) is connected to a hot R terminal (418a) of a 24 VAC system (420a);

the thermostat element (424) is connected to at least one terminal of the smart thermostat (400) selected from the group consisting of: a COM B terminal (411), a heat W terminal (408), an AC compressor Y terminal (207), a fan G terminal (204), a reversing valve O/B terminal, a Y2 terminal, a W2 terminal, an occupancy sensor OCC terminal, an exhaust fan AUX terminal or any other thermostat control terminal, and the thermostat element (424) is also connected to the first switch element (426a) using a common/control wire (407) comprising a repurposed pre-existing wire in a wall of a building;

the first switch element (426a) is connected to at least one 24 VAC system terminal selected from the group consisting of: a common terminal (521) of an HVAC system 120/24 VAC transformer (422a), a heat W terminal, an AC compressor Y terminal, a fan G terminal, a reversing valve O/B terminal, a Y2 terminal, a W2 terminal, an occupancy sensor OCC terminal, an exhaust fan AUX terminal, and a common terminal (521) of the HVAC system 120/24 VAC transformer (422a); and wherein the first switch element (426a) enables the at least one first switch device to conduct at least one 24 VAC control voltage signal selected from the group consisting of: a heat W signal, an AC compressor Y signal, a fan G signal, a reversing valve O/B signal, a Y2 signal, a W2 signal, an occupancy sensor OCC signal, and an exhaust fan AUX signal.

13. The apparatus of claim 9, wherein the at least one first switch device of the first switch element (426a) is selected from the group consisting of: a capacitor (510), an isolated-dry-contact relay (534), a solid-state Field Effect Transistor (FET) switch (534b), and a TRIAC (534c), a microprocessor (525), a signal conditioning element (514), a resistor (511), a DC signal conditioning element (512), and a phase shifting signal conditioning element (512a).

14. A smart thermostat power and control apparatus, the apparatus comprising:

a first integrated smart thermostat (400a) and a first switch element (426a);

the first integrated smart thermostat (400a) including a first diode (501a) and at least one switch (816) connected to at least one terminal wherein the first diode (501a) is configured to electrically connect to a second diode (502) in the first switch element (426a), and the first diode (501a) is further configured to conduct at least one rectified 24 VAC control voltage signal from the first integrated smart thermostat (400a) to the second diode (502) in the first switch element (426a); and the first switch element (426a) comprising:

the second diode (502) configured to electrically connect to at least one first switch device, the first diode (501a), and a COM B terminal (411a) of the first integrated smart thermostat (400a), wherein the second diode is configured to conduct at least one signal selected from the group consisting of: the at least one rectified 24 VAC control voltage signal from the first diode (501a) to energize the at least one first switch device, and a first rectified current signal (651) to charge a battery (404) of the first integrated smart thermostat (400a);

a third diode (503) configured to electrically connect to the COM B terminal (411a) of the first integrated smart thermostat (400a) and further configured to conduct a second rectified current signal (652) to charge the battery (404) of the first integrated smart thermostat (400a);

the at least one first switch device configured to conduct at least one output control voltage signal selected from the group consisting of: a millivolt signal (554) from a thermopile (537) of a 2-wire millivolt gas fireplace (538a) or a 2-wire millivolt gas heating system (538), and at least one 24 VAC control voltage signal from a hot R terminal (418a) of a 24 VAC system (420a) or a hot R terminal (523) of a 120/24 VAC transformer (422);

wherein the first integrated smart thermostat (400*a*) is configured to detect a hot R wire (409) is connected to the hot R terminal (410) of a back plate (806), and at least one control voltage wire is connected to at least one control voltage terminal of the back plate (806), and no wire is connected to a COM B terminal (411*a*) of the back plate (806); and wherein the first integrated smart thermostat (400*a*) is further configured to perform at least one action selected from the group consisting of:

energize the at least one switch (816) to connect the at least one control voltage terminal through the first diode (501*a*) to the COM B terminal (411*a*) to repurpose the at least one control voltage wire as a common/control wire (407), and provide at least one software graphical display, message, or instructional step for an installer to move and reconnect the least one control voltage wire to the COM B terminal (411*a*) and energize the at least one switch (816) to connect the at least one 24 VAC control voltage signal through the first diode (501*a*) and the at least one switch (816) to the COM B terminal (411*a*).

15. The apparatus of claim 14, wherein:

the first diode (501*a*) and the second diode (502) are in a same direction and the third diode (503) is in an opposite orientation and a flow of current to charge the battery (404) of the first integrated smart thermostat (400*a*) is based on at least one orientation of the diodes selected from the group consisting of:

a first orientation of the diodes wherein the first rectified current (651) flows from a COM B terminal (419) of a 24 VAC system or a common terminal (521) of an external 120/24 VAC transformer (422) through the second diode (502) of the switch element (426*a*) which is electrically connected to a common/control wire (407) comprising a pre-existing repurposed wire electrically connected to the COM B terminal (411) of the smart thermostat (400*a*) wherein the first rectified current signal (651) flows to the COM B terminal (411) of the smart thermostat (400*a*), the first orientation of the diodes wherein the second rectified current signal (652) flows from the COM B terminal (411*a*) of the smart thermostat (400*a*) through the common/control wire (407) comprising a pre-existing repurposed wire electrically connected to the third diode (503) of the switch element (426*a*) wherein the second rectified current signal (652) flows through the third diode (503) to the COM B terminal (419) of the 24 VAC system or the common terminal (521) of the external 120/24 VAC transformer (422), a second orientation of the diodes wherein the first rectified current signal (651) flows from the COM B terminal (411*a*) of the smart thermostat (400*a*) through the common/control wire (407) comprising a pre-existing repurposed wire electrically connected to the third diode (503) of the switch element (426*a*) wherein the first rectified current signal (651) flows through the third diode (503) to the COM B terminal (419) of the 24 VAC system or the common terminal (521) of the external 120/24 VAC transformer (422), and the second orientation of the diodes wherein the second rectified current (652) flows from a COM B terminal (419) of a 24 VAC system or a common terminal (521) of an external 120/24 VAC transformer (422) through the second diode (502) of the switch element (426*a*) which is electrically connected to a common/control wire (407) comprising a pre-existing repurposed wire electrically connected to the thermostat element (424) wherein the second rectified current signal (652) flows through the thermostat element (424) to the COM B terminal (411) of the smart thermostat (400*a*).

16. The apparatus of claim 14, wherein:

a hot R terminal (410) of the first integrated smart thermostat (400*a*) is connected to a hot R terminal (523) of an external 120/24 VAC transformer (422);

the first switch element (426*a*) is connected to the COM B terminal (411*a*) of the first integrated smart thermostat (400*a*), a TH terminal (416) of a millivolt gas valve (531), a TH TP terminal (418) of the millivolt gas valve (531), and a common terminal (521) of an external 120/24 VAC transformer (422); and wherein the first switch element (426*a*) enables the at least one first switch device to conduct the millivolt signal (554) to control at least one heating system selected from the group consisting of: a 2-wire millivolt gas heating system (538), and a 2-wire millivolt gas fireplace (538*a*).

17. The apparatus of claim 14, wherein:

a hot R terminal (410) of the first integrated smart thermostat (400*a*) is connected to a hot R terminal (523) of a HVAC system 120/24 VAC transformer (422*a*);

the first switch element (426*a*) wire connections include at least one first integrated smart thermostat (400*a*) terminal selected from a group consisting of: the COM B terminal (411*a*), a heat W terminal (408), an AC compressor Y terminal (207), a fan G terminal (204), a reversing valve O/B terminal, a Y2 terminal, a W2 terminal, an occupancy sensor;

wherein the first switch element (426*a*) is further connected to at least one 24 VAC system terminal selected from the group consisting of: a COM B terminal (419), a heat W terminal (416*a*), an AC compressor Y terminal (207*a*), a fan G terminal (204*a*), a reversing valve O/B terminal, a Y2 terminal, a W2 terminal, a occupancy sensor OCC terminal, and a exhaust fan AUX terminal; and wherein the first switch element (426*a*) enables the at least one first switch device to conduct at least one 24 VAC control voltage signal selected from the group consisting of: a heat W signal, an AC compressor Y signal, a fan G signal, a reversing valve O/B signal, a Y2 signal, a W2 signal, an occupancy sensor OCC signal, and an exhaust fan AUX signal.

18. The apparatus of claim 14, wherein the at least one switch (816) of the first integrated smart thermostat (400*a*) is electrically connected to at least one terminal selected from the group consisting of: a heat W terminal, an AC compressor Y terminal, a fan G terminal, a reversing valve O/B terminal, a Y2 terminal, a W2 terminal, an occupancy sensor OCC terminal, an exhaust fan AUX terminal or any other thermostat control terminal; and wherein the at least one first switch device of the first switch element (426*a*) is selected from the group consisting of: a capacitor (510), an isolated-dry-contact relay (534), a solid-state Field Effect Transistor (FET) switch (534*b*), and a TRIAC (534*c*), a microprocessor (525), a signal conditioning element (514), a resistor (511), a DC signal conditioning element (512), and a phase shifting signal conditioning element (512*a*).

19. The apparatus of claim 14, wherein the at least one switch (816) is used by the first integrated smart thermostat (400*a*) to control the at least one signal at the at least one terminal wherein the at least one switch (816) is selected from a group consisting of:
- a single-pole single-throw switch to control the at least one signal selected from the group consisting of: the at least one 24 VAC control voltage signal when the single-pole single-throw switch is normally open, and the at least one rectified 24 VAC control voltage signal through the first diode (501*a*) to the at least one terminal when the single-pole single-throw switch is closed, and
- a single-pole double-throw switch to control the at least one signal selected from the group consisting of: the at least one 24 VAC control voltage signal when the single-pole single-throw switch is in a normally closed position, the at least one rectified 24 VAC control voltage signal through the first diode (501*a*) to the COM B terminal (411*a*) when the single-pole double-throw switch is in a normally open position.

20. The apparatus of claim 14, wherein the first integrated smart thermostat (400*a*) is configured to provide at least one software graphical display, message, or instructional step selected from the group consisting of:
- show or indicate a common wire connection to the first integrated smart thermostat (400*a*) is missing and further show or indicate how to connect at least one HVAC control wire to the COM B terminal (411*a*) of the first integrated smart thermostat (400*a*),
- show or indicate how to connect the first switch element (426*a*) to at least one HVAC system selected from the group consisting of: a 2-wire millivolt gas heating system (538), and a 2-wire millivolt gas fireplace (538*a*), and a 24 VAC system,
- show or indicate that the at least one HVAC control wire is correctly moved to the COM B terminal (411*a*) of the first integrated smart thermostat (400*a*),
- show or indicate that the first integrated smart thermostat (400*a*) is properly configured to energize the at least one switch (816) to connect the at least one rectified 24 VAC control voltage signal from a pre-existing wire terminal through the first diode (501*a*) to the COM B terminal (411*a*),
- show or indicate that at least one thermostat control voltage signal is controlling the at least one HVAC system,
- show or indicate that the integrated smart thermostat (400*a*) will retain the HVAC control wire connections and automatically repurpose a pre-existing wire as the common/control wire (407), and
- show or indicate which pre-existing wire is repurposed as a common/control wire (407).

* * * * *